(12) United States Patent
Kageme et al.

(10) Patent No.: US 11,067,682 B2
(45) Date of Patent: Jul. 20, 2021

(54) RADAR APPARATUS

(71) Applicant: Mitsubishi Electric Corporation, Tokyo (JP)

(72) Inventors: Satoshi Kageme, Tokyo (JP); Kazuaki Maniwa, Tokyo (JP); Teruyuki Hara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 19 days.

(21) Appl. No.: 16/781,234

(22) Filed: Feb. 4, 2020

(65) Prior Publication Data

US 2020/0182994 A1  Jun. 11, 2020

Related U.S. Application Data

(63) Continuation of application No. PCT/JP2017/030679, filed on Aug. 28, 2017.

(51) Int. Cl.
| | |
|---|---|
| *G01S 13/58* | (2006.01) |
| *G01S 13/06* | (2006.01) |
| *G01S 7/282* | (2006.01) |
| *G01S 7/285* | (2006.01) |

(52) U.S. Cl.
CPC ............ *G01S 13/584* (2013.01); *G01S 13/06* (2013.01); *G01S 7/282* (2013.01); *G01S 7/285* (2013.01)

(58) Field of Classification Search
CPC ........ G01S 13/584; G01S 13/06; G01S 7/282; G01S 7/285

(Continued)

(56) References Cited

U.S. PATENT DOCUMENTS

| | | | | |
|---|---|---|---|---|
| 5,440,311 A | * | 8/1995 | Gallagher | ............. G01S 13/284 |
| | | | | 342/132 |
| 5,703,647 A | * | 12/1997 | Kim | ..................... H04N 19/176 |
| | | | | 348/403.1 |

(Continued)

FOREIGN PATENT DOCUMENTS

WO    WO-2015173891 A1 * 11/2015 ............. G01S 7/292

OTHER PUBLICATIONS

Dai et al., "Low-sidelobe HRR profiling based on the FDLFM-MIMO radar", APSAR 2007, 1st Asian and Pacific Conference, p. 132-135.

(Continued)

*Primary Examiner* — Bernarr E Gregory
*Assistant Examiner* — Nuzhat Pervin
(74) *Attorney, Agent, or Firm* — Birch, Stewart, Kolasch & Birch, LLP

(57) ABSTRACT

A range-direction frequency domain converting unit (231-1) converts reception video signals into signals in a range direction frequency. A hit-direction frequency domain converting unit (232-1) converts the signals in the range direction frequency into signals based on the velocity and the range direction frequency so that the target Doppler frequency belongs to the same velocity bin number independently of variations in frequencies of transmission signals. A correlation unit (233-1) generates signals based on the velocity separated for each of the transmission frequencies and a range after correlation. An integration unit (234-1) generates band-synthesized signals based on the velocity and a range after correlation. A candidate target detecting unit (241) detects candidate targets based on the signal intensity from the output signals of the integration unit (233-1). A target relative velocity/relative range/arrival angle calculating unit (242) calculates the relative velocity, (Continued)

the relative range, and the arrival angle of the candidate targets.

13 Claims, 34 Drawing Sheets

(58) Field of Classification Search
USPC .......................................................... 342/109
See application file for complete search history.

(56) References Cited

U.S. PATENT DOCUMENTS

| 2006/0220949 | A1* | 10/2006 | Nohmi | G01S 13/343 |
| | | | | 342/160 |
| 2014/0285372 | A1* | 9/2014 | Kambe | G01S 13/931 |
| | | | | 342/27 |
| 2014/0343891 | A1* | 11/2014 | Becker | G08G 1/042 |
| | | | | 702/150 |
| 2016/0363648 | A1* | 12/2016 | Mindell | G01S 13/885 |
| 2016/0363664 | A1* | 12/2016 | Mindell | G01S 13/79 |

OTHER PUBLICATIONS

Merrill I. Skolnik, "Radar Handbook, Third Edition", MacGraw-Hill companies, 2008, total 5 pages.
Zhao et al., "Low complexity Keystone transform without Interpolation for Dim Moving Target Detection", IEEE CIE International Conference on Radar 2011, p. 1745-1748.

\* cited by examiner

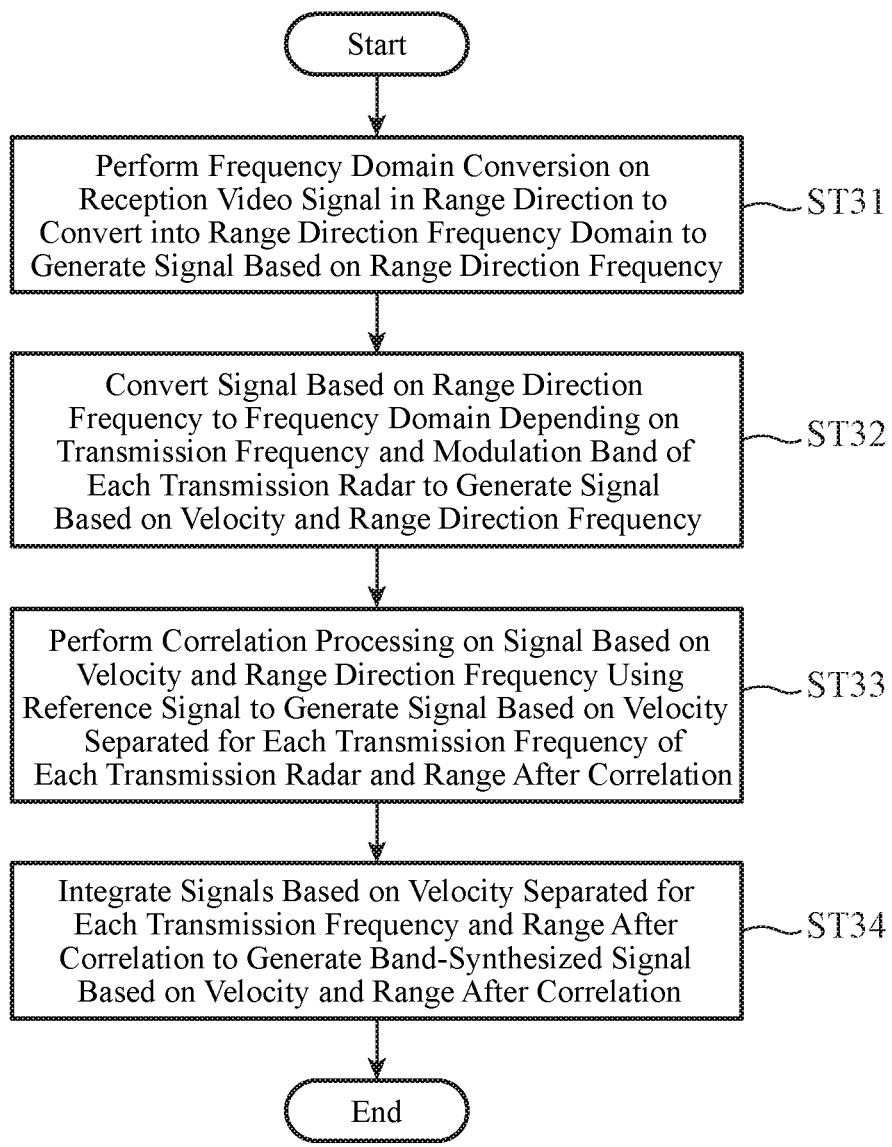

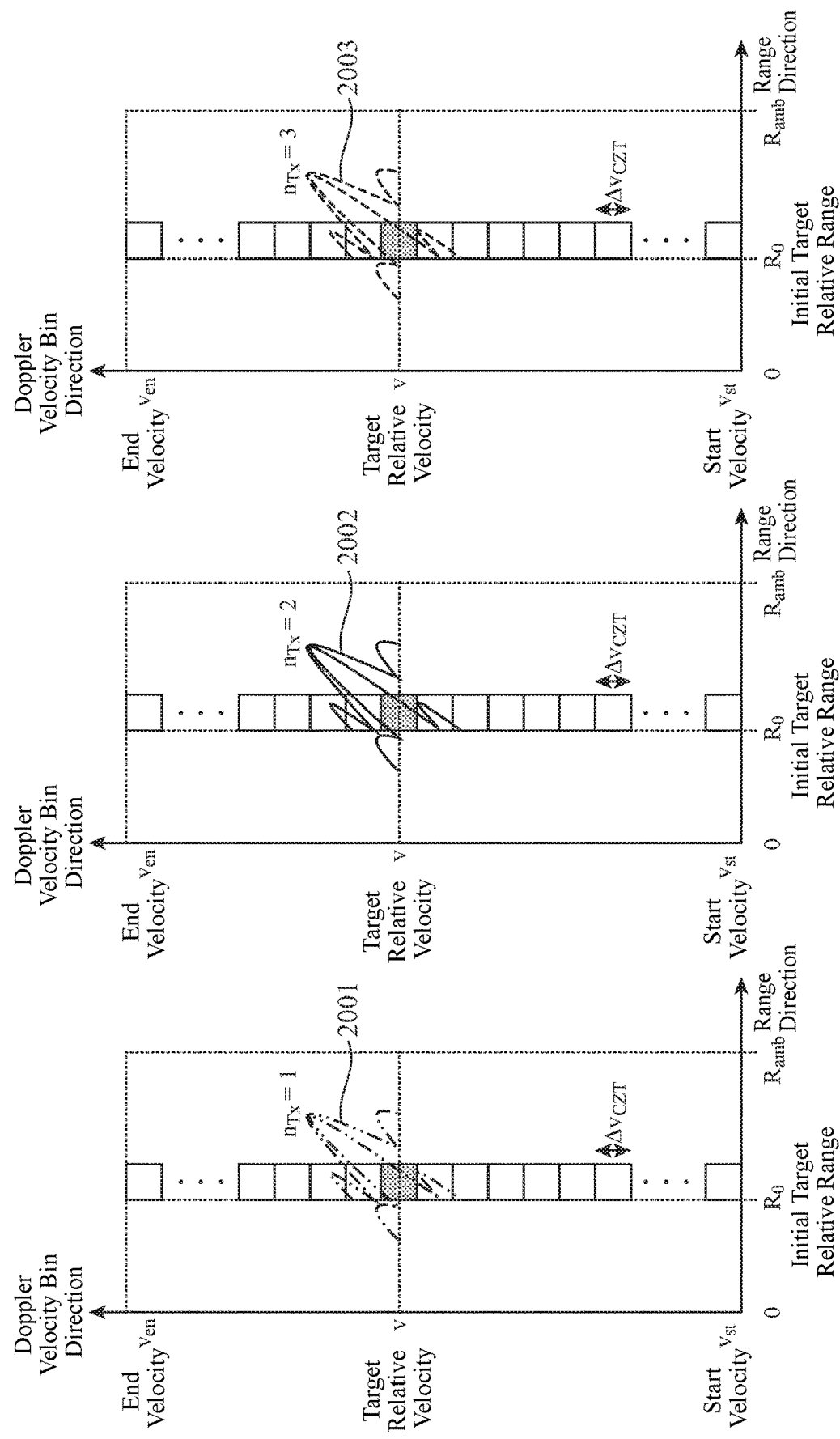

RADAR APPARATUS

CROSS REFERENCE TO RELATED APPLICATIONS

This application is a Continuation of PCT International Application No. PCT/JP2017/030679 filed on Aug. 28, 2017, which is hereby expressly incorporated by reference into the present application.

TECHNICAL FIELD

The present invention relates to a radar apparatus including a plurality of transmission radars for transmitting signals having transmission frequencies varying at predetermined intervals and a reception radar for receiving signals reflected from a target. The radar apparatus performs target detection, ranging, velocity measurement, angle measurement, and the like by processing the reception signals.

BACKGROUND ART

In conventional radar apparatuses, for example as disclosed in Non-Patent Literature 1, different transmission radars transmit transmission signals of transmission frequencies that are frequency-modulated in ascending order within the pulse at different center frequencies, and a reception radar receives the transmission signals reflected by a target as reception signals. Then, on the assumption that there is no influence of a target Doppler frequency, reception signals having different center frequencies, that is, reception signals having different bands are separated, and then multiplied with a window function to be integrated (combined) in order to suppress side lobes generated due to cross-correlation of reception signals having different bands.

Since such conventional radar apparatuses are premised on that there is no influence of the target Doppler frequency, such conventional radar apparatuses are capable of coherently integrating reception signals of different center frequencies, have a high ranging resolution, and are capable of suppressing side lobes generated by cross-correlation by multiplying a window function.

CITATION LIST

Non-Patent Literature

Non-Patent Literature 1: XiZeng Dai, Jia Xu, Chunmao Ye, Ying-Ning Peng", Low-sidelobe HRR profiling based on the FDLFM-MIMO radar", APSAR 2007. 1st Asian and Pacific Conference

SUMMARY OF INVENTION

Technical Problem

However, conventional radar apparatuses have a disadvantage that side lobes, which are generated due to cross-correlation of reception signals having different bands, increase in a case where there is an influence of a target Doppler frequency. Moreover, in a case where there is an influence of a target Doppler frequency, for example as described in a document: Merrill I. Skolnik, "Radar Handbook, Third Edition", MacGraw-Hill companies., 2008., there is a disadvantage in that ranging cannot be performed correctly since the position of a pulse-compressed signal, that is, the range over which a reception signal is integrated deviates from the target relative range. There is another disadvantage that the phase of a pulse-compressed signal differs depending on the transmission frequency since the transmission frequency is different for each transmission radar, and thus coherent integration cannot be performed, thereby deteriorating detection performance.

The present invention has been made to solve such a disadvantage, and an object of the invention is to provide a radar apparatus capable of improving the target detection performance even in a case where there is an influence of a target Doppler frequency.

Solution to Problem

A radar apparatus according to the present invention includes: a plurality of transmission radars for radiating transmission signals each having different frequencies generated using a pulse signal and an intra-pulse modulation signal for modulating the pulse signal; a reception unit for converting reception signals of the transmission signals reflected back by a target into reception video signals; a range-direction frequency domain converting unit for converting the reception video signals into signals based on a range direction frequency; a hit-direction frequency domain converting unit for converting the signals based on the range direction frequency into signals based on a velocity and a range direction frequency so that a target Doppler frequency belongs to a same velocity bin number independently of variations in the frequencies of the transmission signals; a correlation unit for performing correlation processing on the signals output from the hit-direction frequency domain converting unit using a reference signal corresponding to a velocity corresponding to transmission frequencies of the plurality of transmission radars and a velocity bin number and generating signals based on the velocity separated for each of the transmission frequencies of the plurality of transmission radars and a range after correlation; an integration unit for integrating the signals output from the correlation unit with a target arrival angle candidate and generating a band-synthesized signal based on the velocity and the range after correlation; a candidate target detecting unit for detecting a candidate target on the basis of signal intensity from the signals output from the integration unit; and a target relative velocity/relative range/arrival angle calculating unit for calculating a relative velocity, a relative range, and an arrival angle of the candidate target.

Advantageous Effects of Invention

In a radar apparatus according to the present invention, a range-direction frequency domain converting unit converts reception video signals into signals based on a range direction frequency, a hit-direction frequency domain converting unit performs conversion into hit-direction frequency domains so that the target Doppler frequency belongs to the same velocity bin number independently of variations in the frequency of the transmission signals, and the correlation unit generates signals based on the velocity separated for each of the transmission frequencies and a range after correlation. An integration unit generates band-synthesized signals based on the velocity and a range after correlation, and a candidate target detecting unit detects a candidate target on the basis of the signal intensity from the output signals of the integration unit. A target relative velocity/relative range/arrival angle calculating unit calculates the relative velocity, the relative range, and the arrival angle of the candidate targets. As a result, even in a case where there is an influence of a target Doppler frequency, the target detection performance can be improved.

BRIEF DESCRIPTION OF DRAWINGS

FIG. 8 is a flowchart illustrating exemplary signal processing of the radar apparatus according to the first embodiment of the invention.

FIG. 20A, FIG. 20B, and FIG. 20C are explanatory graphs illustrating spectra of signals based on the velocity at the target relative range of each transmission frequency and a range after correlation.

DESCRIPTION OF EMBODIMENTS

To describe the present invention further in detail, embodiments for carrying out the present invention will be described below with reference to the accompanying drawings.

First Embodiment

Figure 1:
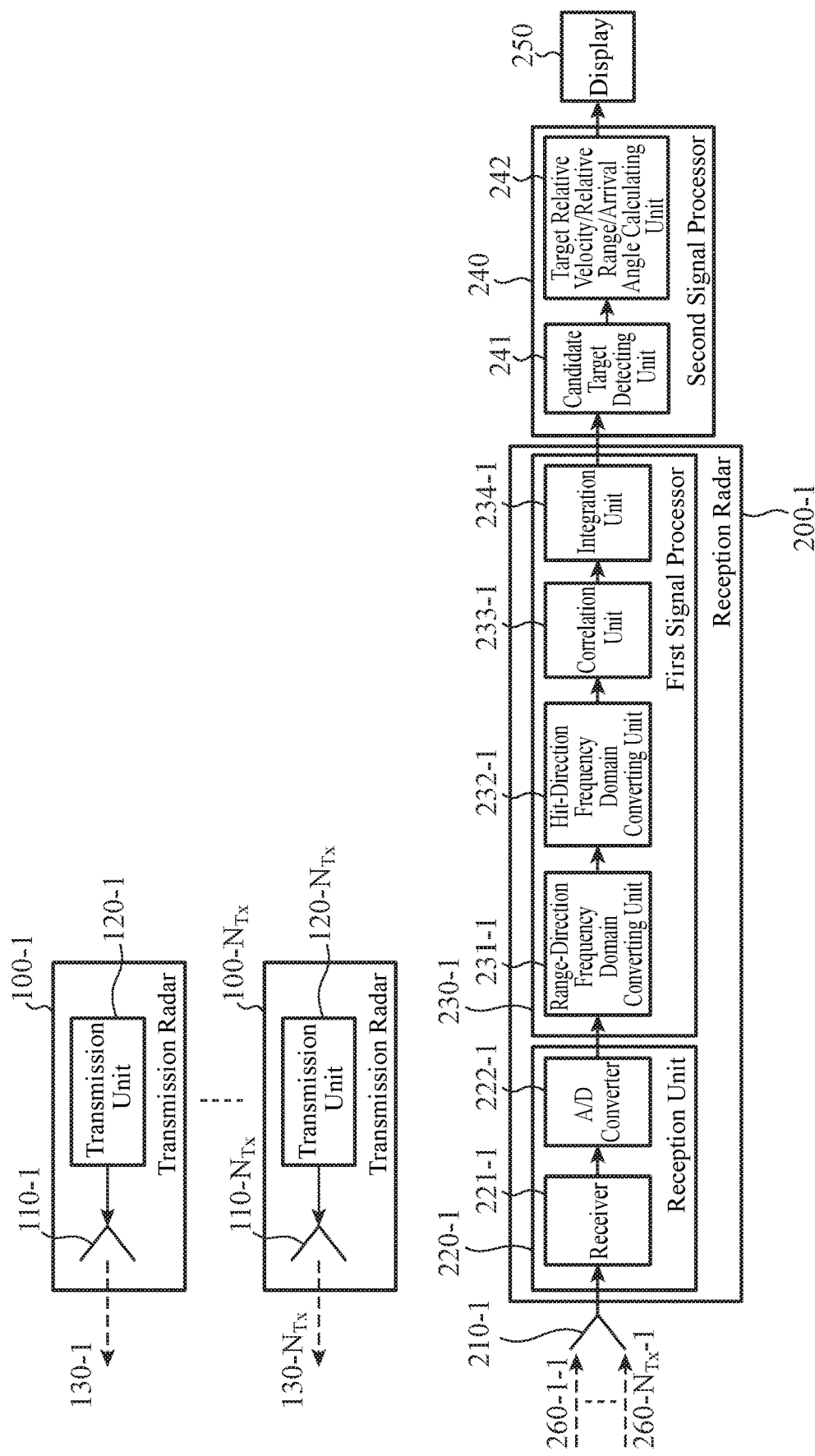
FIG. 1 is a configuration diagram illustrating a radar apparatus according to a first embodiment of the invention.

FIG. 1 is a configuration diagram of a radar apparatus according to the present embodiment.

Figure 2:
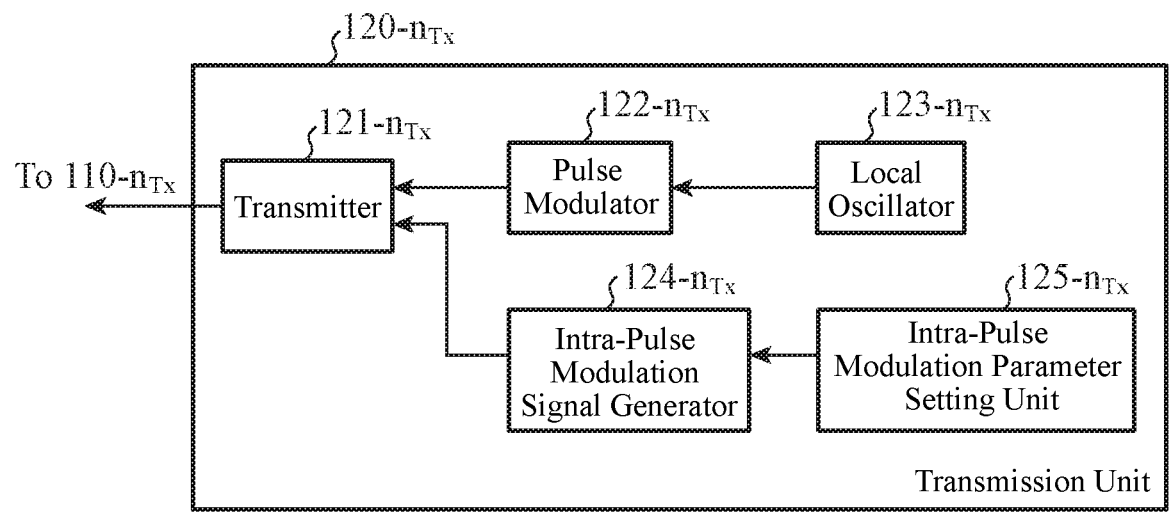
FIG. 2 is a configuration diagram illustrating a transmission unit of the radar apparatus according to the first embodiment of the invention.

As illustrated in the figure, the radar apparatus according to the present embodiment includes transmission radars 100-$n_{Tx}$ (transmission radar number $n_{Tx}$, in the case of $N_{Tx}$ transmission radars, $n_{Tx}$=1, 2, . . . , $N_{Tx}$), a reception radar 200-1 (reception radar number $n_{Rx}$, in the case of $N_{Rx}$ reception radars, $n_{Rx}$=1, 2, . . . , $N_{Rx}$, in the first embodiment the case of $N_{Rx}$=1 will be described), a second signal processor 240, and a display 250. A transmission radar 100-$n_{Tx}$ includes an antenna 110-$n_{Tx}$ and a transmission unit 120-$n_{Tx}$. As illustrated in FIG. 2, a transmission unit 120-$n_{Tx}$ includes a transmitter 121-$n_{Tx}$, a pulse modulator 122-$n_{Tx}$, a local oscillator 123-$n_{Tx}$, an intra-pulse modulation signal generator 124-$n_{Tx}$, an intra-pulse modulation parameter setting unit 125-$n_{Tx}$.

The reception radar 200-1 includes an antenna 210-1, a reception unit 220-1, and a first signal processor 230-1. The reception unit 220-1 includes a receiver 221-1 and an A/D converter 222-1. The first signal processor 230-1 includes a range-direction frequency domain converting unit 231-1, a hit-direction frequency domain converting unit 232-1, a correlation unit 233-1, and an integration unit 234-1. The second signal processor 240 includes a candidate target detecting unit 241 and a target relative velocity/relative range/arrival angle calculating unit 242.

The transmission radars 100-$n_{Tx}$ radiate transmission signals of different frequencies, each generated using a pulse signal and an intra-pulse modulation signal that frequency-modulates the pulse signal. The antennas 110-$n_{Tx}$ radiate signals each transmitted from the transmission units 120-$n_{Tx}$ as transmission signals 130-$n_{Tx}$. The transmitter 121-$n_{Tx}$ in the transmission unit 120-$n_{Tx}$ is a processing unit that generates a transmission signal on the basis of a pulse signal from the pulse modulator 122-$n_{Tx}$ and an intra-pulse modulation signal from the intra-pulse modulation signal generator 124-$n_{Tx}$. The pulse modulator 122-$n_{Tx}$ is a processing unit that generates a pulse signal on the basis of a local oscillation signal from the local oscillator 123-$n_{Tx}$. The local oscillator 123-$n_{Tx}$ is a processing unit that generates a local oscillation signal on the basis of a preset cycle and a preset pulse width. The intra-pulse modulation signal generator 124-$n_{Tx}$ is a processing unit that generates an intra-pulse modulation signal for frequency-modulating the pulse signal. The intra-pulse modulation parameter setting unit 125-$n_{Tx}$ is a processing unit that sets a parameter for modulating the inside of a pulse with predetermined modulation contents. The setting contents of the intra-pulse modulation parameter setting unit 125-$n_{Tx}$ are shared by the radar apparatus.

The reception radar 200-1 is a processing unit that receives transmission signals having been radiated from the transmission radars 100-$n_{Tx}$ and reflected back by a target. The antenna 210-1 of the reception radar 200-1 is for receiving reception signals 260-1-1 to 260-$N_{Tx}$-1. The receiver 221-1 in the reception unit 220-1 is a processing unit that converts the reception signals received by the antenna 210-1 into reception video signals, and the A/D converter 222-1 is a processing unit that performs A/D conversion on the reception video signals output from the receiver 221-1. The range-direction frequency domain converting unit 231-1 in the first signal processor 230-1 is a processing unit that converts the reception video signals from the reception unit 220-1 into signals based on the range direction frequency. The hit-direction frequency domain converting unit 232-1 is a processing unit that converts the signals based on the range direction frequency converted by the range-direction frequency domain converting unit 231-1 into signals based on the velocity and the range direction frequency so that the target Doppler frequency belongs to the same velocity bin number independently of variations in the frequency of the transmission signals. The correlation unit 233-1 is a processing unit that performs correlation processing on the output signals of the hit-direction frequency domain converting unit 232-1 using a reference signal corresponding to the velocity corresponding to the transmission frequencies of the transmission radars 100-$n_{Tx}$ and velocity bin numbers and generates signals based on the velocity separated for each of the transmission frequencies of the transmission radars 100-$n_{Tx}$ and a range after correlation. The integration unit 234-1 is a processing unit that integrates the output signals of the correlation unit 233-1 with target arrival angle candidates and generates band-synthesized signals based on the velocity and a range after correlation.

The candidate target detecting unit 241 in the second signal processor 240 is a processing unit that detects candidate targets on the basis of the signal intensity from the output signals of the integration unit 234-1. The target relative velocity/relative range/arrival angle calculating unit 242 is a processing unit that calculates the relative velocity, the relative range, and the arrival angle of the candidate targets. The display 250 is a display device for displaying the signal processing result.

Figure 3:
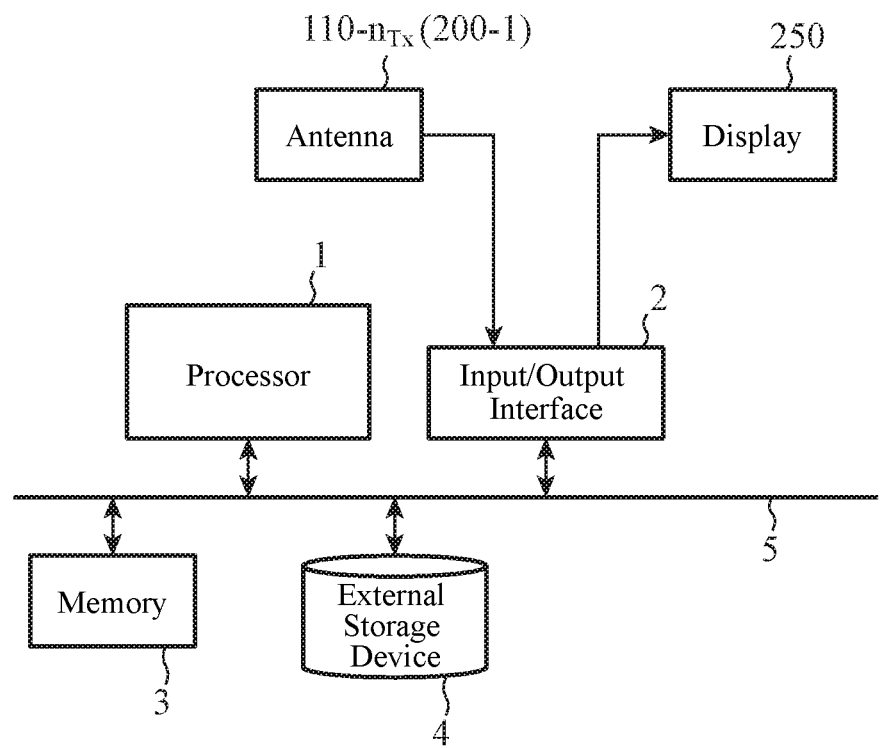
FIG. 3 is a block diagram illustrating a hardware configuration example of the laser radar apparatus according to the first embodiment of the invention.

Next, an example of a hardware configuration for implementing the radar apparatus as described above will be described with reference to FIG. 3.

The radar apparatus includes a processor 1, an input/output interface 2, a memory 3, an external storage device 4, and a signal path 5. The processor 1 implements the functions of the transmission radars 100-$n_{Tx}$, the reception radar 200-1, and the second signal processor 240 in the radar apparatus. The input/output interface 2 is an interface of transmission/reception signals from the antennas 110-$n_{Tx}$ in the transmission radars 100-$n_{Tx}$ and the antenna 210-1 in the reception radar 200-1, and is also an interface of an output signal to the display 250. The memory 3 is a storing unit such as a ROM and a RAM used as a program memory for storing various programs for implementing the radar apparatus of the present embodiment, a work memory used when the processor 1 performs data processing, a memory in which signal data is developed, and the like. The external storage device 4 is used for accumulating various types of data such as various setting data or signal data of the processor 1. As the external storage device 4, for example, a volatile memory such as an SDRAM, an HDD, or an SSD can be used. Programs including the OS (operating system) and various types of data such as various setting data and signal data can be accumulated. Note that the data in the memory 3 can also be accumulated in the external storage device 4. The signal path 5 is a bus for connecting the processor 1, the input/output interface 2, the memory 3 and the external storage device 4 to each other.

Moreover, a plurality of processors 1 or a plurality of memories 3 may be included, and the plurality of processors 1 and the plurality of memories 3 may perform signal processing in cooperation.

Furthermore, at least one of the transmission radars 100-$n_{Tx}$, the reception radar 200-1, and the second signal processor 240 may be configured by dedicated hardware.

Next, the operation of the radar apparatus according to the first embodiment will be described.

Figure 4:
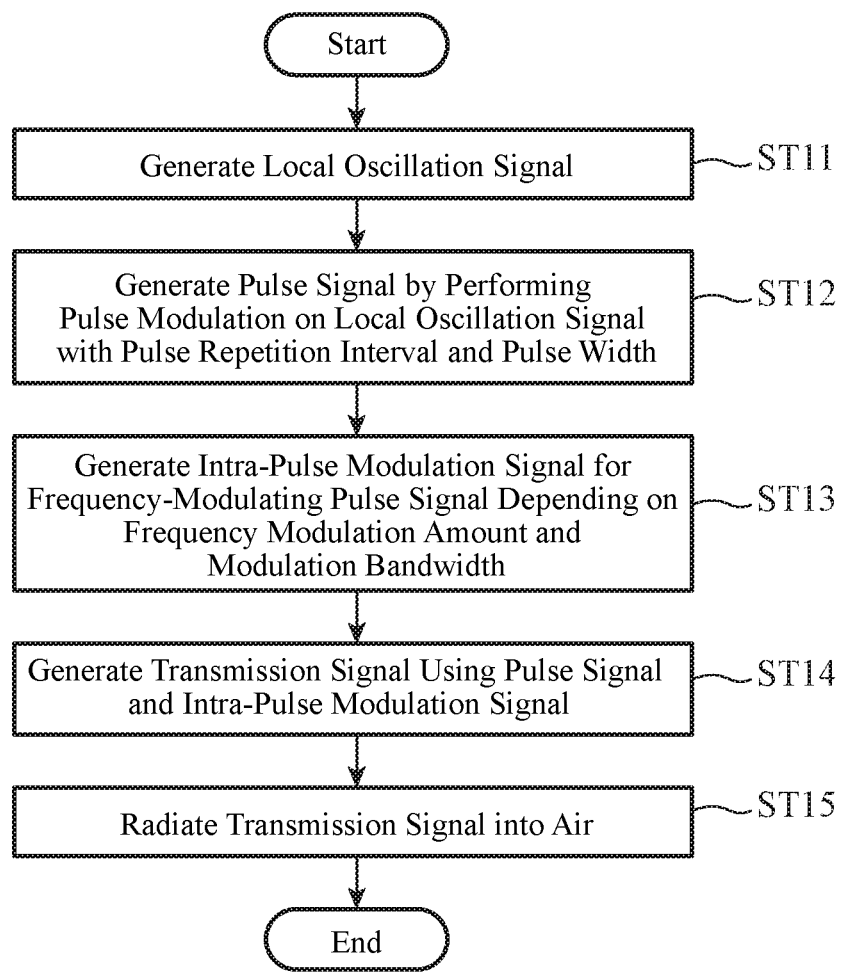
FIG. 4 is a flowchart illustrating exemplary transmission operation of a transmission radar of the radar apparatus according to the first embodiment of the invention.

First, the transmission operation of a transmission radar 100-$n_{Tx}$ will be described with reference to FIG. 4.

Here, in the transmission radars 100-$n_{Tx}$, antennas 110-$n_{Tx}$ are only required to be arranged in a distributed manner, and antenna elements may be arranged in a distributed manner. That is, implementation may be made by a multiple-input and multiple-output (MIMO) radar and digital beam forming (DBF).

In the transmission operation of the transmission radar 100-$n_{Tx}$, the local oscillator 123-$n_{Tx}$ generates a local oscillation signal $L_0(t)$ and outputs the local oscillation signal to the pulse modulator 122-$n_{Tx}$ as expressed by Equation (1) (step ST11).

$$L_0(t) = A_L \exp(j(2\pi f_0 t + \phi_0))$$

$$(0 \leq t < T_{obs}) \quad (1)$$

Where, $A_L$ denotes the amplitude of the local oscillation signal, $\phi_0$ denotes the initial phase of the local oscillation signal, $f_0$ denotes the center transmission frequency, and $T_{obs}$ denotes observation time.

Next, the pulse modulator 122-$n_{Tx}$ performs pulse modulation on the local oscillation signal $L_0(t)$ from the local oscillator 123-$n_{Tx}$ according to Equation (2) on the basis of information indicating a preset pulse repetition interval $T_{pri}$ and a preset pulse width $T_0$ to generate pulse signals $L_{pls}(h, t)$ and outputs the pulse signals to the transmitter 121-$n_{Tx}$ (step ST12).

$$L_{pls}(h, t) = \begin{cases} A_L \exp(j(2\pi f_0 t + \phi_0)), & hT_{pri} \leq t < hT_{pri} + T_0 \\ 0, & \text{otherwise} \end{cases} \quad (2)$$

$$(h = 0, 1, \ldots, H-1)$$

Here, h denotes a hit number and H denotes the number of hits (expressed by Equation (3), where floor (X) is an integer obtained by rounding down decimal places of a variable X).

$$H = \text{floor}\left(\frac{T_{obs}}{T_{pri}}\right) \quad (3)$$

The intra-pulse modulation parameter setting unit 125-$n_{Tx}$ sets a predetermined frequency modulation amount $B_{nTx}$ and a modulation bandwidth $\Delta B_{nTx}$. The intra-pulse modulation parameter setting unit 125-$n_{Tx}$ outputs an intra-pulse modulation parameter to the intra-pulse modulation signal generator 124-$n_{Tx}$.

Figure 5:
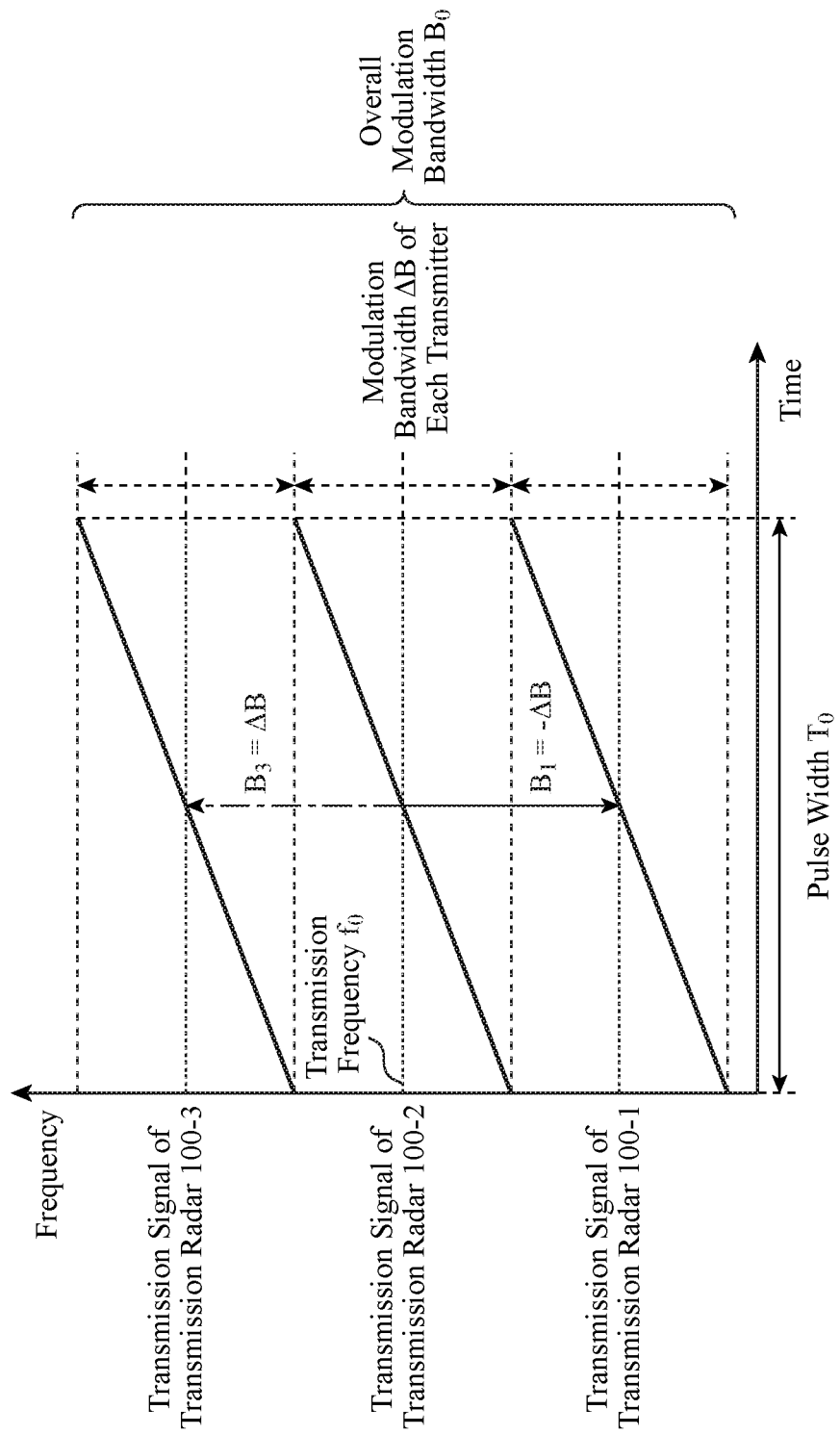
FIG. 5 is an explanatory diagram illustrating transmission frequencies and a modulation bandwidth of transmission radars of the radar apparatus according to the first embodiment of the invention.

The intra-pulse modulation signal generator 124-$n_{Tx}$ generates an intra-pulse modulation signal $L_{chp}(n_{Tx}, h, t)$ for frequency-modulating the pulse signals using the frequency modulation amount $B_{nTx}$ and the modulation bandwidth $\Delta B_{nTx}$ output from the intra-pulse modulation parameter setting unit 125-$n_{Tx}$ according to Equation (4) and outputs the intra-pulse modulation signal to the transmitter 121-$n_{Tx}$ (step ST13). FIG. 5 illustrates the relationship between the frequency modulation amount $B_{nTx}$ and the modulation bandwidth $\Delta B_{nTx}$ of each transmission radar. In the first embodiment, an effect in a case where the modulation bandwidths of the respective transmission radars are the same will be described. The frequency modulation amount $B_2$ is zero.

$$L_{chp}(n_{Tx}, h, t) = \quad (4)$$

$$\begin{cases} A_L \exp\left(j 2\pi \left(B_{nTx} t + \frac{\Delta B_{nTx}}{2T_0} t^2\right)\right), & hT_{pri} \leq t < hT_{pri} + T_0 \\ 0, & \text{otherwise} \end{cases}$$

$$(h = 0, 1, \ldots, H-1)$$

$$(n_{Tx} = 1, 2, \ldots, N_{Tx})$$

Transmitter 121-$n_{Tx}$ generates a transmission signal $T_x(n_{Tx}, h, t)$ using the pulse signal $L_{pls}(h, t)$ and the intra-pulse modulation signal $L_{chp}(n_{Tx}, h, t)$ according to Equation (5) and outputs the transmission signal to the antenna 110-$n_{Tx}$ (step ST14).

$$Tx(n_{Tx}, h, t) = L_{pls}(h, t)L_{chp}(n_{Tx}, h, t) = \quad (5)$$

$$\begin{cases} A_L \exp\left(j\left\{2\pi\left[(f_0 + B_{nTx})t + \frac{\Delta B_{nTx}}{2T_0} t^2\right] + \phi_0\right\}\right), \\ hT_{pri} \leq t < hT_{pri} + T_0 \\ 0, \text{ otherwise} \end{cases}$$

$$(h = 0, 1, \ldots, H-1)$$

$$(n_{Tx} = 1, 2, \ldots, N_{Tx})$$

Then, the transmission signal $T_x(n_{Tx}, h, t)$ is radiated into the air from the antenna 110-$n_{Tx}$ (step ST15).

Figure 6:
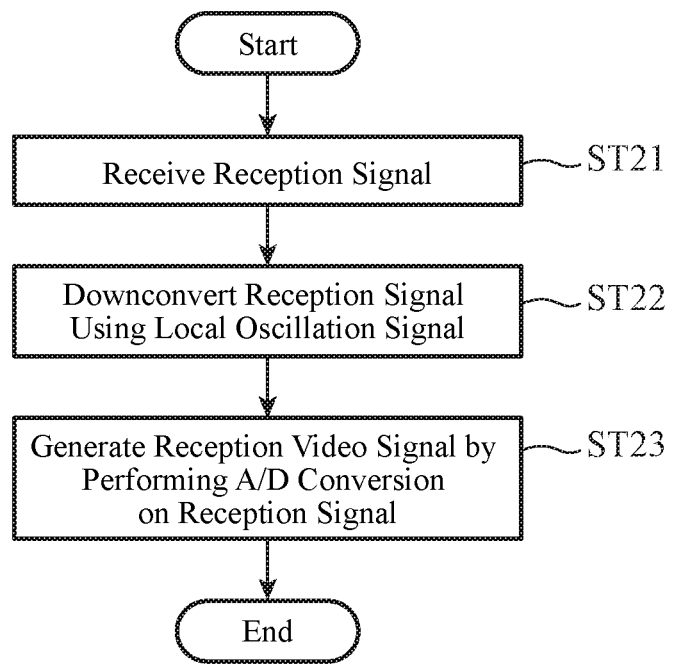
FIG. 6 is a flowchart illustrating exemplary reception operation of a reception unit of a reception radar of the radar apparatus according to the first embodiment of the invention.
Figure 7:
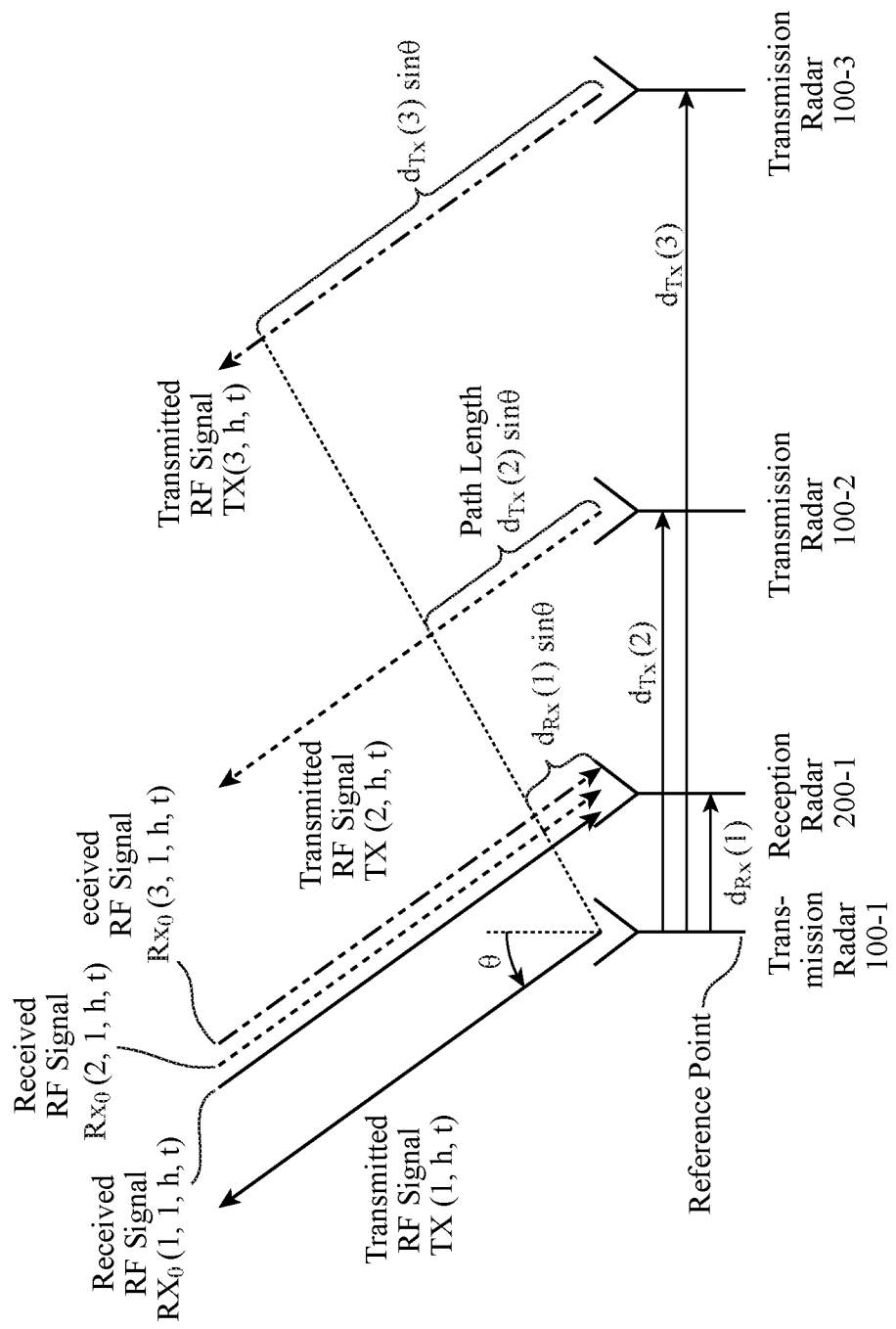
FIG. 7 is an explanatory diagram illustrating the positional relationship between transmission radars and the reception radar of the radar apparatus and a relationship between transmission signals and reception signals according to the first embodiment of the invention.

Next, the operation of the reception unit 220-1 in the reception radar 200-1 will be described using the flowchart of FIG. 6. In addition, the positional relationship among the transmission radars 100-$n_{Tx}$ and the reception radar 200-1 and the relationship between transmission signals and reception signals are illustrated in FIG. 7 where the number of transmission radars $N_{Tx}=3$ and the number of reception radars $N_{Rx}=1$, and description is given with reference to FIG. 7.

The transmission signal radiated into the air is reflected by a target and enters the antenna 210-1 as a reflection signal. The antenna 210-1 receives the incident reflection signal and outputs the reflection signal to the receiver 221-1 as a reception signal $Rx(n_{Rx}, h, t)$ of the reception radar 200-$n_{Rx}$ expressed by Equation (6) (step ST21). Here, $Rx_0(n_{Tx}, n_{Rx}, h, t)$ denotes a reception signal obtained by receiving, by the reception radar $200\text{-}n_{Rx}$, a reflection signal of the transmission radar $100\text{-}n_{Tx}$ and is expressed b r Equation (7), $A_R$ denotes the amplitude of the reflection signal, $R_0$ denotes the initial target relative range, v denotes the target elative velocity, θ denotes the target angle, c denotes the speed of light, and t' denotes time within one hit.

$$Rx(n_{Rx}, h, t) = \sum_{n_{Tx}=1}^{N_{Tx}} Rx_0(n_{Tx}, n_{Rx}, h, t) \quad (6)$$

$(h = 0, 1, \ldots, H-1)$ $(n_{Rx} = 1, 2, \ldots, N_{Rx})$ $Rx_0(n_{Tx}, n_{Rx}, h, t) =$ $$\begin{cases} A_R \exp\left(j\left\{2\pi\left[(f_0 + B_{n_{Tx}})\left(t' - \frac{2(R_0 - vt)}{c}\right) + \frac{\Delta B_{n_{Tx}}}{2T_0}\left(t' - \frac{2(R_0 - vt)}{c}\right)^2\right] + \phi_0\right\}\right) \\ \exp(j\phi_{Tx}(n_{Tx}))\exp(j\phi_{Rx}(n_{Tx}, n_{Rx})), hT_{pri} \leq t < hT_{pri} + T_0 \\ 0, \text{otherwise} \end{cases} \quad (7)$$

$(h = 0, 1, \ldots, H-1)$ $(n_{Tx} = 1, 2, \ldots, N_{Tx})$ $(n_{Rx} = 1, 2, \ldots, N_{Rx})$ Here, a phase difference $\phi_{Tx}(n_{Tx})$ of the transmission radar $100\text{-}n_{Tx}$ is expressed by Equation (8), and a phase difference $\phi_{Rx}(n_{Tx}, n_{Rx})$ of the reception radar $200\text{-}1$ is expressed by Equation (9).

$$\phi_{Tx}(n_{Tx}) = 2\pi(f_0 + B_{n_{Tx}})\frac{d_{Tx}(n_{Tx})\sin\theta}{c} \quad (8)$$

$(n_{Tx} = 1, 2, \ldots, N_{Tx})$ $$\phi_{Rx}(n_{Tx}, n_{Rx}) = 2\pi(f_0 + B_{n_{Tx}})\frac{d_{Rx}(n_{Rx})\sin\theta}{c} \quad (9)$$

$(n_{Tx} = 1, 2, \ldots, N_{Tx})$ $(n_{Rx} = 1, 2, \ldots, N_{Rx})$

The receiver 221-1 downconverts the reception signal $Rx(n_{Tx}, h, t)$ input from the antenna 210-1 using the local oscillation signal $L_0(t)$ expressed by Equation (1) and after passage through a band filter (not illustrated), performs amplification and phase detection to generate a reception video signal $V'(n_{Rx}, h, t)$ of the reception radar $200\text{-}n_{Rx}$ expressed by Equation (10), and outputs the reception video signal to the A/D converter 222-1 (step ST22). Here. $V_0'(n_{Tx}, n_{Rx}, h, t)$ denotes a reception video signal generated by the reception radar $200\text{-}n_{Rx}$ from a reception video signal of the transmission radar $100\text{-}n_{Tx}$ expressed by Equation (11), and $A_v$ denotes the amplitude of the reception video signal.

$$V'(n_{Rx}, h, t) = \sum_{n_{Tx}=1}^{N_{Tx}} V_0'(n_{Tx}, n_{Rx}, h, t) = Rx(n_{Rx}, h, t)L_0^*(t) \quad (10)$$

$(h = 0, 1, \ldots, H-1)$ $(n_{Rx} = 0, 1, \ldots, N_{Rx}-1)$ $$V_0'(n_{Tx}, n_{Rx}, h, t) = Rx_0(n_{Tx}, n_{Rx}, h, t)L_0^*(t) = \quad (11)$$

$$\begin{cases} A_V \exp\left(j2\pi\left[B_{n_{Tx}}t' - (f_0 + B_{n_{Tx}})\frac{2(R_0 - vt)}{c} + \frac{\Delta B_{n_{Tx}}}{2T_0}\left(t' - \frac{2(R_0 - vt)}{c}\right)^2\right]\right) \\ \exp(j\phi_{Tx}(n_{Tx}))\exp(j\phi_{Rx}(n_{Tx}, n_{Rx})), hT_{pri} \leq t < hT_{pri} + T_0 \\ 0, \text{otherwise} \end{cases}$$

$(h = 0, 1, \ldots, H-1)$ $(n_{Tx} = 1, 2, \ldots, N_{Tx})$ $(n_{Rx} = 1, 2, \ldots, N_{Rx})$ The A/D converter 222-1 performs A/D conversion on the reception video signal $V'(n_{Rx}, h, t)$ of the reception radar $200\text{-}n_{Rx}$ input from the receiver 221-1 to generate a reception video signal $V(n_{Rx}, h, m)$ of the reception radar $200\text{-}n_{Rx}$ expressed by Equation (12) and outputs the reception video signal to the first signal processor 230-1 (step ST23). Here, $V_0(n_{Tx}, n_{Rx}, h, m)$ denotes a reception video signal obtained by A/D-converting, by the reception radar $200\text{-}n_{Rx}$, the reception video signal of the transmission radar $100\text{-}n_{Tx}$ expressed by Equation (13), m denotes the sampling number in a pulse repetition interval (PRI), and M in a PRI denotes the number of samples.

$$V(n_{Rx}, h, m) = \sum_{n_{Tx}=1}^{N_{Tx}} V_0(n_{Tx}, n_{Rx}, h, m) \quad (12)$$

$(m = 0, 1, \ldots, M-1)$ $(h = 0, 1, \ldots, H-1)$ $(n_{Rx} = 1, 2, \ldots, N_{Rx})$ $$V_0(n_{Tx}, n_{Rx}, h, m) = \quad (13)$$

$$\begin{cases} A\exp(j2\pi B_{n_{Tx}}m\Delta t) \\ \exp\left(-j2\pi(f_0 + B_{n_{Tx}})\frac{2(R_0 - v(hT_{pri} + m\Delta t))}{c}\right) \\ \exp\left(j2\pi\frac{\Delta B_{n_{Tx}}}{2T_0}\left(m\Delta t - \frac{2(R_0 - v(hT_{pri} + m\Delta t))}{c}\right)^2\right) \\ \exp(j\phi_{Tx}(n_{Tx}))\exp(j\phi_{Rx}(n_{Tx}, n_{Rx})), \\ hT_{pri} \leq t < hT_{pri} + T_0 \\ 0, \text{otherwise} \end{cases}$$

$(m = 0, 1, \ldots, M-1)$ $(h = 0, 1, \ldots, H-1)$ $(n_{Tx} = 1, 2, \ldots, N_{Tx})$ $(n_{Rx} = 1, 2, \ldots, N_{Rx})$ The signal processing of the first signal processor 230-1 will be described with reference to the flowchart of FIG. 8. In the flowchart of FIG. 8, step ST31 represents the processing of the range-direction frequency domain converting unit 231-1, step ST32 represents the processing of the hit-direction frequency domain converting unit 232-1, step ST33 represents the processing of the correlation unit 233-1, and step ST34 represents the processing of the integration unit 234-1. That is, in step ST31, the range-direction frequency domain converting unit 231-1 performs frequency domain conversion on the reception video signal in the range direction to convert to the range-direction frequency domain, and generates a signal based on the range direction frequency. In step ST32, the hit-direction frequency domain converting unit 232-1 converts the signal based on the range direction frequency to the frequency domain depending on a transmission frequency and a modulation domain of each of the transmission radars, and generates a signal based on the velocity and the range direction frequency. In step ST33, the correlation unit 233-1 performs correlation processing on the signal based on the velocity and the range direction frequency using a reference signal, and generates a signal based on the velocity separated for each transmission frequency of each of the transmission radars and a range after correlation. In step ST34, the integration unit 234-1 integrates the signal based on the velocity separated for each transmission frequency and a range after correlation, and generates a band-synthesized signal based on the velocity and a range after correlation.

The reception video signal $V(n_{Rx}, h, m)$ of the reception radar $200\text{-}n_{Rx}$ is input to the range-direction frequency domain converting unit 231-1 from the A/D converter 222-1.

In the reception video signal $V(n_{Rx}, h, m)$ of the reception radar $200\text{-}n_{Rx}$, signals modulated by the plurality of transmission radars at different center frequencies are superimposed as expressed by Equation (12). The first signal processor 230-1 is capable of improving the detection performance by separating the reception signals, which have been transmitted by the plurality of transmission radars, reflected back by a target, and then received, for each of the transmission radars and coherently integrating the reception signals.

First, conventional disadvantages will be described.

Figure 9A:
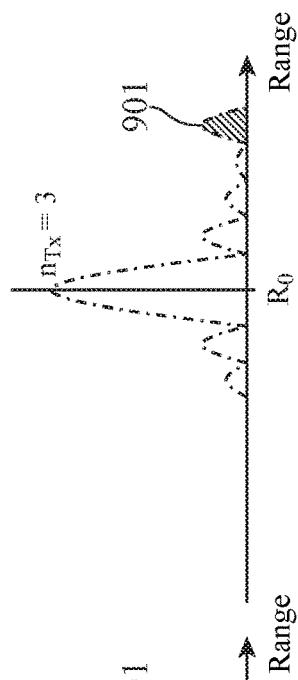
FIG. 9A, FIG. 9B, FIG. 9C, FIG. 9D, FIG. 9E, and FIG. 9F are explanatory graphs illustrating the influence of the Doppler frequency when pulse compression is performed on reception signals having different transmission frequencies.
Figure 9B:
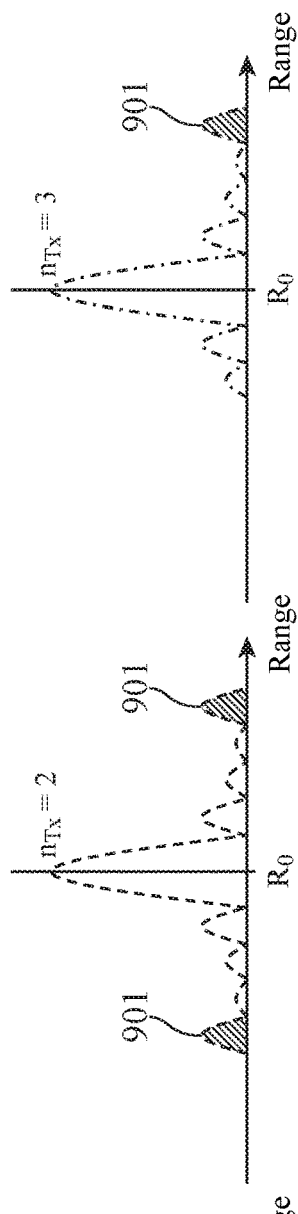
Figure 9C:
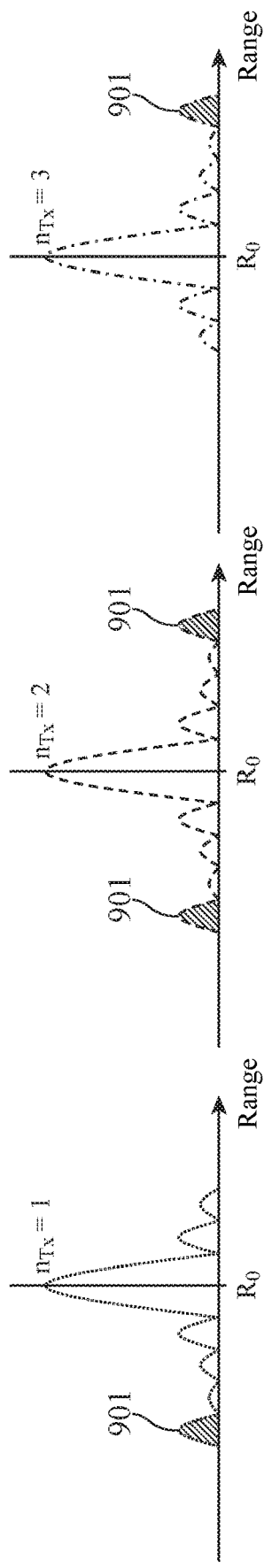

In general, in order to separate the reception signals for each of the transmission radars, a reference signal based on a modulation component of each of the transmission radars and a reception signal are correlated, that is, pulse compression is performed. FIGS. 9A, 9B, and 9C are graphs illustrating signals after correlation for each of the transmission radars when there is no influence of the Doppler frequency. A signal after correlation with the transmission radar 100-1 is illustrated in FIG. 9A, a signal after correlation with the transmission radar 100-2 is illustrated in FIG. 9B, and a signal after correlation with the transmission radar 100-3 is illustrated in FIG. 9C. As illustrated in FIGS. 9A to 9C, since bands are different for each of the transmission radars, the reception signals can be separated for each of the transmission radars. It can be seen that the integration is performed with respect to the target relative range. Furthermore, cross-correlation occurs due to the influence of adjacent bands, and thus side lobes are slightly increased (see a section 901 in the figure).

Figure 9D:
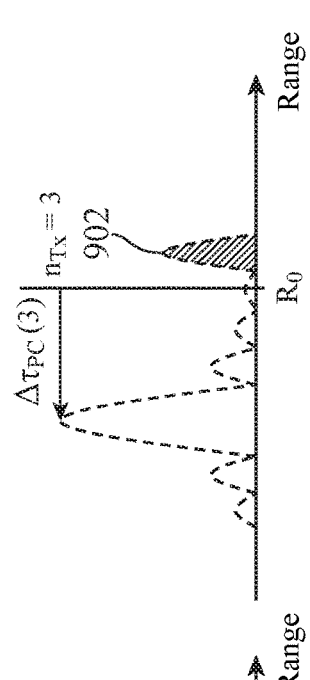
Figure 9E:
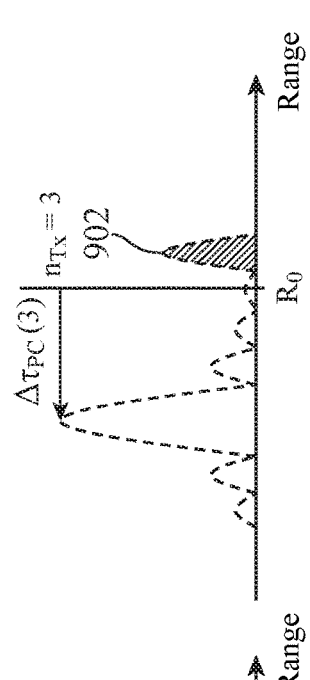
Figure 9F:
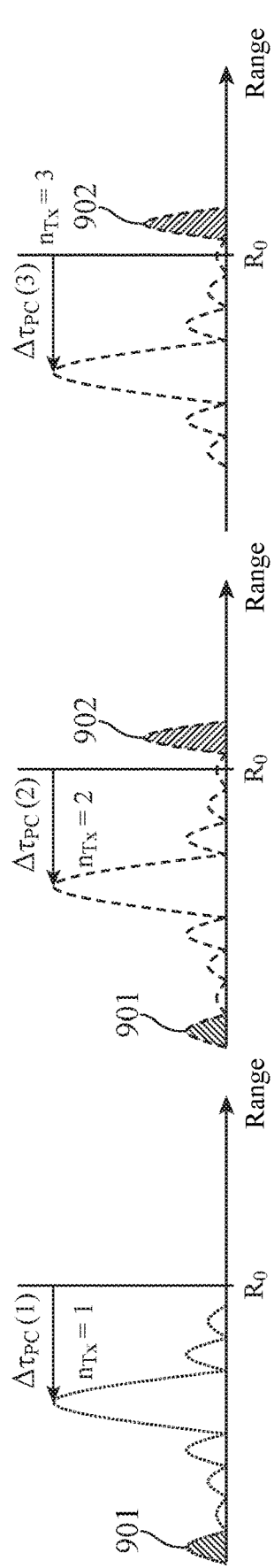

FIGS. 9D, 9E, and 9F are graphs illustrating signals after correlation for each of the transmission radars when there is an influence of the Doppler frequency. A signal after correlation with the transmission radar 100-1 is illustrated in FIG. 9D, a signal after correlation with the transmission radar 100-2 is illustrated in FIG. 9E, and a signal after correlation with the transmission radar 100-3 is illustrated in FIG. 9F. As illustrated in FIGS. 9D to 9F, since bands are different for each of the transmission radars, the reception signals can be separated for each of the transmission radars. However, there is a disadvantage in that the ranging performance is deteriorated since the target relative range is affected by the influence of the Doppler frequency, and compression to a range $\Delta R_{PC}(n_{Tx})$ occurs that is different from the target relative range by the amount expressed by Equation (14). In addition, as illustrated in the section 901, the side lobes are increased due to cross-correlation, and as illustrated in a section 902 in FIGS. 9E and 9F, the side lobes are further increased due to cross-correlation and the influence of the Doppler frequency.

Here, $\Delta\tau_{PC}(n_{Tx})$ denotes delay time corresponding to a range $\Delta R_{PC}(n_{Tx})$ different from the target relative range, and as for ±, the minus sign – is used in a case where modulation is in ascending order as illustrated in FIG. 5, and the plus sign + is used in a case of descending order. A term $f_d(n_{Tx})$ represents the transmission frequency of a transmission radar $100\text{-}n_{Tx}$ expressed by Equation (15) and is a Doppler frequency at the target relative velocity v.

$$\Delta\tau_{PC}(n_{Tx}) = \qquad (14)$$
$$\frac{2}{c}\Delta R_{PC}(n_{Tx}) = \mp f_d(n_{Tx})\frac{T_0}{\Delta B_{n_{Tx}}} = \mp(f_0 + B_{n_{Tx}})\frac{2v}{c}\frac{T_0}{\Delta B_{n_{Tx}}}$$

$$(n_{Tx} = 1, 2, \ldots, N_{Tx})$$

$$f_d(n_{Tx}) = (f_0 + B_{n_{Tx}})\frac{2v}{c} \qquad (15)$$

$$(n_{Tx} = 1, 2, \ldots, N_{Tx})$$

In a case where there is an effect of the Doppler frequency (there is a target relative velocity v), there is a disadvantage in that a phase difference $\Delta\varphi_{PC}(n_{Tx}, v)$ occurs (not in-phase) in the sampling time $m_\tau \Delta t$ at which the absolute value of the correlated signal separated for each transmission frequency reaches the maximum value as expressed by Equation (16), and thus the correlated signals separated for each transmission frequency are not coherently integrated (integration causes an integration loss and an unnecessary peak appears).

$$\Delta\phi_{PC}(n_{Tx}, v) = 2\pi B_{n_{Tx}}\left(m_\tau \Delta t - \frac{2(R_0 - vhT_{pri})}{c}\right) = \qquad (16)$$
$$2\pi B_{n_{Tx}}\left(\frac{2}{c}(R_0 - vhT_{pri} - \Delta R_{PC}(n_{Tx})) - \frac{2(R_0 - vhT_{pri})}{c}\right) =$$
$$2\pi B_{n_{Tx}}\left(\frac{2}{c}\left(R_0 - vhT_{pri} \pm f_0\frac{T_0}{\Delta B_{n_{Tx}}}v \pm B_{n_{Tx}}\frac{T_0}{\Delta B_{n_{Tx}}}v\right) - \frac{2(R_0 - vhT_{pri})}{c}\right) =$$
$$-2\pi B_{n_{Tx}}\frac{2v}{c}\left(\pm f_0\frac{T_0}{\Delta B_{n_{Tx}}} \pm B_{n_{Tx}}\frac{T_0}{\Delta B_{n_{Tx}}}\right) \cong \mp 2\pi f_0\frac{2v}{c}\frac{B_{n_{Tx}}}{\Delta B_{n_{Tx}}}T_0$$

$$(n_{Tx} = 1, 2, \ldots, N_{Tx})$$

Figure 10A:
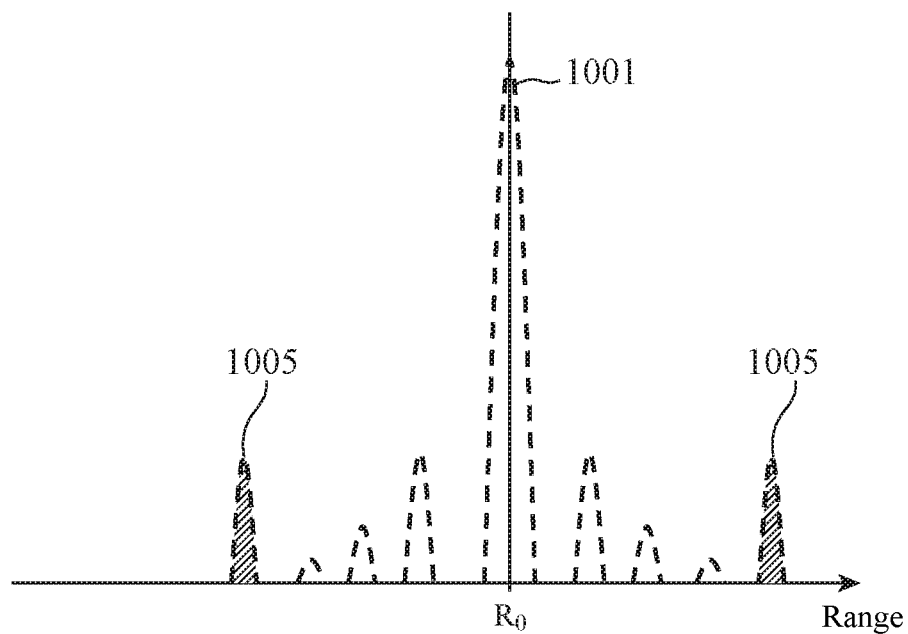
FIGS. 10A and 10B are explanatory graphs illustrating the influence of the Doppler frequency when signals after correlation for each transmission frequency are subjected to band synthesis.
Figure 10B:
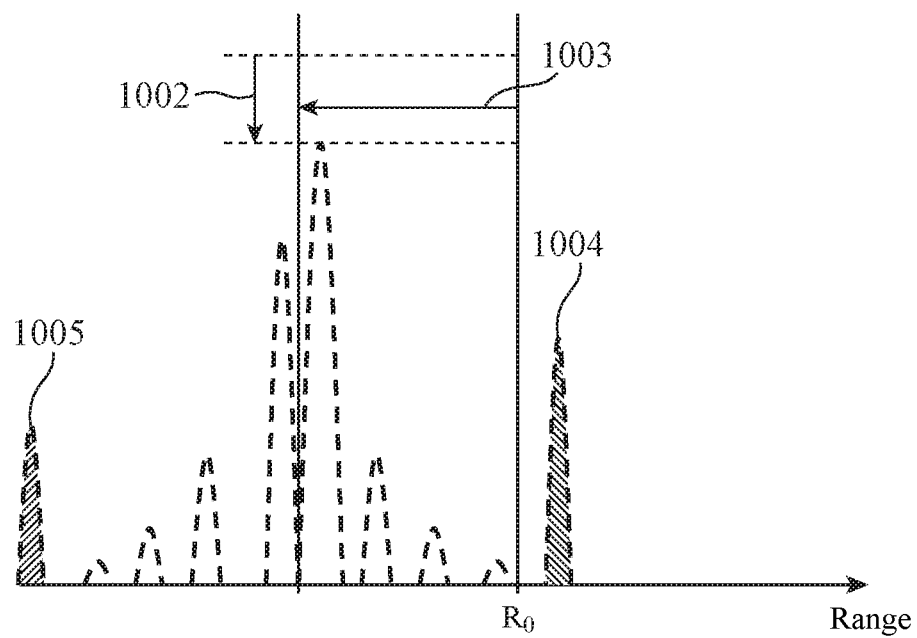

The influence of the Doppler frequency when band synthesis is performed is illustrated in FIG. 10. As illustrated in FIG. 10A, in a case where there is no influence of the Doppler frequency, signals in adjacent bands are coherently synthesized, power is increased, the detection performance is improved, and the range resolution is improved (see a section 1001 in the figure). On the other hand, there is a disadvantage in that in a case where there is an influence of the Doppler frequency, correlated signals in adjacent bands are out of phase as illustrated in FIG. 10B and that an integration loss occurs (see an arrow 1002 in the figure). In the case where there is an influence of the Doppler frequency, there is a disadvantage in that the compressed range is different from the target relative range (see an arrow 1003 in the figure). There is a disadvantage in that in addition to the cross-correlation between adjacent bands, an unnecessary peak rises due to the cross-correlation corresponding to the Doppler frequency, thus resulting in further rise of the side lobes (see a section 1004 in the figure). Note that in FIGS. 10A and 10B, a section 1005 indicates a portion where a side lobe rises due to cross-correlation.

Figure 11:
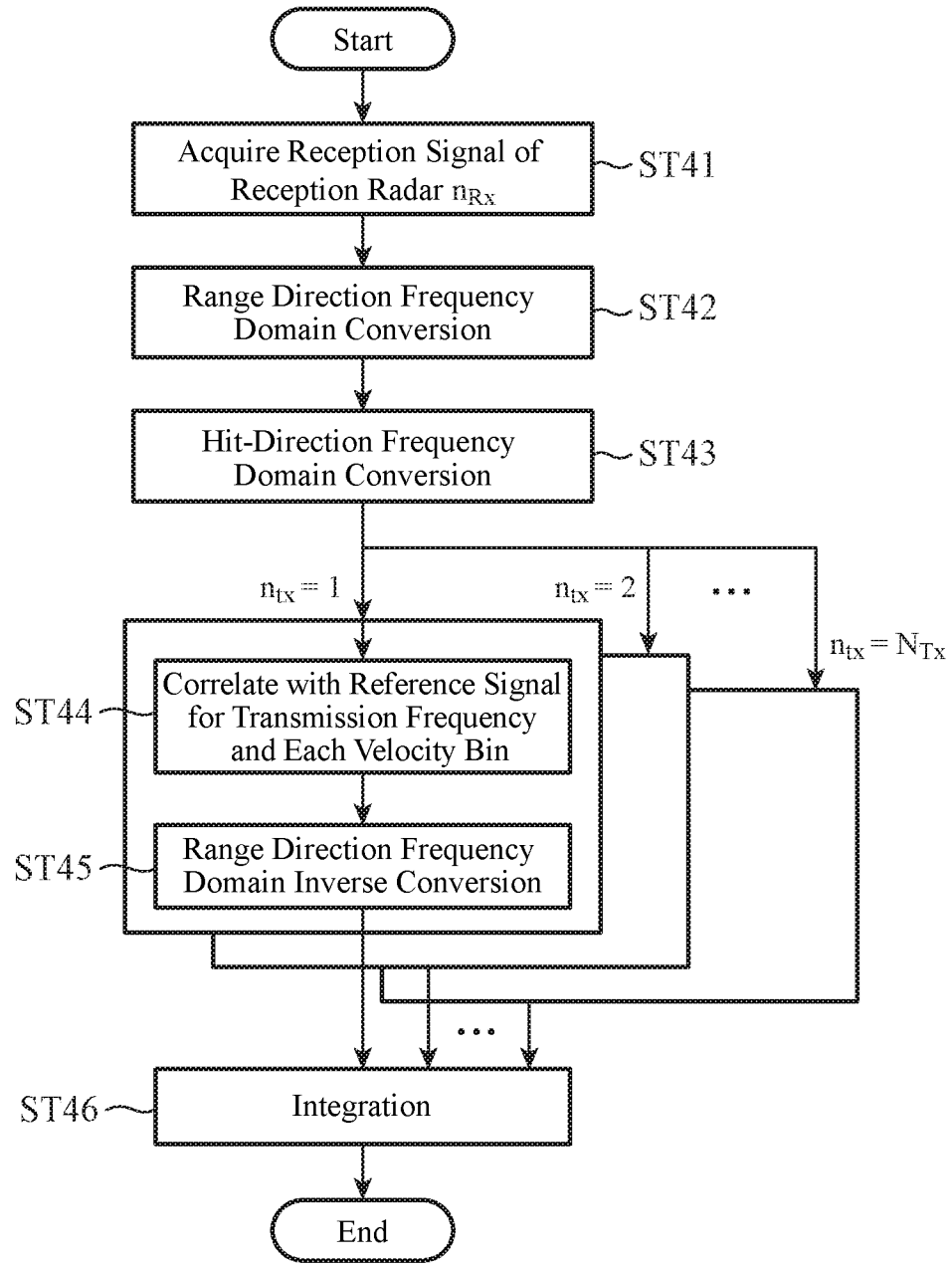
FIG. 11 is a flowchart illustrating signal processing in a first signal processor of the radar apparatus according to the first embodiment of the invention.

The first embodiment is configured for the purpose of solving the above disadvantages, and each of the processing units of the first signal processor 230-1 will be described below. FIG. 11 is a flowchart illustrating the operation of each of the processing units in the first signal processor 230-1.

Figure 13B:
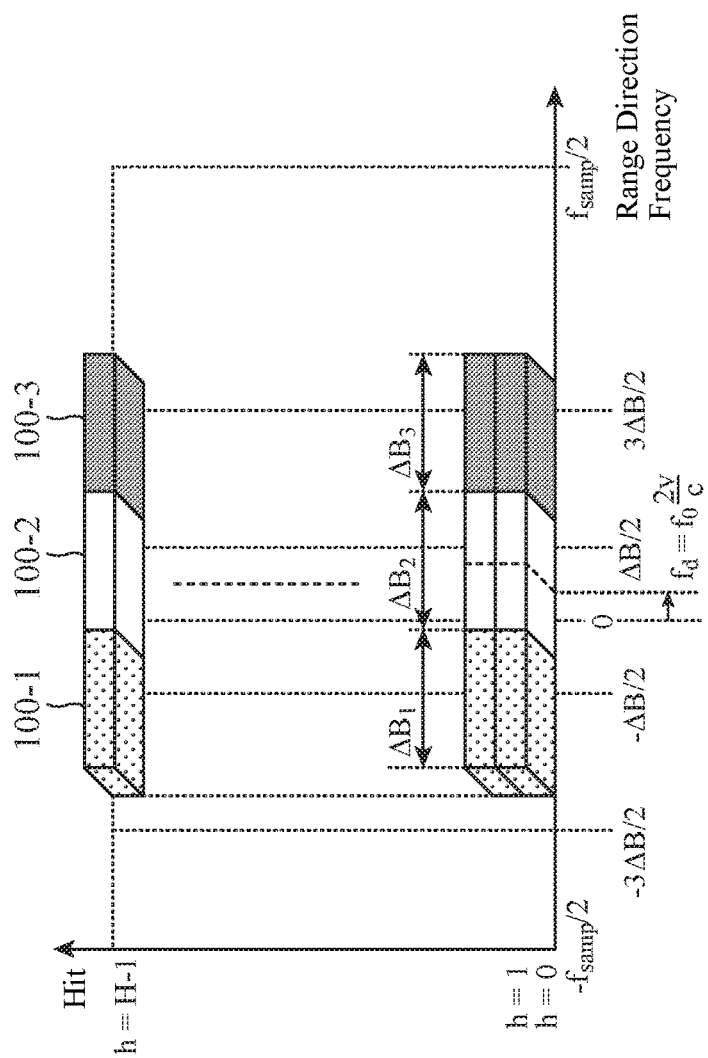
FIG. 13A and FIG. 13B are explanatory graphs illustrating the spectrum of signals based on a reception video signal and a range direction frequency.
Figure 13A:
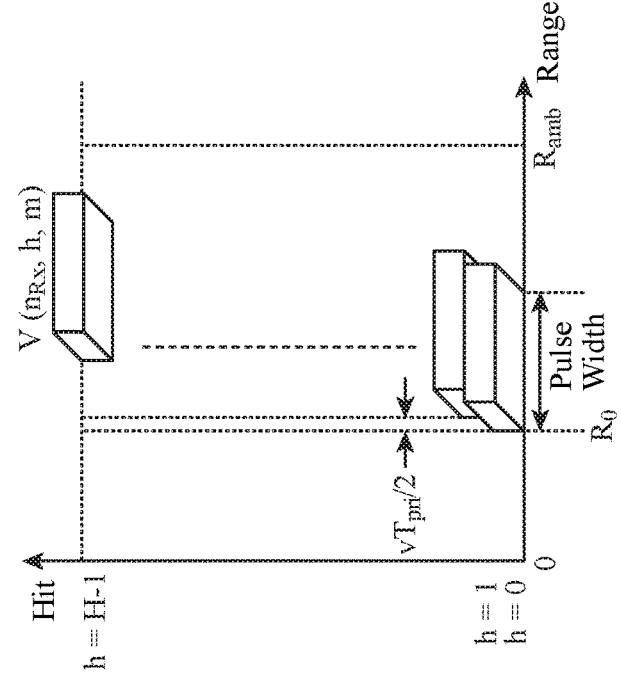

The range-direction frequency domain converting unit 231-1 acquires reception video signals $V(n_{Rx}, h, m)$ of the reception radar 200-$n_{Rx}$ (step ST41), and then performs Fast Fourier Transform (FFT) on the reception video signals $V(n_{Rx}, h, m)$ according to Equation (17) to generate signals $F_v(n_{Rx}, h, k_r)$ based on the range direction frequency (step ST42). In Equation (17), $f_{samp}$ denotes a sampling frequency, $M_{fft}$ denotes the number of FFT points in the range direction, and $k_r$ denotes a sampling number of a range direction frequency. A range direction frequency $f_{r,samp}(k_r)$ of a range direction frequency bin number of $k_r$ after conversion to a range direction frequency domain is expressed by Equation (18), and the sampling interval $\Delta f_{samp}$ of the range direction frequency domain is expressed by Equation (19).

signals are illustrated in FIG. 13A, and the signals based on the range direction frequency are illustrated in FIG. 13B. In FIG. 13A, values of ranges indicated by a dotted line is the initial target relative range $R_0$ and a range $R_{amb}$ that can be measured without ambiguity. Incidentally, $f_{samp}$ in FIG. 13B is a sampling frequency. In FIG. 13A it is explained that a range of reception changes by $vT_{pri}/2$ for each hit. On the other hand, in FIG. 13B it is explained that the amount of change is by the Doppler frequency corresponding to the target relative velocity v for every hit. Since the range-direction frequency domain converting unit 231-1 has generated the signals $F_v(n_{Rx}, h, k_r)$ based on the range direction frequency, it becomes possible to separate the signals by the range direction frequency for each of the transmission frequency bands of the transmission radars. In addition, in the reception video signals whose range direction is a time axis, there is a possibility that an integration loss occurs in a case of a moving target giving different range bins among hits, whereas in the signals based on the range direction $$F_V(n_{Rx}, h, k_r) = \sum_{m=0}^{M-1} V(n_{Rx}, h, m)\exp\left(-j2\pi\frac{m}{M_{fft}}k_r\right) \quad (17)$$

$$= \sum_{n_{Tx}=1}^{N_{Tx}}\left(\sum_{m=0}^{M-1} V_0(n_{Tx}, n_{Rx}, h, m)\exp\left(-j2\pi\frac{m}{M_{fft}}k_r\right)\right)$$

$$\cong \sum_{n_{Tx}=1}^{N_{Tx}}\left(\sum_{m=0}^{M-1}\left\{\begin{array}{l}\exp(j2\pi B_{n_{Tx}}m\Delta t)\exp\left(-j2\pi(f_0 + B_{n_{Tx}})\frac{2R_0}{c}\right) \\ \exp\left(j2\pi\left(f_0 + B_{n_{Tx}} + \frac{\Delta B_{n_{Tx}}}{2T_0}m\Delta t\right)\frac{2vhT_{pri}}{c}\right) \\ \exp\left(j2\pi\left((f_0 + B_{n_{Tx}})\frac{2v\Delta t}{c} + \frac{\Delta B_{n_{Tx}}}{2T_0}\left(m\Delta t^2 - 2\Delta t\frac{2(R_0 - vm\Delta t)}{c}\right) - \frac{k_r}{M_{fft}}\right)m\right) \\ \exp(j\phi_{Tx}(n_{Tx}))\exp(j\phi_{Rx}(n_{Tx}, n_{Rx}))\end{array}\right\}\right)$$

$$= \sum_{n_{Tx}=1}^{N_{Tx}}\left(\sum_{m=0}^{M-1}\left\{\begin{array}{l}\exp(j2\pi B_{n_{Tx}}m\Delta t)\exp\left(-j2\pi(f_0 + B_{n_{Tx}})\frac{2R_0}{c}\right) \\ \exp\left(j2\pi(f_0 + f_{r,samp}(k_r))\frac{2vhT_{pri}}{c}\right) \\ \exp\left(j2\pi\left((f_0 + B_{n_{Tx}})\frac{2v\Delta t}{c} + \frac{\Delta B_{n_{Tx}}}{2T_0}\left(m\Delta t^2 - 2\Delta t\frac{2(R_0 - vm\Delta t)}{c}\right) - \frac{k_r}{M_{fft}}\right)m\right) \\ \exp(j\phi_{Tx}(n_{Tx}))\exp(j\phi_{Rx}(n_{Tx}, n_{Rx}))\end{array}\right\}\right)$$

$$= \sum_{n_{Tx}=1}^{N_{Tx}}(F_V(n_{Tx}, n_{Rx}, h, k_r))$$

$(k_r = 0, 1, \ldots, M_{fft} - 1)$ $(h = 0, 1, \ldots, H - 1)$ $(n_{Rx} = 1, 2, \ldots, N_{Rx})$ $$f_{r,samp}(k_r) = -\frac{f_{samp}}{2} + \Delta f_{samp}k_r \quad (18)$$

$$\Delta f_{samp} = \frac{f_{samp}}{M_{fft}} \quad (19)$$

Figure 12:
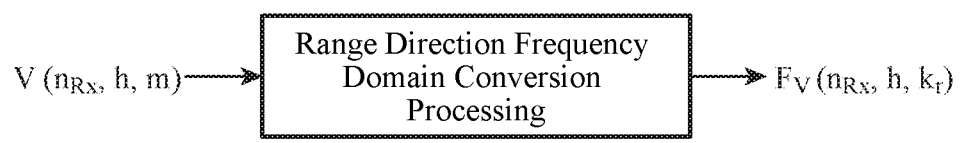
FIG. 12 is an explanatory diagram illustrating an input/output relationship by range direction frequency domain conversion processing.

The range-direction frequency domain converting unit 231-1 outputs the signals $F_v(n_{Rx}, h, k_r)$ based on the range direction frequency to the hit-direction frequency domain converting unit 232-1. FIG. 12 is a diagram illustrating an input/output relationship by the range direction frequency domain conversion processing.

In FIG. 13, the spectra of the reception video signals $V(n_{Rx}, h, m)$ and the signals $F_v(n_{Rx}, h, k_r)$ based on the range direction frequency are illustrated. The reception video frequency, hits are unified to the same range direction frequency bin, thereby enabling integration in the hit direction with no integration loss.

From Equation (17), a term relating to the frequency domain conversion in the hit direction of the signals $F_v(n_{Rx}, h, k_r)$ based on the range direction frequency is expressed by Expression (20). By converting the term expressed by Expression (20) into a frequency domain in the hit direction according to Equation (21), signals $F_{fft}(h_{fft}, k_r)$ based on the hit direction Doppler frequency for each range direction frequency bin number $k_r$ are generated There is a disadvantage in that integration loss occurs since the Doppler frequency bin $h_{fft,peak}(k_r)$, in which the signals $F_{fft}(h_{fft}, k_r)$ based on the hit direction Doppler frequency for each range direction frequency bin number $k_r$ gives an absolute value from Equation (21), changes depending on the range direction frequency bin as expressed by Equation (22). Here, $H_{fft}$ denotes the number of FFT points in the hit direction, and $h_{fft}$ denotes the sampling; number of the hit direction Doppler frequency domain.

$$\exp\left(j2\pi(f_0 + f_{r,samp}(k_r))\frac{2vhT_{pri}}{c}\right) \quad (20)$$

$$F_{fft}(h_{fft}, k_r) = \quad (21)$$

$$\sum_{h=0}^{H-1} \exp\left(j2\pi(f_0 + f_{r,samp}(k_r))\frac{2vhT_{pri}}{c}\right)\exp\left(-j2\pi\frac{h}{H_{fft}}h_{fft}\right) =$$

$$\sum_{h=0}^{H-1} \exp\left(j2\pi\left((f_0 + f_{r,samp}(k_r))\frac{2vhT_{pri}}{c} - \frac{h_{fft}}{H_{fft}}\right)h\right)$$

$(k_r = 0, 1, \ldots, M_{fft} - 1)$ $(k_{fft} = 0, 1, \ldots, H_{fft} - 1)$ $$h_{fft,peak}(k_r) = (f_0 + f_{r,samp}(k_r))\frac{2vhT_{pri}}{c}H_{fft} \quad (22)$$

Figure 14:
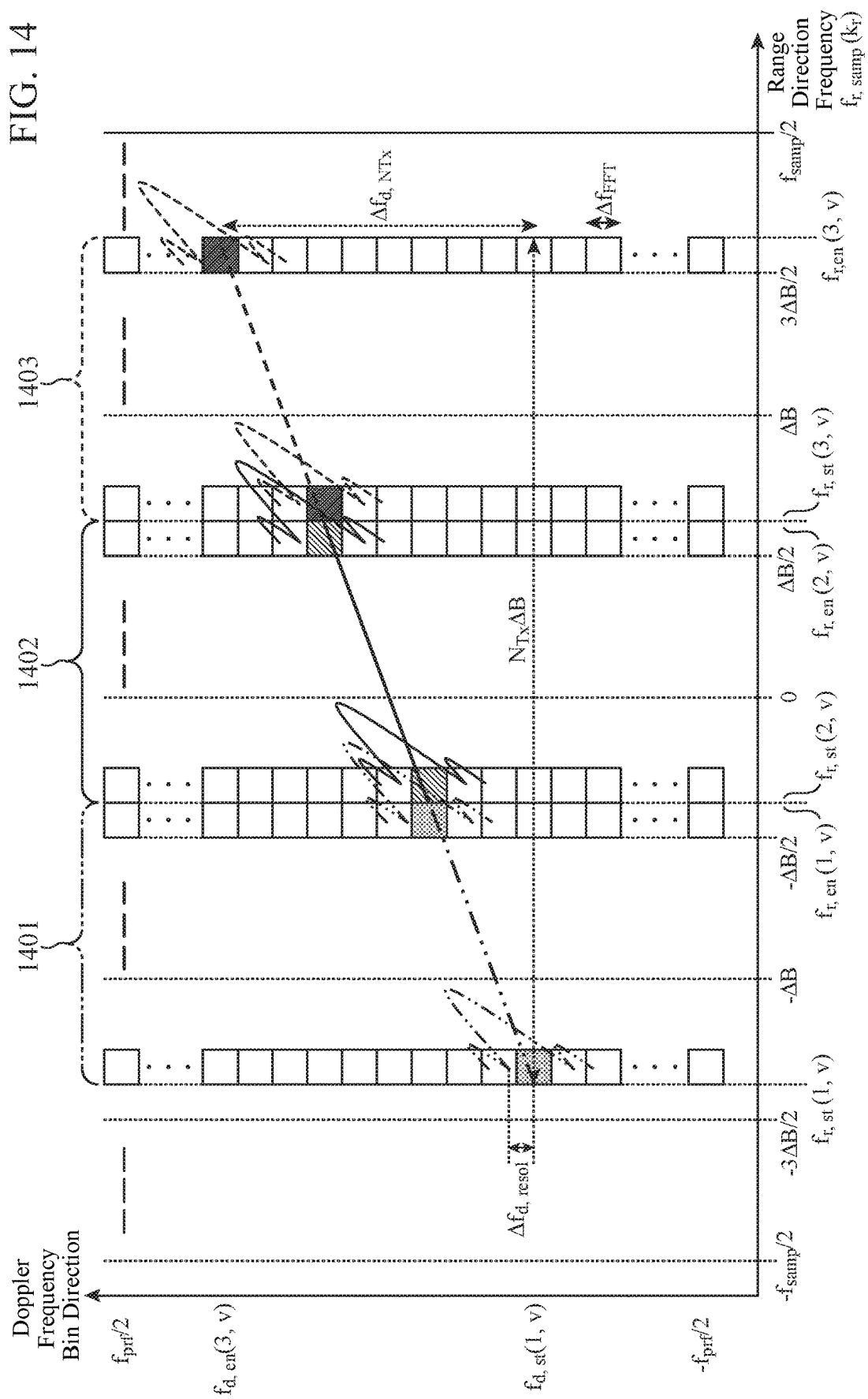
FIG. 14 is an explanatory graph illustrating a result of hit-direction frequency domain conversion performed on a signal based on a range direction frequency in the case of a target relative velocity v by FFT.

As described above, in a case where the hit-direction frequency domain conversion is performed on the signals $F_v(n_{Rx}, h, k_r)$ based on the range direction frequency, there is a disadvantage in that an integration loss occurs since the hit direction Doppler frequency changes depending on the transmission frequency and the frequency in a modulation band as illustrated in FIG. 14. In a case where a Doppler frequency difference $\Delta f_{d,NTx}$ due to the modulation band and a Doppler frequency resolution $\Delta f_{d,resol}$ satisfy the relationship of Inequality (23), an integration loss occurs. In FIG. 14, a section 1401 represents a portion, of a signal $F_v(n_{Rx}, h, k_r)$ based on the range direction of the reception radar 200-$n_{Rx}$ in a case of the target relative velocity v after the hit direction FFT, corresponding to the transmission radar 100-1, and likewise, a section 1402 represents a portion corresponding to the transmission radar 100-2, and a section 1403 represents a portion corresponding to the transmission radar 100-3. In addition, $\Delta f_{FFT}$ in the figure denotes the frequency sampling interval in the hit direction frequency domain, $f_{prf}$ denotes the pulse repetition frequency, $f_{r,st}(n_{Tx}, v)$ denotes the minimum range direction frequency of the transmission radar 100-$n_{Tx}$ at the target relative velocity v, $f_{r,en}(n_{Tx}, v)$ denotes the maximum range direction frequency of the transmission radar 100-$n_{Tx}$ at the target relative velocity v, $f_{d,st}(n_{Tx}, v)$ denotes the minimum Doppler frequency of the transmission radar 100-$n_{Tx}$ at the target relative velocity v, and $f_{d,en}(n_{Tx}, v)$ is the maximum Doppler frequency of the transmission radar 100-$n_{Tx}$ at the target relative velocity v. As illustrated in FIG. 14, in a case where the target relative velocity v is unknown, an appropriate reference signal cannot be generated, and thus it is difficult to perform pulse compression without a loss on a signal based on the range direction frequency and the Doppler frequency. There is a similar disadvantage also with reception video signals.

$$\Delta f_{d,NTx} = N_{Tx}\Delta B\frac{2v}{c} > \Delta f_{d,resol} = \frac{1}{T_{obs}} \quad (23)$$

Figure 15:
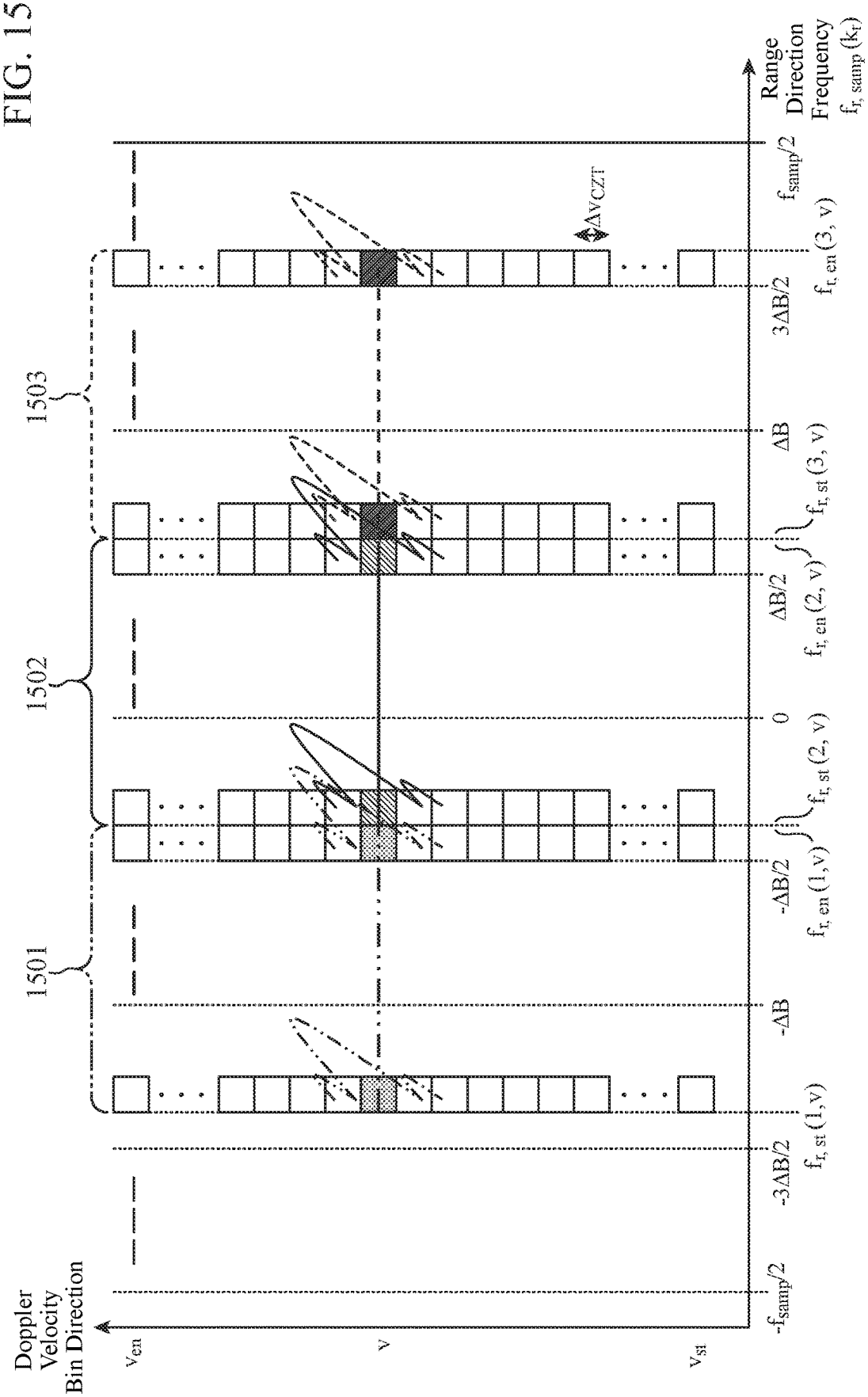
FIG. 15 is an explanatory graph illustrating a result of hit-direction frequency domain conversion performed on a signal based on a range direction frequency in the case of a target relative velocity v by CZT.

The hit-direction frequency domain converting unit 232-1 is provided for the purpose of pulse compression and coherent band synthesis of the signals $F_v(n_{Rx}, h, k_r)$ based on the range direction frequency of the reception radar 200-$n_{Rx}$ without a loss. Therefore, in the hit-direction frequency domain converting unit 232-1, chirp Z-transform (CZT) is employed for conversion to the hit direction frequency domain with the Doppler frequency interval changed for each range direction frequency bin so that the Doppler velocity bins become the same for each different transmission frequency and for each modulation band, that is, for each range direction frequency bin. In FIG. 15, signals based on the velocity and the range direction frequency obtained as a result of hit-direction frequency domain conversion on the signals based on the range direction frequency of the transmission radars 100-$n_{Tx}$ by the CZT are illustrated. In FIG. 15, $\Delta v_{CZT}$ denotes the velocity sample interval in the hit direction frequency domain. FIG. 15 is an example of hit direction frequency conversion that is performed so that the signals based on the range direction frequency of the transmission radars 100-$n_{Rx}$ are in a velocity bin indicating the target relative velocity v, and the signals of the transmission radar 100-1, the transmission radar 100-2, and the transmission radar 100-3 having different superimposed bands are converted to the hit direction frequency to have the same velocity bin. In FIG. 15, a section 1501 indicates a portion, of a signal $F_{CZT}(n_R, h, k_r)$ based on the velocity and the range direction of the reception radar 200-$n_{Rx}$, corresponding to the transmission radar 100-1 at the target relative velocity v, and likewise, a section 1502 represents a portion corresponding to the transmission radar 100-2, and a section 1503 represents a portion corresponding to the transmission radar 100-3.

The hit-direction frequency domain converting unit 232-1 operates so that Doppler velocity bins of signals after the hit-direction frequency domain conversion become the same by changing the conversion function of the CZT on the basis of the range direction frequency.

The hit-direction frequency domain converting unit 232-1 performs the CZT expressed by Equation (24) on the signals $F_v(n_{Rx}, h, k_r)$ based on the range direction frequency of the reception radar 200-$n_{Rx}$, thereby converting to the hit direction frequency domain to generate signals $F_{CZT}(n_{Rx}, h_{czt}, k_r)$ based on the velocity and the range direction frequency (step ST43 in FIG. 11). Here, $z_{kr}^{-h}$ denotes a conversion function of CZT corresponding to each range direction frequency $f_{r,samp}(k_r)$, $A_{kr}$ denotes a conversion start phase corresponding to each range direction frequency $f_{r,samp}(k_r)$ (Equation (25)), $W_{kr}^{-hczt}$ denotes the CZT conversion scope function corresponding to each range direction frequency $f_{r,samp}(k_r)$ (Equation (26)), $v_{st}$ denotes the conversion start velocity, $v_{en}$ denotes the conversion end velocity, and $H_{czt}$ denotes the number of samples after the CZT. The relative velocity $v_{CZT}(h_{czt})$ having the velocity bin number $h_{czt}$ after conversion to the hit direction frequency domain is expressed by Equation (27). The velocity sampling interval $\Delta v_{czt}$ in the hit direction frequency domain is expressed by Equation (28).

$$F_{CZT}(n_{Rx}, h_{czt}, k_r) = \quad (24)$$

$$F_V(n_{Rx}, h, k_r) z_{k_r}^{-h} = \sum_{h=0}^{H-1} F_V(n_{Rx}, h, k_r)\left(A_{k_r} W_{k_r}^{-h_{czt}}\right)^{-h}$$

$$(k_r = 0, 1, \ldots, M_{fft} - 1)$$

$$(k_{czt} = 0, 1, \ldots, H_{czt} - 1)$$

$$(n_{Rx} = 1, 2, \ldots, N_{Rx})$$

$$A_{k_r} = \exp\left(j2\pi(f_0 + f_{r,samp}(k_r))\frac{2v_{st}}{c}T_{pri}\right) \quad (25)$$

$$(k_r = 0, 1, \ldots, M_{fft} - 1)$$

$$W_{k_r}^{-h_{czt}} = \exp\left(j2\pi(f_0 + f_{r,samp}(k_r))\frac{2\Delta v_{czt}}{c}h_{czt}T_{pri}\right) \quad (26)$$

$$(h_{czt} = 0, 1, \ldots, H_{czt} - 1)$$

$$(k_r = 0, 1, \ldots, M_{fft} - 1)$$

$$v_{czt}(h_{czt}) = v_{st} + h_{czt}\Delta v_{czt} \quad (27)$$

$$\Delta v_{czt} = \frac{(v_{en} - v_{st})}{H_{czt}} \quad (28)$$

A result obtained by performing the hit-direction frequency domain conversion using Equations (24) to (26), that is, performing the CZT on the term (Expression (20)) related to the hit-direction frequency domain conversion of the signals $F_v(n_{Rx}, h, k_r)$ based on the range direction frequency is expressed by Equation (29). A velocity bin $h_{czt,\,peak}$ in which the absolute value of a signal $F_{CZT}(n_{Rx}, h_{czt}, k_r)$ based on the velocity and the range direction frequency reaches the maximum value is expressed by Equation (30).

$$F_{CZT}(n_{Rx}, h_{czt}, k_r) = \sum_{h=0}^{H-1} F_V(n_{Rx}, h, k_r)\left(A_{k_r} W_{k_r}^{-h_{czt}}\right)^{-h} = \quad (29)$$

$$\sum_{h=0}^{H-1} \exp\left(j2\pi(f_0 + f_{r,samp}(k_c))\frac{2vhT_{pri}}{c}\right)$$

$$\left(\begin{array}{l}\exp\left(j2\pi(f_0 + f_{r,samp}(k_r))\frac{2v_{st}}{c}T_{pri}\right) \\ \exp\left(j2\pi(f_0 + f_{r,samp}(k_r))\frac{2\Delta v_{czt}}{c}h_{czt}T_{pri}\right)\end{array}\right)^{-h} =$$

$$\sum_{h=0}^{H-1}\left(\exp\left(j2\pi(f_0 + f_{r,samp}(k_r))(v - (v_{st} + \Delta v_{czt}h_{czt}))\frac{2hT_{pri}}{c}\right)\right)$$

$$h_{czt,peak} = \frac{v - v_{st}}{\Delta v_{czt}} \quad (30)$$

By the processing of the hit-direction frequency domain converting unit 232-1 by Equations (24) to (26), the signals $F_{CZT}(n_{Rx}, h_{czt}, k_r)$ based on the velocity and the range direction frequency are sampled at the same velocity sampling interval $\Delta v_{czt}$ in the hit direction frequency direction from the conversion start velocity $v_{st}$ to the conversion end velocity $v_{en}$, and the target is sampled in the same Doppler velocity bin at any transmission frequency ($f_0+f_{r,\,samp}(k_r)$) from Equations (29) and (30) as illustrated in FIG. 15. In addition, the number of samples $H_{czt}$ after the CZT can be desirably set to obtain a desired sampling interval. As the conversion start velocity $v_{st}$ and the conversion end velocity $v_{en}$, an assumed relative velocity can be desirably set. That is, independently of the velocity $v_{amb}$ that can be measured without ambiguity and is defined by the pulse repetition interval $T_{pri}$ expressed by Equation (31), it is possible to set as expressed by Equation (32). Therefore, it is not necessary to calculate for each scope of velocity $v_{amb}$ that can be measured without ambiguity, and thus it is possible to calculate a target in a desired velocity scope at a time, thereby enabling reduction of the amount of calculation and an increased speed.

$$v_{amb} = \frac{c}{2f_0 T_{pri}} \quad (31)$$

$$v_{en} - v_{st} > v_{amb} \quad (32)$$

The hit-direction frequency domain converting unit 232-1 enables faster processing than the discrete Fourier transform (DFT) by implementing the CZT expressed by Equation (24) by convolution integration in the frequency domain using the fast Fourier transform (FFT) and inverse FFT (IFFT) expressed by Equation (33). In Equation (33), a symbol * represents convolution.

$$F_{CZT}(n_{Rx}, h_{czt}, k_r) = \quad (33)$$

$$W_{k_r}^{\frac{h_{czt}^2}{2}} IFFT\left[FFT\left(F_V(n_{Rx}, h, k_r)A_{k_r}^{-h}W_{k_r}^{\frac{h^2}{2}}\right) * FFT\left(W_{k_r}^{-\frac{h^2}{2}}\right)\right]$$

Figure 16:
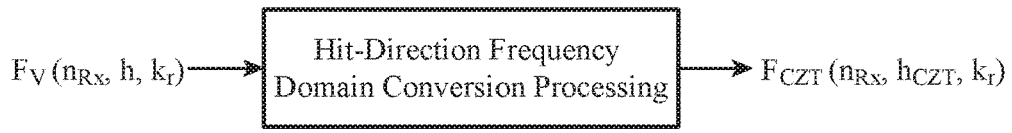
FIG. 16 is an explanatory diagram illustrating an input/output relationship by hit-direction frequency domain conversion processing.

FIG. 16 is a diagram illustrating an input/output relationship by the hit-direction frequency domain conversion processing.

As illustrated in FIG. 14, signals based on the range direction frequency have different Doppler frequencies depending on the range direction frequency, whereas, as illustrated in FIG. 15, the hit-direction frequency domain conversion by the hit-direction frequency domain converting unit 232-1 causes the signals to appear in a target relative velocity bin.

In a case where there is a concern that the signals $F_{CZT}(n_{Rx}, h_{czt}, k_r)$ based on the velocity and the range direction frequency may be buried in side lobes such as clutter, the hit-direction frequency domain converting unit 232-1 performs window function processing according to Equation (34) to generate signals $F_v'(n_{Rx}, h, k_r)$ based on the range direction frequency after the window function processing. Here, a Hamming window $w_{ham}(h)$ expressed by Equation (35) is used for explanation. A window function other than the Hamming window may be used. By performing the window function processing, the side lobes in the velocity direction are reduced in the signals after the hit-direction frequency domain conversion, thereby allowing the target to be avoided from being buried in the side lobes.

When the window function processing is performed, the hit-direction frequency domain converting unit 232-1 substitutes the signals $F_v'(n_{Rx}, h, k_r)$ based on the range direction frequency after the window function processing for the signals $F_v(n_{Rx}, h, k_r)$ based on the range direction frequency to convert, to the hit-direction frequency domain according to Equation (24) or (33), and generates signals $F_{CZT}(n_{Rx}, h_{czt}, k_r)$ based on the velocity and the range direction frequency.

$$F'_V(n_{Rx}, h, k_r) = F_V(n_{Rx}, h, k_r) w_{ham}(h)$$

$$(k_r = 0, 1, \ldots, M_{fft} - 1) \quad (34)$$

$$(h = 0, 1, \ldots, H - 1)$$

$$w_{ham}(h) = 0.54 + 0.46\cos\left(2\pi \frac{h}{H-1}\right) \quad (35)$$

$$(h = 0, 1, \ldots, H - 1)$$

The hit-direction frequency domain converting unit 232-1 outputs the signals $F_{CZT}(n_{Rx}, h_{czt}, k_r)$ based on the velocity and the range direction frequency to the correlation unit 233-1.

When there is a Doppler frequency, that is, when the target is moving, there is a disadvantage in that the travelling distance during observation time becomes greater than or equal to the range resolution, thus resulting in deterioration in terms of integration loss. Since the range-direction frequency domain converting unit 231-1 is provided before the hit-direction frequency domain conversion processing in the first embodiment, a range direction frequency bin is unified among hits, and thus it is possible to perform hit-direction frequency domain conversion processing as coherent integration without an integration loss without being affected by the travelling distance during observation time.

The correlation unit 233-1 correlates a reference signal based on the velocity corresponding to each transmission frequency and each velocity bin to a signal $F_{CZT}(n_{Rx}, h_{czt}, k_r)$ based on the velocity and the range direction frequency, that is, performs pulse compression to generate signals $R_{PC}(n_{Tx}, n_{Rx}, h_{czt}, k_{pc})$ based on the velocity separated for each transmission frequency and a range after correlation(step ST44 in FIG. 11).

Figure 17:
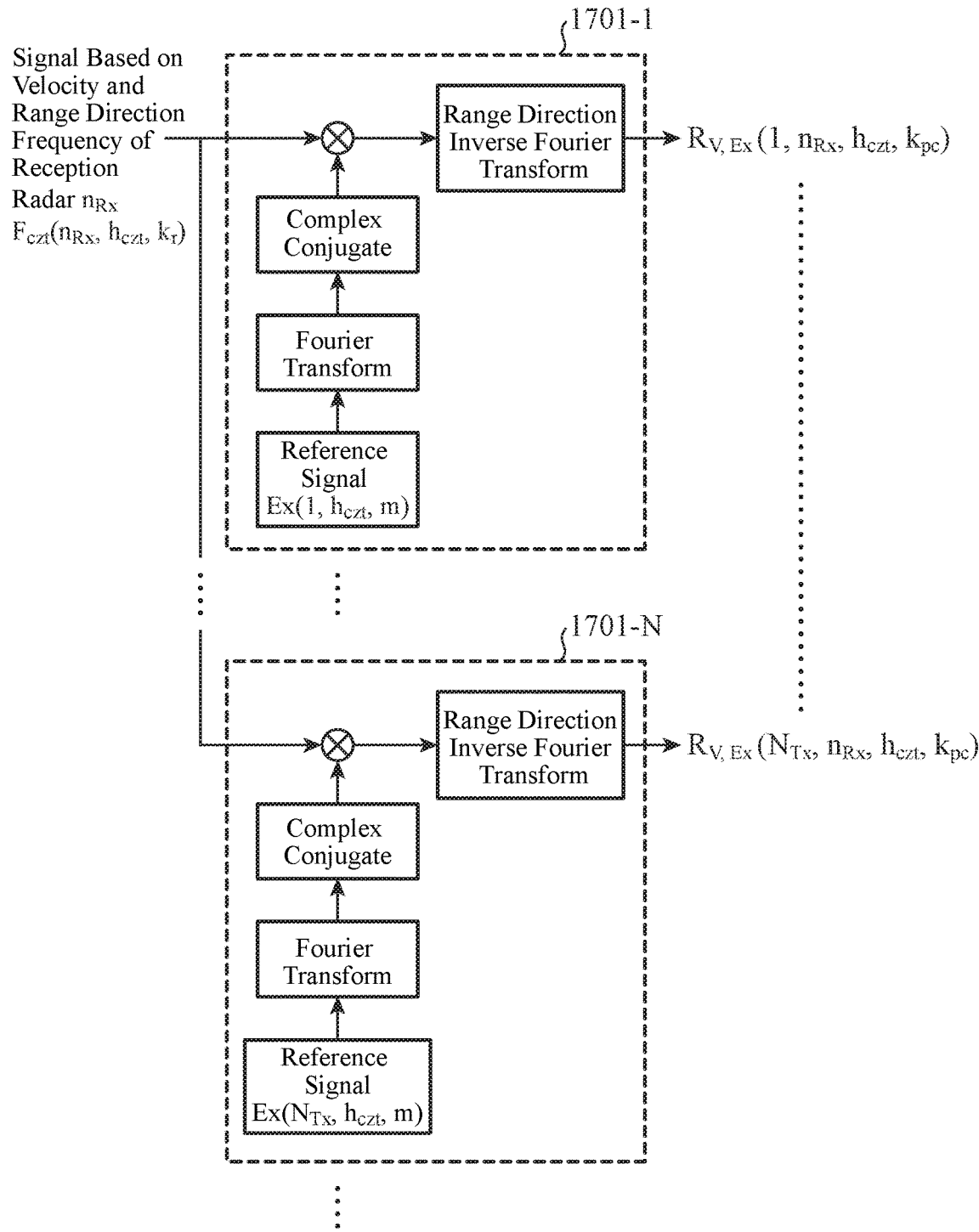
FIG. 17 is an explanatory diagram illustrating an input/output relationship by correlation processing.
Figure 18:
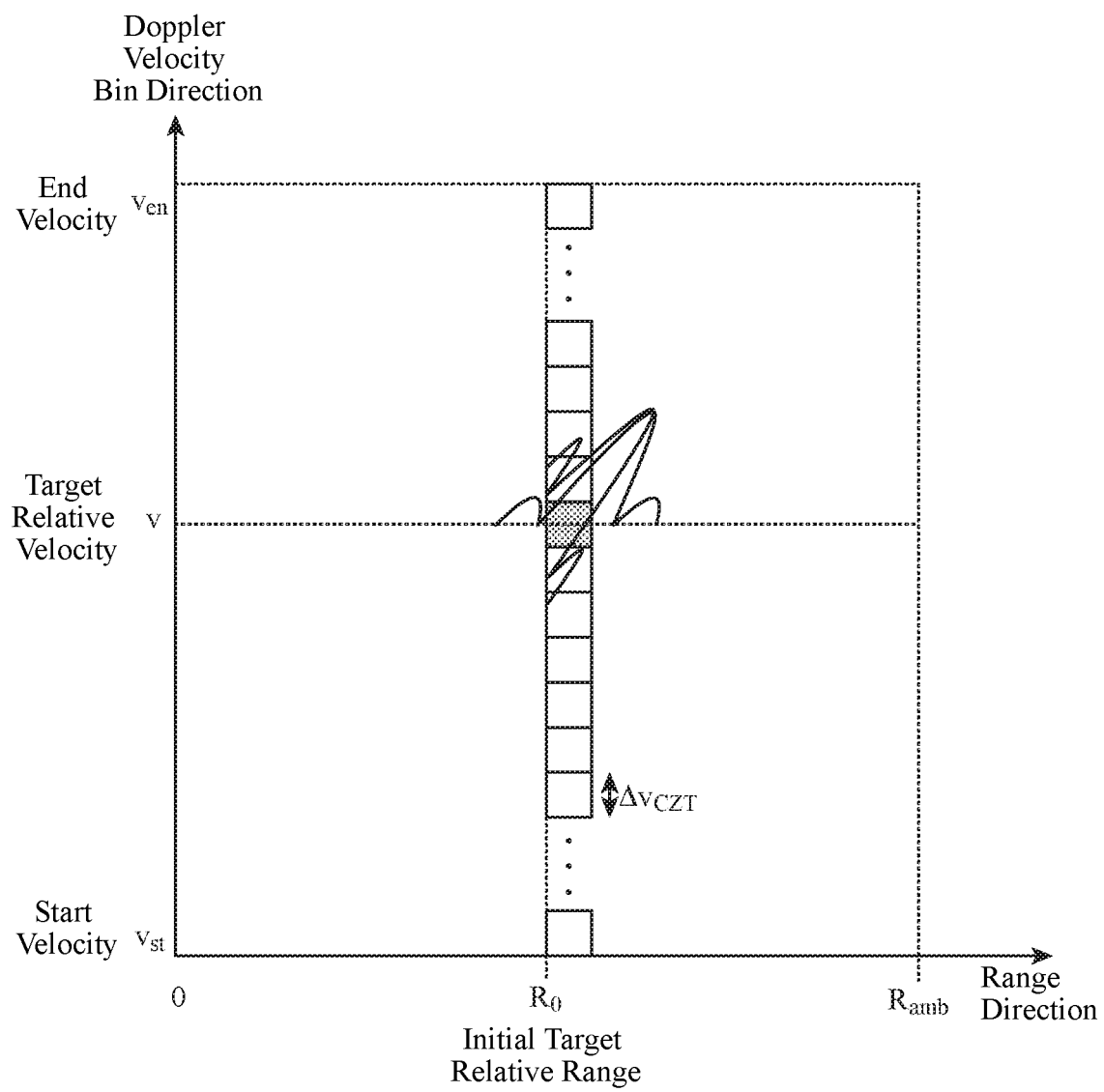
FIG. 18 is an explanatory graph illustrating a spectrum of a signal based on the velocity and a range after correlation.

Referring to FIGS. 17 and 18, description will be given on correlation processing by the correlation unit 233-1 in the frequency domain between a signal $F_{CZT}(n_{Rx}, h_{czt}, k_r)$ based on the velocity and the range direction frequency and a reference signal $Ex(n_{Tx}, h_{czt}, m)$ based on a velocity corresponding to a transmission frequency of each of the transmission radars and each velocity bin, that is, pulse compression. In FIG. 17, a processing block 1701-1 represents correlation processing (pulse compression processing) between a signal $F_{CZT}(n_{Rx}, h_{czt}, k_r)$ based on the velocity and the range direction frequency of the reception radar 200-$n_{Rx}$ and a reference signal $Ex(1, h_{czt}, m)$ based on the transmission frequency of the transmission radar 100-1 and the velocity corresponding to each velocity bin number $h_{czt}$. A processing block 1701-N represents correlation processing (pulse compression processing) between a signal $F_{CZT}(n_{Rx}, h_{czt}, k_r)$ based on the velocity and the range direction frequency of the reception radar 200-$n_{Rx}$ and a reference signal $Ex(N_{Tx}, h_{czt}, m)$ based on the transmission frequency of the transmission radar $N_{Tx}$ and the velocity corresponding to each velocity bin number $h_{czt}$. FIG. 18 illustrates a signal based on the velocity and the range after correlation, and a value of the range indicated by a dotted line is a range $R_{amb}$ that can be measured without ambiguity.

Figure 19:
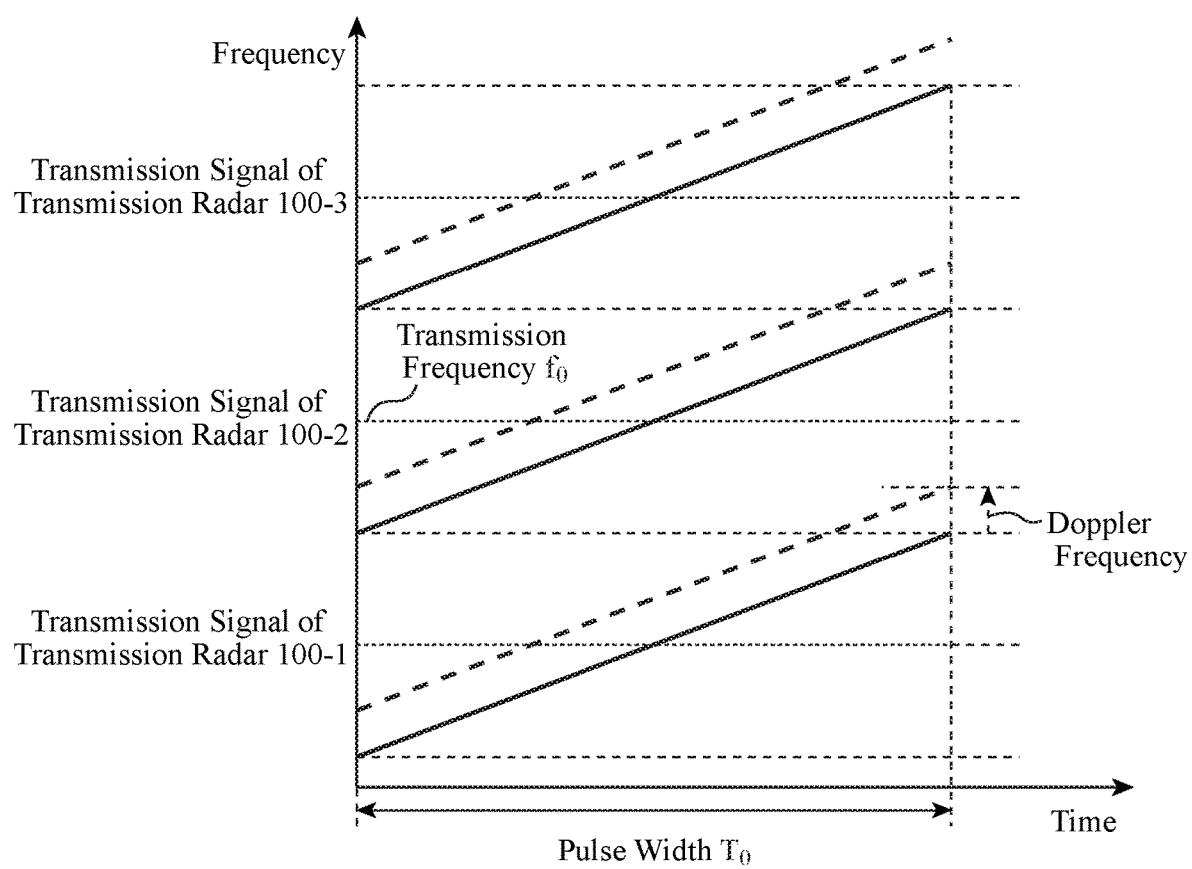
FIG. 19 is an explanatory graph illustrating transmission signals and reception signals affected by the Doppler frequency.

As illustrated in FIG. 19, in a case where a target has a Doppler frequency, reception signals include a modulation component and a Doppler frequency component; however the reference signal contains only the modulation component, and thus disadvantages occur such as a shift in the compressed range and a reduced correlation. Note that in FIG. 19, a solid line indicates transmission signals of the transmission radars 100-1 to 100-3, and a broken line indicates reception signals that are affected by the Doppler frequency. There are also disadvantages in that the cross-correlation between adjacent bands is increased, that an unnecessary peak rises as illustrated by the curve 1004 in FIG. 10B, and that the range is shifted as illustrated by the arrow 1003 and Equation (14).

In order to solve these disadvantages, the correlation unit 233-1 generates a reference signal $x(n_{Tx}, h_{czt}, m)$ including a Doppler frequency corresponding to the velocity of each velocity bin according to Equation (36) in addition to the frequency modulation amount $B_{nTx}$ and the modulation bandwidth $\Delta B_{nTx}$ of each of the transmission radars 100-$n_{Tx}$ that are the same as an intra-pulse modulation signal $L_{chp}$ ($n_{Tx}$, h, t). The second term in Equation (36) represents the Doppler frequency corresponding to the velocity of each velocity bin, and is converted to the frequency domain in the hit direction by the hit-direction frequency domain converting unit 232-1 before the pulse compression. As a result, signals integrated in the target relative velocity bin can be pulse-compressed without being affected by the Doppler frequency, and are integrated in the initial target relative range regardless of whether the target is a stationary or moving, thereby improving the ranging performance. In addition, as expressed by Equation (36), since the reference signal is generated for each transmission frequency and for each velocity corresponding to a velocity bin, it is possible to perform pulse compression on the reception video signals from the target for each velocity at each transmission frequency without being affected by the Doppler frequency. Since the range-direction frequency domain converting unit 231-1 provided as a preceding stage of the hit-direction frequency domain converting unit 232-1 converts to the frequency domain in the range direction, signals based on the range direction frequency are unified to the same range direction frequency bin among hits, and thus there is no loss observed in different range bins among hits due to travelling of the target, thereby enabling integration among hits. In order to perform correlation calculation in the frequency domain, it is necessary to convert the reception signals to the frequency domain; however since the range-direction frequency domain converting unit 231-1 performs the range-direction frequency domain conversion, the correlation unit 233-1 does not need to perform range-direction frequency domain conversion for each of the transmission radars $n_{Tx}$ as illustrated in FIG. 17, thus resulting in the effect of reducing the amount of calculation. That is, the amount of calculation is reduced to $1/N_{Tx}$ as compared with a case where range direction frequency domain conversion is performed for each of the transmission radars $n_{Tx}$. As the number of transmission radars $N_{Tx}$ increases, the effect of reducing the calculation amount increases. With the configuration of the first embodiment, the hardware scale can be reduced.

$$Ex(n_{Tx}, h_{czt}, m) = \begin{cases} A_E \exp\left(j2\pi\left(B_{n_{Tx}} m\Delta t + \frac{\Delta B_{n_{Tx}}}{2T_0} m^2 \Delta t^2\right)\right) \\ \exp\left(j2\pi(f_0 + B_{n_{Tx}}) \frac{2v_{czt}(h_{czt})}{c} m\Delta t\right), \\ 0 \leq m\Delta t \leq T_0 \\ 0, \text{ otherwise} \end{cases} \quad (36)$$

$$(m = 0, 1, \ldots, M)$$

$$(h_{czt} = 0, 1, \ldots, H_{czt} - 1)$$

$$(n_{Tx} = 1, 2, \ldots, N_{Tx})$$

The correlation unit 233-1 performs fast Fourier transform (FFT) on the reference signal $Ex(n_{Tx}, h_{czt}, m)$ according to Equation (37), and then multiplies the result with the signal $F_{CZT}(n_{Rx}, h_{czt}, k_r)$ based on the velocity and the range direction frequency (equation (38)). Here, a symbol * represents a complex conjugate.

$$F_{Ex}(n_{Tx}, h_{czt}, k_r) = \sum_{m=0}^{M-1} Ex(n_{Tx}, h_{czt}, m)\exp\left(-j2\pi \frac{m}{M_{fft}}k_r\right) \quad (37)$$

$(k_r = 0, 1, \ldots, M_{fft} - 1)$ $(h_{czt} = 0, 1, \ldots, H_{czt} - 1)$ $(n_{Tx} = 1, 2, \ldots, N_{Tx})$ $$F_{V \cdot Ex}(n_{Tx}, n_{Rx}, h_{czt}, k_r) = F_{CZT}(n_{Rx}, h_{czt}, k_r)F_{Ex}^*(n_{Tx}, h_{czt}, k_r) \quad (38)$$

$(k_r = 0, 1, \ldots, M_{fft} - 1)$ $(h_{czt} = 0, 1, \ldots, H_{czt} - 1)$ $(n_{Tx} = 1, 2, \ldots, N_{Tx})$ $(n_{Rx} = 1, 2, \ldots, N_{Rx})$ Finally, the correlation unit 233-1 performs inverse fast Fourier transform (IFFT) on the multiplication result $F_{v*Ex}(n_{Tx}, n_{Rx}, h_{czt}, k_r)$ according to Equation (39), and as a result of the correlation processing, generates a signal $R_{PC}(n_{Tx}, n_{Rx}, h_{czt}, k_{pc})$ based on the velocity separated for each transmission frequency and a range after correlation(step ST45 in FIG. 11). As illustrated in FIG. 20, a reception signal corresponding to a reference signal corresponding to a transmission radar 100-$n_{Tx}$ is pulse-compressed, and reception signals of the other transmission radars having bands different from that of the transmission radar 100-$n_{Tx}$ have small correlation, and thus are suppressed, thereby enabling separation for each transmission frequency. FIG. 20A illustrates a pulse-compressed signal in the case of $n_{Tx}=1$ for the transmission radar 100-$n_{Tx}$, FIG. 20B illustrates the case where $n_{Tx}=2$, and FIG. 20C illustrates a case where $n_{Tx}=3$. In these figures, as illustrated by signals 2001, 2002, and 2003, only the reception signal corresponding to the transmission radar 100-$n_{Tx}$ is separated, and pulse compression is performed without a loss.

Figure 21A:
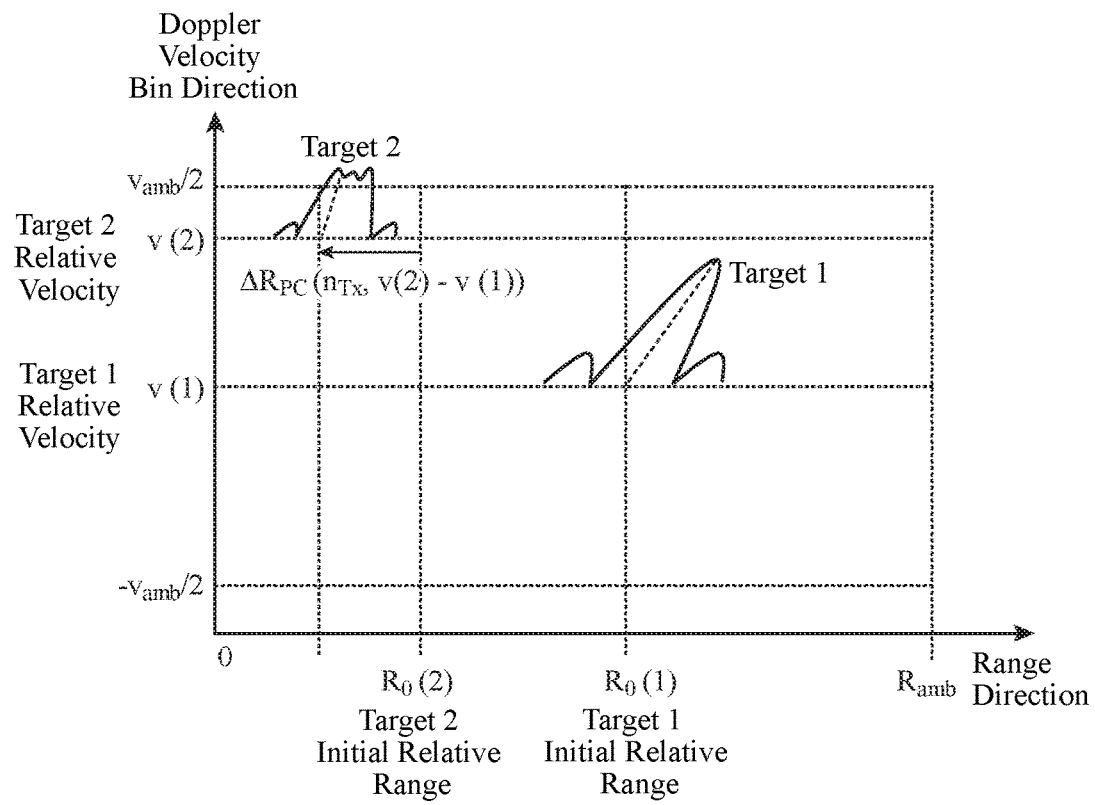
FIG. 21A and FIG. 21B are explanatory graphs illustrating processing results when there is a plurality of targets having different velocities in a comparative method and in an approach of the first embodiment, respectively.
Figure 21B:
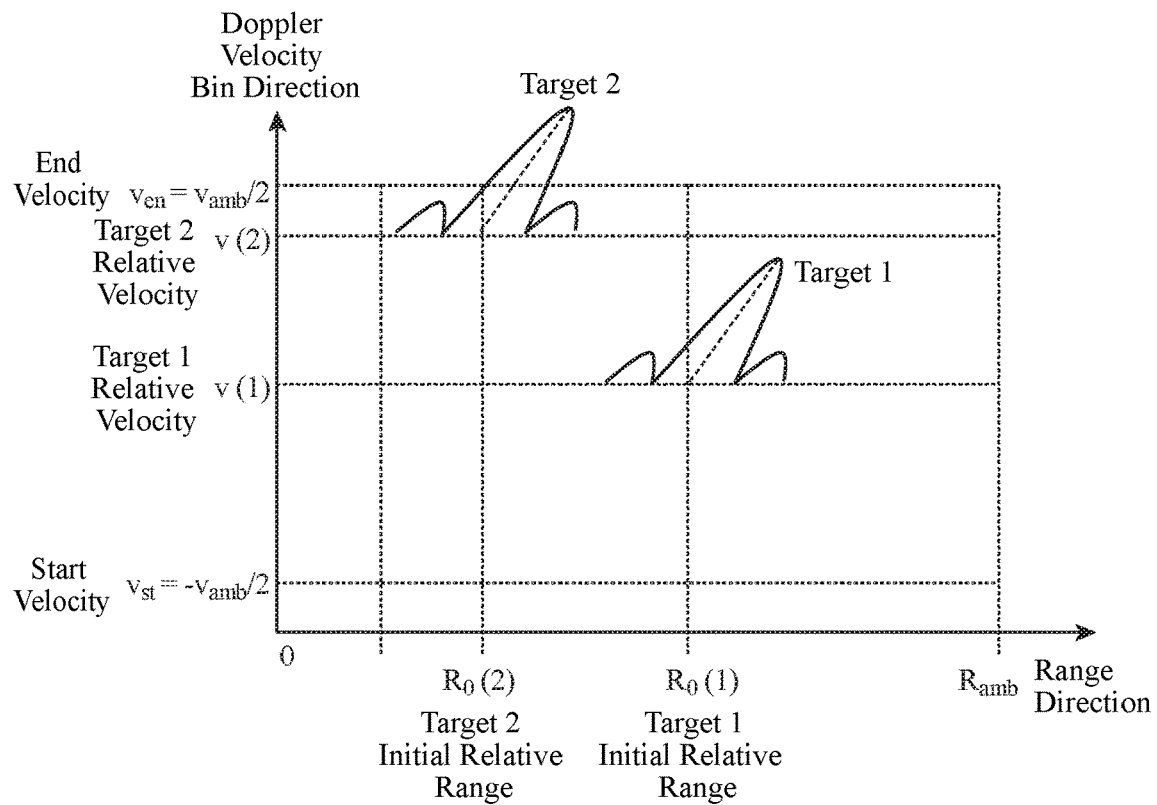
Figure 22A:
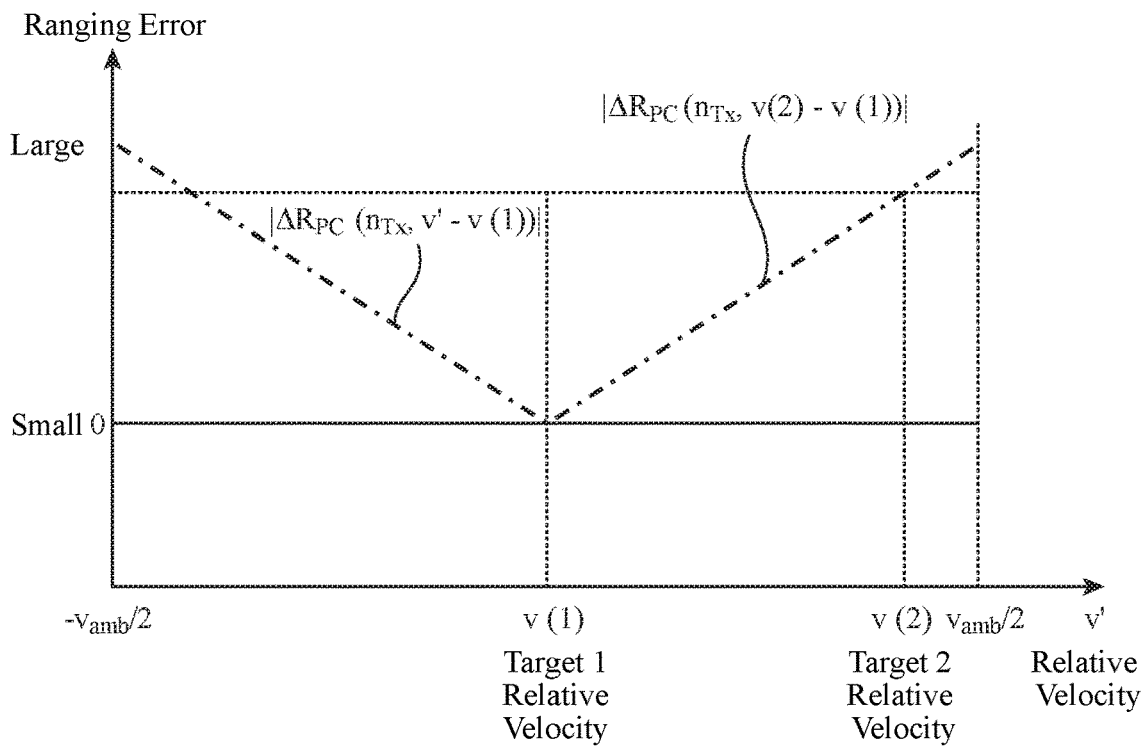
FIG. 22A is a graph illustrating the ranging error between a comparative method and a signal based on the velocity separated for each transmission frequency and the range after correlation according to the first embodiment.
Figure 22B:
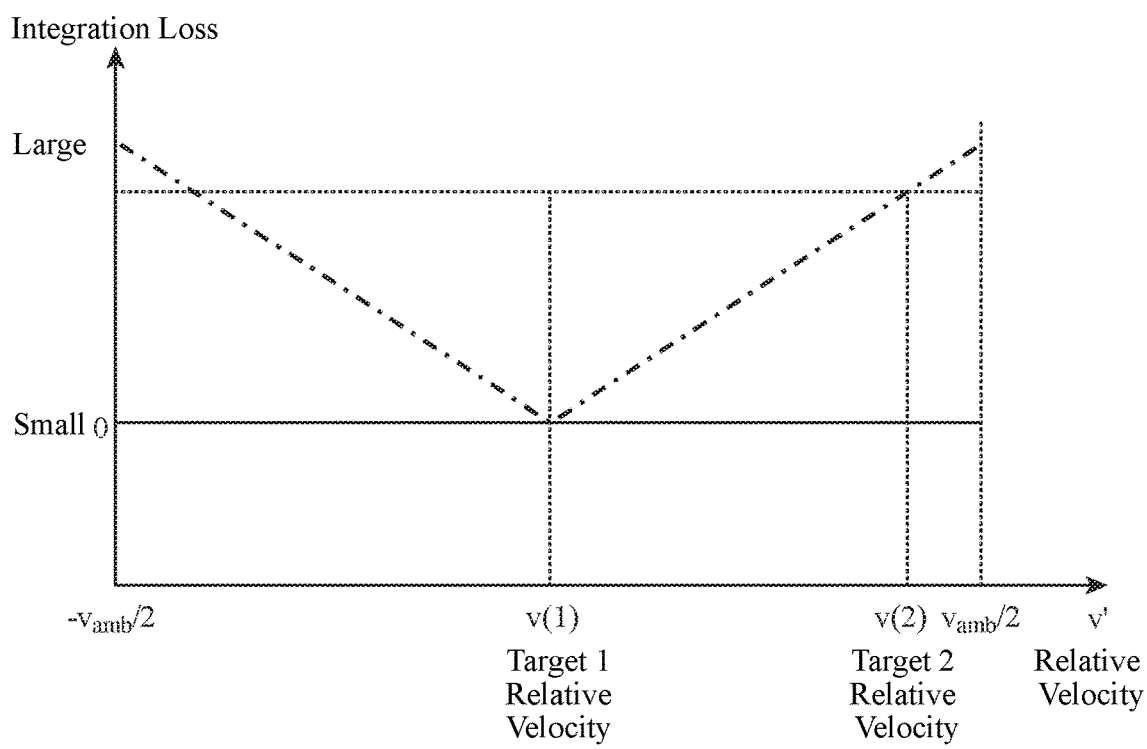
FIG. 22B is a graph illustrating the integration loss.

In FIG. 21, processing results in a case where there is a plurality of targets having different velocities are illustrated. In FIG. 21A a case is illustrated in which reception video signals are compensated with the relative velocity v (1) of a target 1, are subjected to pulse compression, and then are subjected to hit-direction frequency domain conversion processing after the pulse compression (comparative method, general radar apparatus). In FIG. 21B, signals based on the velocity separated for each transmission frequency and the range after correlation in the first embodiment are illustrated. In the case illustrated in FIG. 21A, since the target 1 is compensated with the relative velocity of the target 1, integration is performed at the initial relative range of the target 1 without a loss, whereas an integration loss occurs for a target 2 with integration performed at a range different from the initial relative range. On the other hand, in the case of the first embodiment as illustrated in FIG. 21B, integration is performed for both the target 1 and the target 2 without a loss at the initial relative range, thereby enabling a radar apparatus with improved integration performance and ranging performance. FIGS. 22A and 22B are diagrams illustrating the ranging error and the integration loss of the comparative method and a signal based on the velocity separated for each transmission frequency and the range after correlation according to the first embodiment. In the figure, an alternate long and short dash line indicates the comparative method, and a solid line indicates the method of the first embodiment. As illustrated in FIGS. 22A and 22B, the first embodiment has an effect of reducing the integration loss and the ranging error with respect to the reception signal from a target from the start velocity $v_{st}$ to the end velocity $v_{en}$.

The correlation unit 233-1 outputs the signal $R_{PC}(n_{Tx}, n_{Rx}, h_{czt}, k_{pc})$ based on the velocity separated for each transmission frequency and the range after correlation to the integration unit 234-1.

$$R_{PC}(n_{Tx}, n_{Rx}, h_{czt}, k_{pc}) = \quad (39)$$

$$\frac{1}{M} \sum_{k_r=0}^{M_{fft}-1} F_{V \cdot Ex}(n_{Tx}, n_{Rx}, h_{czt}, k_r)\exp\left(j2\pi \frac{k_{pc}}{M_{fft}}k_r\right)$$

$(k_{pc} = 0, 1, \ldots, M_{fft} - 1)$ $(h_{czt} = 0, 1, \ldots, H_{czt} - 1)$ $(n_{Tx} = 1, 2, \ldots, N_{Tx})$ $(n_{Rx} = 1, 2, \ldots, N_{Rx})$ The integration unit 234-1 integrates the signals $R_{PC}(n_{Tx}, n_{Rx}, h_{czt}, k_{pc})$ based on the velocity separated for each transmission frequency acquired from the correlation unit 233-1 and the range after correlation according to Equation (40) to generate band-synthesized signals $R_{\Sigma Tx}(n_\theta, n_{Rx}, h_{czt}, k_{pc})$ based on the velocity and the range after correlation (step ST46 in FIG. 11). Here, $\theta 0'(n_\theta)$ denotes an arrival angle candidate expressed by Equation (41), $n_\theta$ denotes an arrival angle candidate number, $N_\theta$ denotes the number of arrival angle candidates, and $\Delta\theta_{samp}$ denotes an assumed target angle interval. Where $\theta = \theta'(n_\theta)$ holds, the signals $R_{PC}(n_{Tx}, n_{Rx}, k_{pc})$ based on the velocity separated for each transmission frequency and the range after correlation are coherently integrated, and the band-synthesized signals $R_{\Sigma Tx}(n_\theta, n_{Rx}, h_{czt}, k_{pc})$ based on the velocity and the range after correlation reach the maximum value.

$$R_{\Sigma Tx}(n_\theta, n_{Rx}, h_{czt}, k_{pc}) = \quad (40)$$

$$\sum_{n_{Tx}=1}^{N_{Tx}} R_{PC}(n_{Tx}, n_{Rx}, h_{czt}, k_{pc})\exp\left(j2\pi(f_0 + B_{n_{Tx}})\frac{d_{Tx}(n_{Tx})\sin\theta'(n_\theta)}{c}\right)$$

$(n_\theta = 0, 1, \ldots, N_\theta - 1)$ $(k_{pc} = 0, 1, \ldots, M_{fft} - 1)$ $(h_{czt} = 0, 1, \ldots, H_{czt} - 1)$ $(n_{Rx} = 0, 1, \ldots, N_{Rx} - 1)$ $$\theta'(n_\theta) = n_\theta \Delta\theta_{samp} \quad (41)$$

The integration unit 234-1 outputs the band-synthesized signals $R_{\Sigma Tx}(n_\theta, n_{Rx}, h_{czt}, k_{pc})$ based on the velocity and the range after correlation to the candidate target detecting unit 241 in the second signal processor 240. The candidate target detecting unit 241 detects a candidate target based on the signal intensity with respect to the band-synthesized signals $R_{\Sigma Tx}(n_\theta, n_{Rx}, h_{czt}, k_{pc})$ based on the velocity and the range after correlation acquired from the integration unit 234-1. More specifically, for example, cell average constant false alarm rate (CA-CFAR) processing may be used. The candidate target detecting unit 241 outputs, to the target relative velocity/relative range/arrival angle calculating unit 242, the band-synthesized signals $R_{\Sigma Tx}(n_\theta, n_{Rx}, h_{czt}, k_{pc})$ based on the velocity and the range after correlation, the arrival angle candidate number $n_\theta'$, the velocity bin number $h_{czt}'$, and the sampling number $k_{pc}'$ in the range direction of the detected candidate target.

Figure 23:
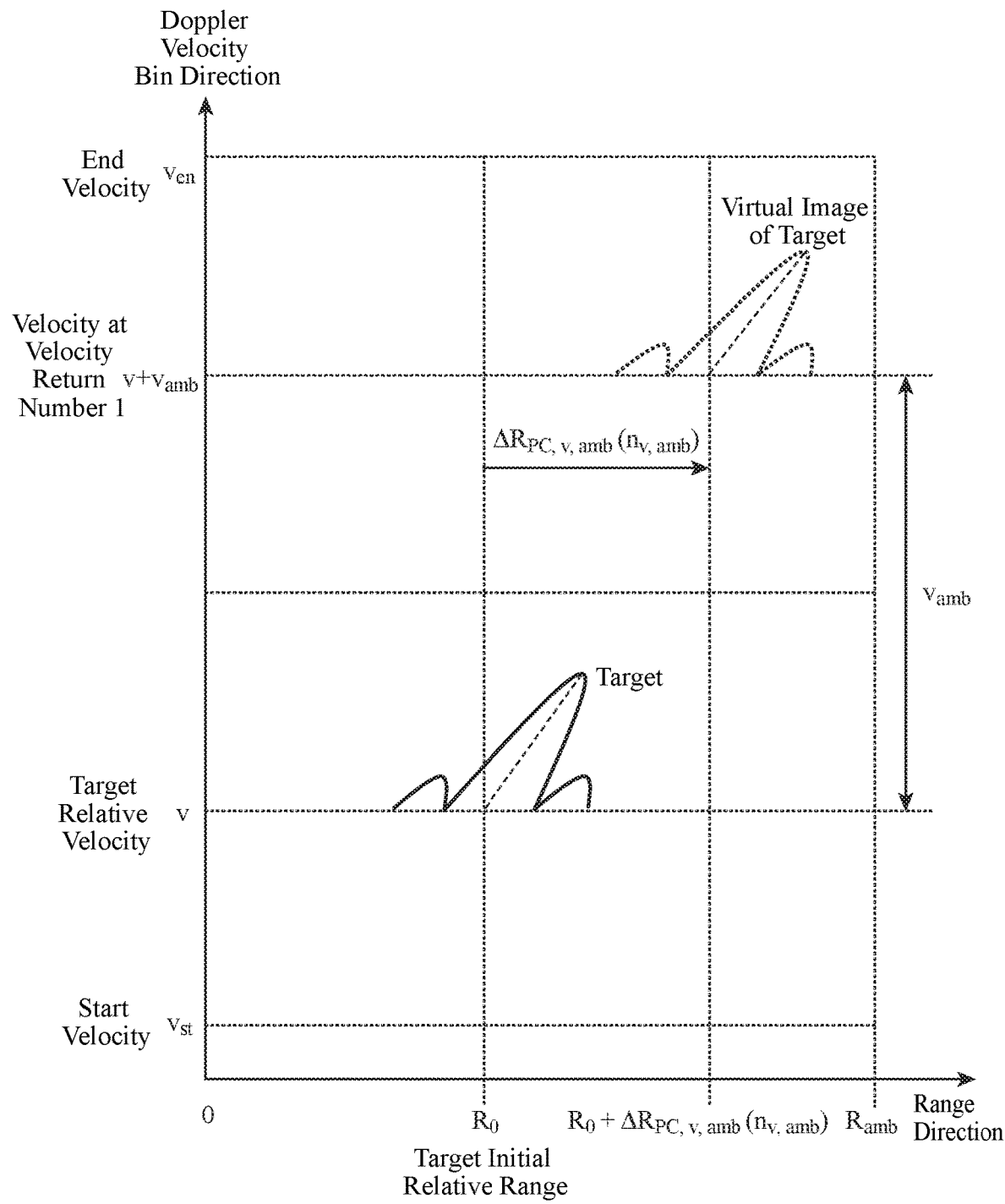
FIG. 23 is an explanatory graph illustrating a signal based on the velocity in which a virtual image is not suppressed and the range after correlation in a case where there is velocity ambiguity according to the first embodiment of the invention.

In a case where the relationship among the velocity $v_{amb}$ that can be measured without ambiguity, the conversion start velocity $v_{st}$, and the conversion end velocity $v_{en}$ is expressed by Equation (32), a virtual image occurs at an interval of the velocity $v_{amb}$ that can be measured without ambiguity from the true target relative velocity v as a reference as illustrated in FIG. 23. The difference $\Delta R_{PC, v, amb}(n_{v, amb})$ between the virtual image range and the target relative range is expressed by Equation (42). Here, $n_{v, amb}$ denotes the velocity return number. A target of the true target relative velocity v is integrated to the true initial target relative range $R_0$ without a loss independently of the velocity $v_{amb}$ that can be measured without ambiguity. In a case where a virtual image is suppressed, the intra-pulse modulation parameter setting unit 125-$n_{Tx}$ is to have the function of calculating and setting an intra-pulse modulation parameter for suppressing signals having different velocity ambiguity levels on the basis of a virtual image suppression evaluation value and a predetermined threshold value. The intra-pulse modulation parameter setting unit 125-$n_{Tx}$ having this function will be referred to as the intra-pulse modulation parameter setting unit 125-$n_{Tx}$B and will be described below.

$$\Delta R_{PC,v,amb}(n_{v,amb}) = f_0 \frac{T_0}{\Delta B} n_{v,amb} v_{amb} \qquad (42)$$

Figure 24:
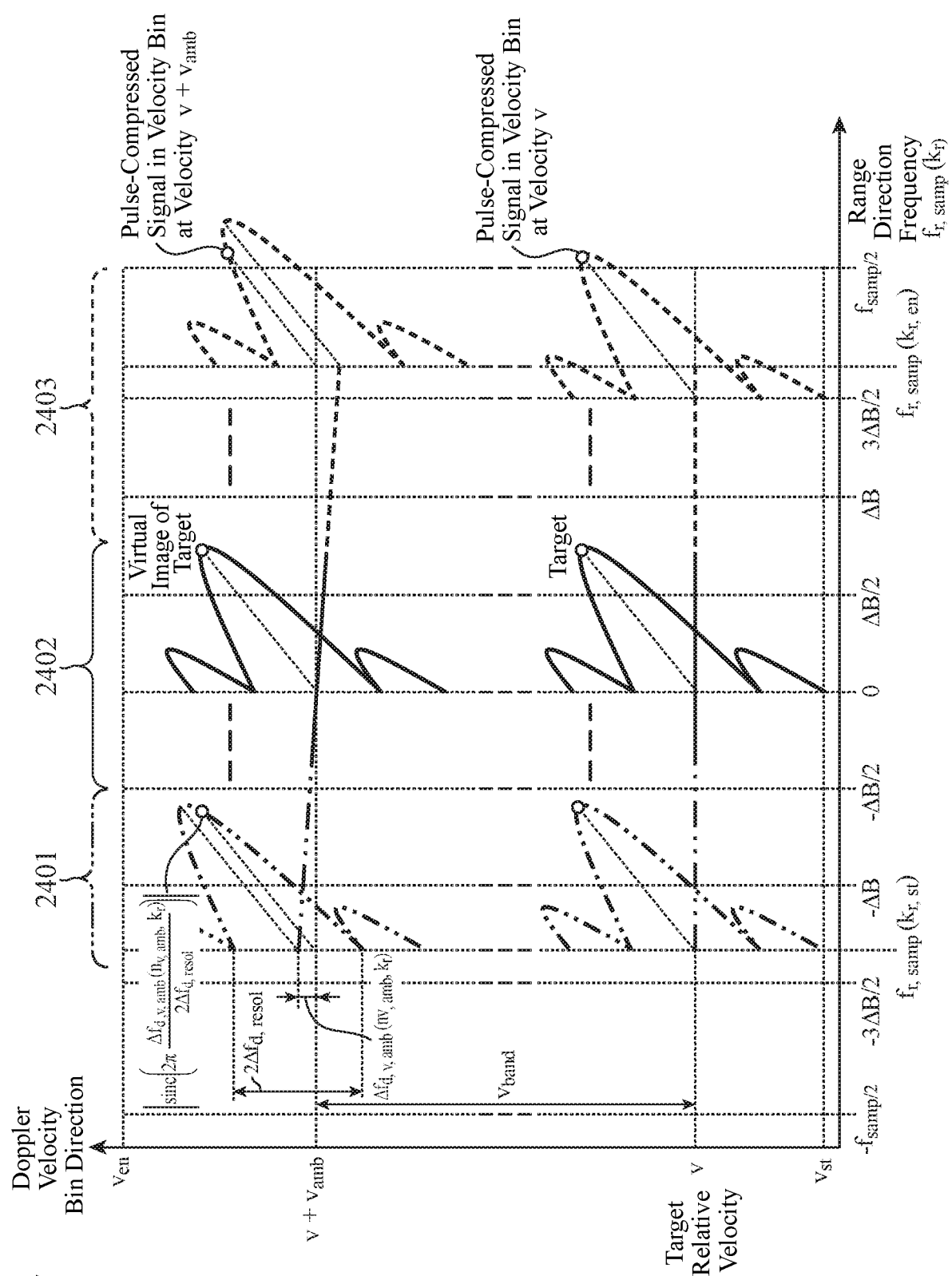
FIG. 24 is an explanatory graph illustrating a signal based on the velocity and the range direction frequency in a case where there is velocity ambiguity (virtual image of a target is not suppressed) according to the first embodiment of the invention.

The intra-pulse modulation parameter setting unit 125-$n_{Tx}$B calculates and sets the intra-pulse modulation parameter so that the virtual image suppression evaluation value $L_{v, amb}(n_{v, amb})$ and the threshold value $L'_{v, amb}$ satisfy the condition of Inequality (43). The intra-pulse modulation parameter setting unit 125-$n_{Tx}$B calculates the virtual image suppression evaluation value $L_{v, amb}(n_{v, amb})$ according to Equation (44) using the intra-pulse modulation parameter. The numerator of Equation (44) represents the amplitude of the band-synthesized signal $R_{\Sigma Tx}(n_\theta, n_{Rx}, h_{czt}, k_{pc})$ based on the velocity and the range after correlation in the case of the velocity return number $n_{v, amb}$ with respect to the true target relative velocity v (integration result), and the denominator of Equation (44) represents the amplitude (theoretical value of the integration result) of the band-synthesized signal $R_{\Sigma Tx}(n_\theta, n_{Rx}, h_{czt}, k_{pc})$ based on the velocity and the range after correlation in the case of the true target relative velocity v. Here, $k_{r, st}$ represents the integration start bin of the range direction frequency, $k_{r, en}$ represents the integration end bin of the range direction frequency, sinc (X) represents the sinc function of a variable X, $\Delta f_{d, v, amb}(n_{v, amb}, k_r)$ represents a difference between the velocity at the range direction frequency bin number $k_r$ and with the velocity return number $n_{v, amb}$ and Doppler frequency when the absolute value of the signal $F_{CZT}(n_{Rx}, h_{czt}, k_r)$ based on the range direction frequency reaches the maximum number (Equation (45)), $\Delta f_{d, resol}$ represents the Doppler frequency resolution (Equation (46)). As illustrated in FIG. 24, when the condition of Inequality (43) is not satisfied, the difference $\Delta f_{d, v, amb}$ ($n_{v, amb}$, $k_r$) from the Doppler frequency is small, and the virtual image is likely to be integrated. Since the integrated values of the target and the virtual image of the target are small, there are disadvantages such as false alarms and deterioration of the ranging performance and the velocity measurement performance. Therefore, the intra-pulse modulation parameter setting unit 125-$n_{Tx}$B operates to calculate and set the intra-pulse modulation parameter so that the virtual image is not integrated, that is, suppressed. Note that a section 2401 indicates a portion, of a signal $F_{CZT}(n_R, h, k_r)$ based on the velocity and the range direction of the reception radar 200-$n_{Rx}$, corresponding to the transmission radar 100-1 at the target relative velocity v, and likewise, a section 2402 represents a portion corresponding to the transmission radar 100-2, and a section 2403 represents a portion corresponding to the transmission radar 100-3.

Figure 25:
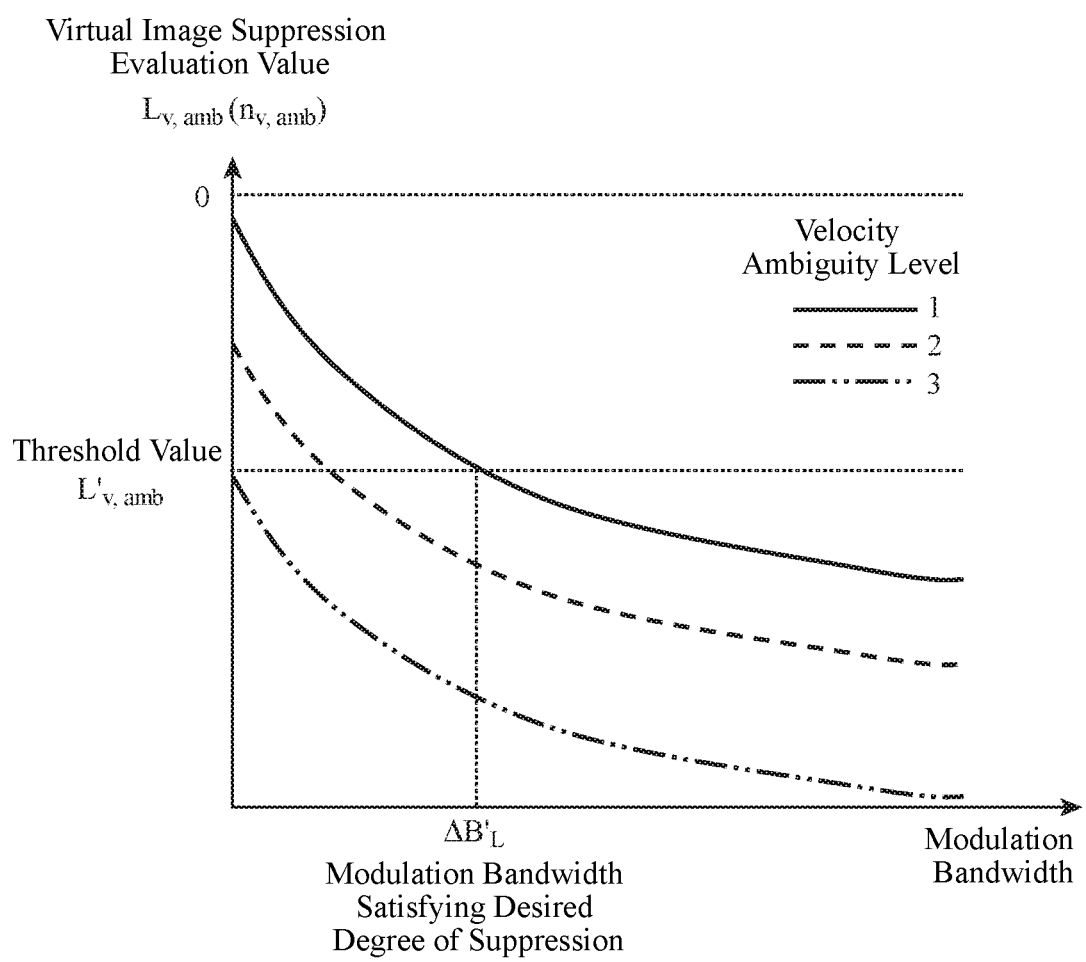
FIG. 25 is an explanatory graph illustrating the relationship between the virtual image suppression evaluation value and a threshold value when the modulation bandwidth is caused to vary.
Figure 26:
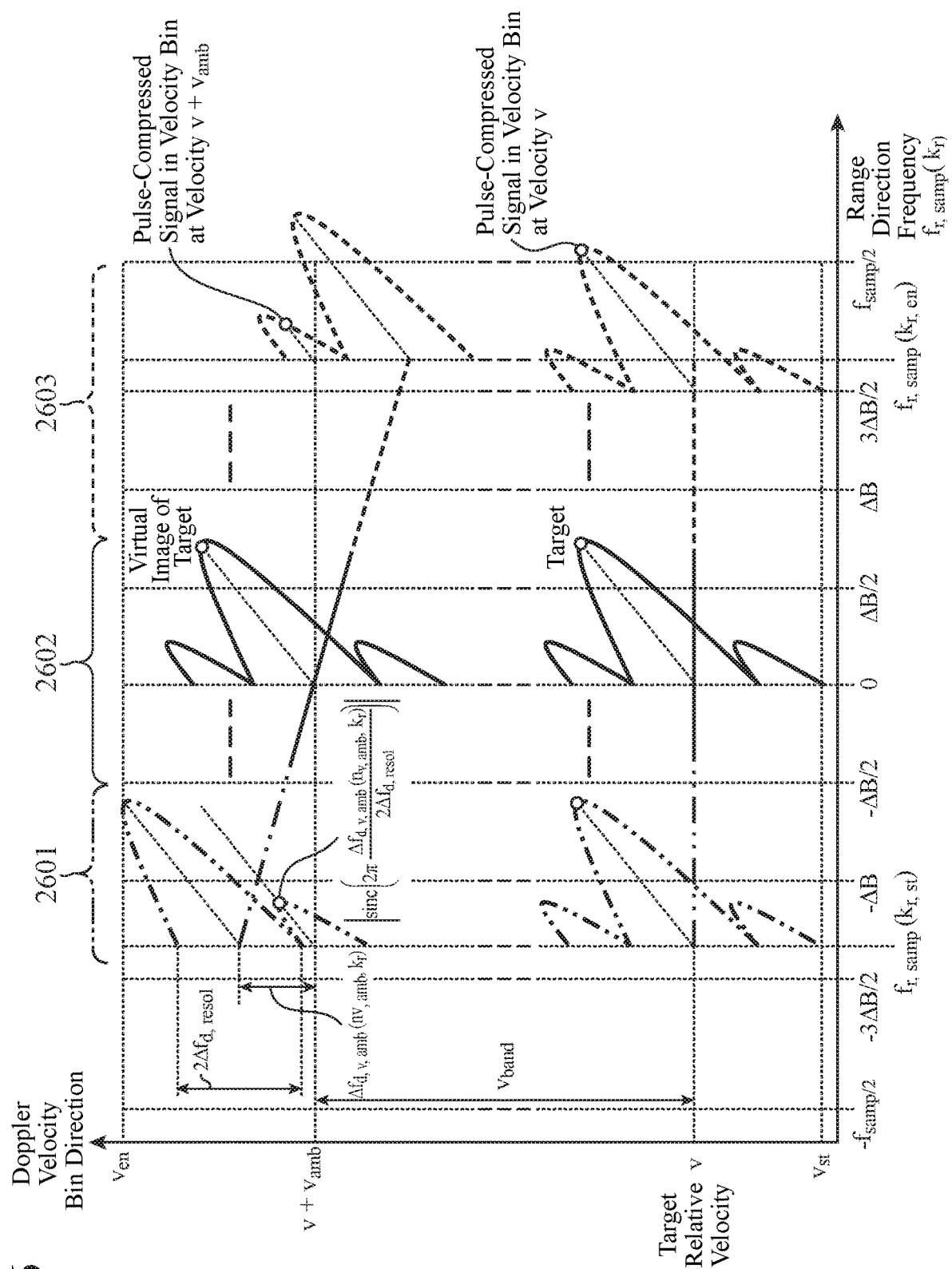
FIG. 26 is an explanatory graph illustrating a signal based on the velocity and the range direction frequency in a case where there is velocity ambiguity (virtual image of a target is suppressed) according to the first embodiment of the invention.
Figure 27:
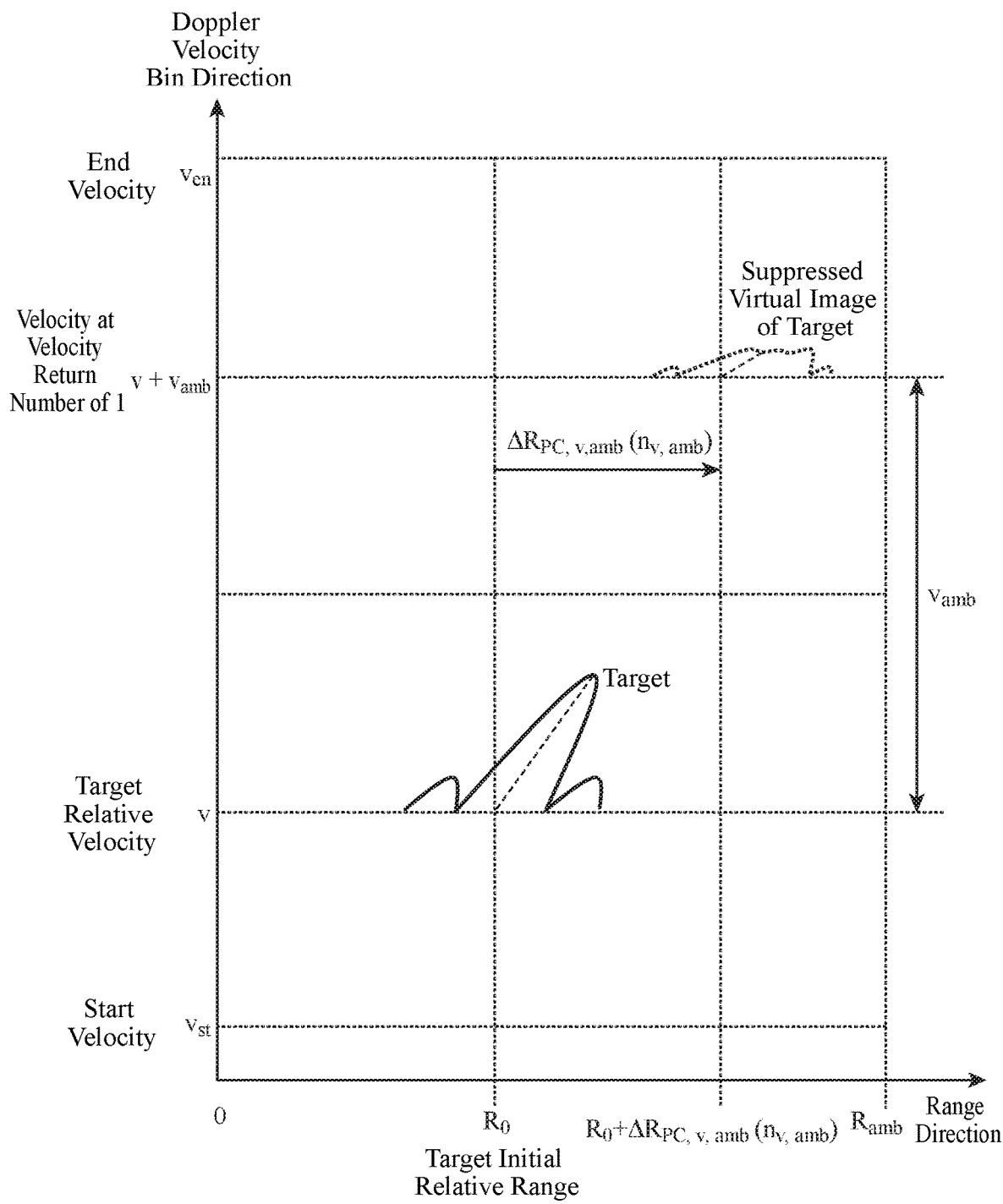
FIG. 27 is an explanatory graph illustrating a signal based on the velocity in which a virtual image is suppressed and the range after correlation in a case where there is velocity ambiguity according to the first embodiment of the invention.

The intra-pulse modulation parameter setting unit 125-$n_{Tx}$B calculates, on the basis of Equations (44) to (46), a modulation bandwidth $\Delta B_{nTx}$ of the intra-pulse modulation parameter with which the virtual image suppression evaluation value $L_{v, amb}(n_{v, amb})$ and the threshold value $L'_{v, amb}$ satisfy the condition of Inequality (43), the pulse repetition interval $T_{pri}$ related to the velocity $v_{amb}$ that can be measured without ambiguity, and the observation time $T_{obs}$ related to the Doppler frequency resolution $\Delta f_{d, resol}$. For example, the intra-pulse modulation parameter setting unit 125-$n_{Tx}$B sets a modulation bandwidth that is greater than or equal to $\Delta B'_L$ that satisfies a desired threshold value $L'_{v, amb}$ as illustrated in FIG. 25 using the relationship between the virtual image suppression evaluation value $L_{v, amb}(n_{v, amb})$ and the threshold value $L'_{v, amb}$ when the modulation bandwidth is varied. As illustrated in FIG. 26, when the modulation bandwidth $\Delta B = \Delta B'_L$ is set, the difference $\Delta f_{d, v, amb}(n_{v, amb}, k_r)$ from the Doppler frequency becomes large while the integrated value of the virtual image becomes small, and thus it becomes possible to obtain a radar apparatus in which a virtual image is suppressed and false alarms are reduced as illustrated in FIG. 27. Note that in FIG. 26, a section 2601 indicates a portion, of a signal $F_{CZT}(n_R, h, k_r)$ based on the velocity and the range direction of the reception radar 200-$n_{Rx}$, corresponding to the transmission radar 100-1 at the target relative velocity v, and likewise, a section 2602 represents a portion corresponding to the transmission radar 100-2, and a section 2603 represents a portion corresponding to the transmission radar 100-3.

When using the intra-pulse modulation parameter setting unit 125-$n_{Tx}$B, the relationship between $SNR_{tgt}$, which is a signal to noise ratio (SNR) after processing of the target, and $SNR_{tgt, v, amb}(n_{v, amb})$, which is an SNR after processing of the virtual image of the target (velocity ambiguity level 1) is expressed as Inequality (47), and $SNR_{tgt}$, which is the SNR of the target expressed by Equation (48), becomes sufficiently larger as compared to $SNR_{tgt, v, amb}(n_{v, amb})$, which is the SNR of the virtual image of the target (velocity ambiguity level 1) expressed by Equation (49), and thus it becomes possible to obtain a radar apparatus with improved detection performance. Here, $SNR_{in}$ denotes the SNR of a reception video signal, $SNR_{ci, imp}$ denotes the SNR improvement degree by the hit-direction frequency domain conversion, $SNR_{pc, imp}$ denotes the SNR improvement degree by the pulse compression, $SNR_{Tx, imp}$ represents the SNR improvement degree by band synthesis, and $M_p$ denotes the number of samples of a reception pulse.

Figure 28B:
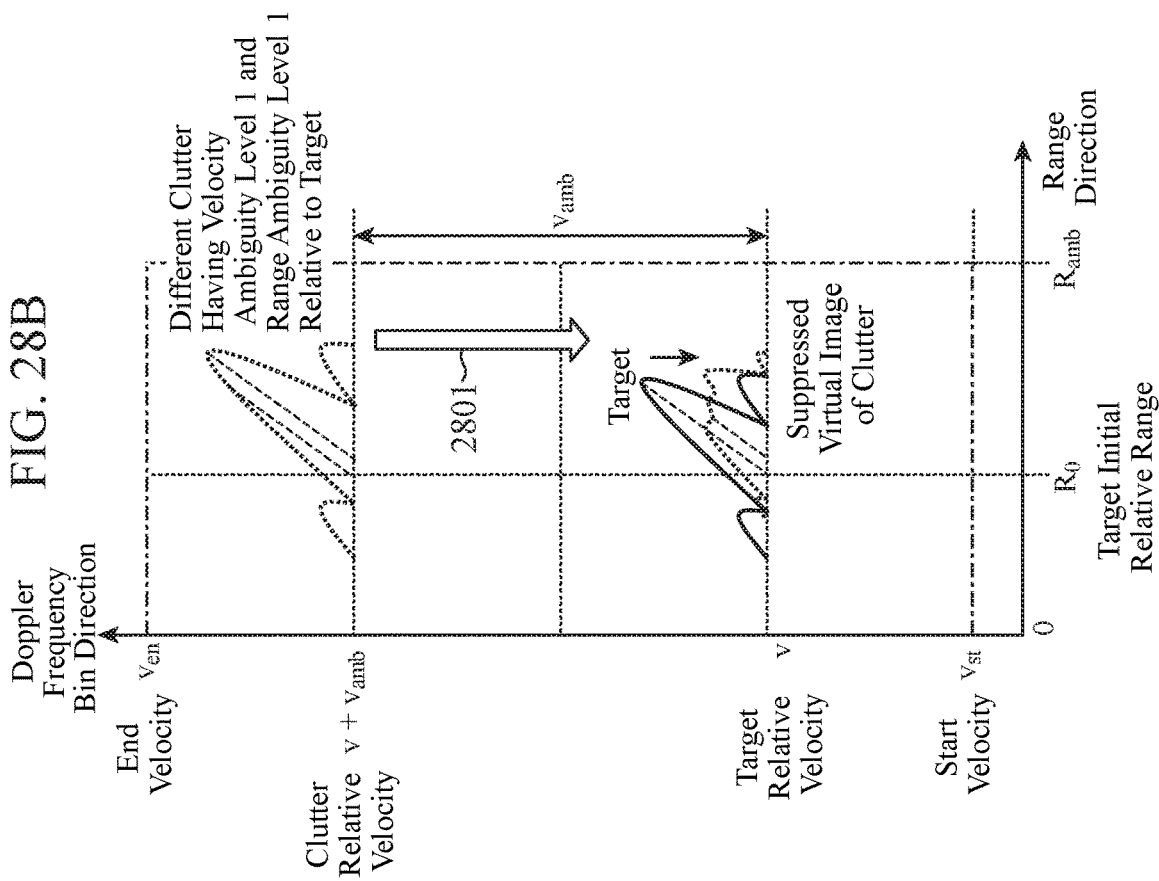
FIG. 28B is an explanatory graph illustrating a target and clutter in the first embodiment.
Figure 28A:
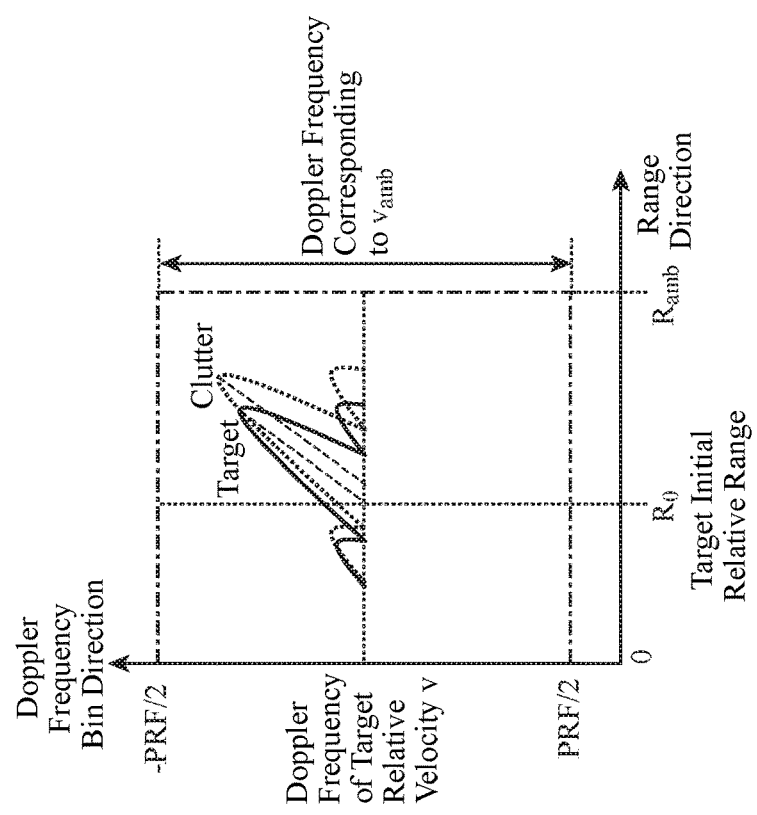
FIG. 28A is an explanatory graph illustrating a target and clutter in a general radar.

As illustrated above, the intra-pulse modulation parameter setting unit 125-$n_{Tx}$B can suppress a virtual image using a desired velocity ambiguity level and an intra-pulse modulation parameter, and thus it is possible to suppress the influence of clutter by calculating and setting the intra-pulse modulation parameter assuming clutter having different velocity ambiguities. As illustrated in FIG. 28A, it is difficult for a general radar to separate and to detect a target from clutter, whereas in the first embodiment using the intra-pulse modulation parameter setting unit $125\text{-}n_{Tx}\text{B}$, the intra-pulse modulation parameter setting unit $125\text{-}n_{Tx}\text{B}$ calculates and sets an intra-pulse modulation parameter so that clutter having different velocity ambiguity levels is suppressed as illustrated in FIG. 28B (see an arrow 2801). Therefore, the relationship between $SNR_{tgt}$, which is the SNR after processing of the target, and $SNR_{clt, v, amb}(n_{clt, v, amb})$, which is an SNR after processing of a virtual image of clutter (velocity ambiguity level 1) is expressed as Inequality (50), and $SNR_{tgt}$, which is the SNR of the target expressed by Equation (48), becomes sufficiently larger as compared to $SNR_{clt, v, amb}(n_{clt, v, amb})$, which is the SNR of the virtual image of the clutter (velocity ambiguity level 1) expressed by Equation (51), and thus it becomes possible to obtain a radar apparatus with improved detection performance. Here, $n_{clt, v, amb}$ denotes the velocity ambiguity level of clutter.

The intra-pulse modulation parameter setting unit $125\text{-}n_{Tx}\text{B}$ outputs an intra-pulse modulation parameter to the intra-pulse modulation signal generator $124\text{-}n_{Tx}$.

$$L_{v,amb}(n_{v,amb}) < L'_{v,amb} \tag{43}$$

$$L_{v,amb}(n_{v,amb}) = \frac{\sum_{k_r=k_{r,st}}^{k_{r,en}} \left| sinc\left(2\pi \frac{\Delta f_{d,v,amb}(n_{v,amb}, k_c)}{2\Delta f_{d,resol}}\right) \right|}{k_{r,en} - k_{r,st}} \tag{44}$$

$$\Delta f_{d,v,amb}(n_{v,amb}, k_r) = f_{r,samp}(k_r) \frac{2n_{v,amb} v_{amb}}{c} \tag{45}$$

$$\Delta f_{d,resol} = \frac{1}{T_{obs}} \tag{46}$$

$$SNR_{tgt} > SNR_{tgt,v,amb}(n_{v,amb}) \tag{47}$$

$$SNR_{tgt} = \\ SNR_{in} + SNR_{ci,imp} + SNR_{pc,imp} + SNR_{Tx,imp} = SNR_{in} + M_p + H + N_{Tx} \tag{48}$$

$$SNR_{tgt,v,amb}(n_{v,amb}) = SNR_{tgt} + L_{v,amb}(n_{v,amb}) \tag{49}$$

$$SNR_{tgt} > SNR_{clt,v,amb}(n_{clt,v,amb}) \tag{50}$$

$$SNR_{clt,v,amb}(n_{clt,v,amb}) = SNR_{tgt} + L_{v,amb}(n_{clt,v,amb}) \tag{51}$$

The target relative velocity/relative range/arrival angle calculating unit 242 calculates the candidate target arrival angle $\theta'_{tgt}$ according to Equation (52), the candidate target relative velocity $v'_{tgt}$ according to Equation (53), and the candidate target relative range $R'_{tgt}$ according to Equation (54) on the basis of the arrival angle candidate number $n_\theta'$, the velocity bin number $h_{czt}'$, and the sampling number $k_{pc}'$ in the range direction, of the acquired candidate target. Here, $\Delta r_{IFFT}$ denotes the sampling interval in the range direction after correlation. The target relative velocity/relative range/arrival angle calculating unit 242 outputs the candidate target arrival angle $\theta'_{tgt}$ corresponding to the arrival angle candidate number $n_\theta'$, the candidate target relative velocity $v'_{tgt}$, and the candidate target relative range $R'_{tgt}$, to the display 250.

$$\theta'_{tgt} = \theta'(n'_\theta) \tag{52}$$

$$v'_{tgt} = v_{czt}(h_{czt}') \tag{53}$$

$$R'_{tgt} = k'_{pc} \Delta r_{IFFT} \tag{54}$$

The display 250 displays the candidate target arrival angle $\theta'_{tgt}$, the candidate target relative velocity $v'_{tgt}$, and the candidate target relative range $R'_{tgt}$ as target information on a screen as signal processing results.

As described above, in the radar apparatus according to the first embodiment, the plurality of transmission radars transmits different transmission frequencies, and in order for the reception radar that receives the signals reflected by a target to coherently integrate reception video signals of the different transmission frequencies without being affected by the Doppler frequency, the range-direction frequency domain converting unit 231-1 performs range-direction frequency domain conversion on the reception video signals to generate signals based on the range direction frequency. The signals based on the range direction frequency generated by the range-direction frequency domain converting unit 231-1 are unified to the same range direction frequency bin among hits, thereby enabling integration in the hit direction without an integration loss. Therefore, it is possible to obtain a radar apparatus with improved target detection performance with a moving target. Moreover, since the correlation unit 233-1 correlates with a reference signal in the range direction frequency domain by the range-direction frequency domain converting unit 231-1 having generated a signal based on the range direction frequency, it is not necessary to perform range-direction frequency domain conversion for each of the transmission radars, and thus it is possible to obtain a radar apparatus having similar effects with a reduced amount of calculation.

The hit-direction frequency domain converting unit 232-1 converts to the hit direction frequency domain by the chirp z conversion with the Doppler frequency interval changed for each of different transmission frequencies and each range direction frequency bin so that the Doppler velocity bins become the same for each different transmission frequency and for each modulation band, that is, for each range direction frequency bin. The conversion processing to the hit-direction frequency domain may be discrete Fourier transform. The hit-direction frequency domain converting unit 232-1 converts to the hit direction frequency domain so that the Doppler velocity bins become the same for each different transmission frequency and for each modulation band, that is, for each range direction frequency bin, and thus it is not necessary to detect or calculate the target relative velocity, and there is no influence of a change of the Doppler frequency due to the modulation band, and thus it is possible to obtain a radar apparatus with improved target detection performance with low SNR.

The correlation unit 233-1 correlates a reference signal $Ex(n_{Tx}, h_{czt}, m)$ based on the velocity corresponding to each transmission frequency and each velocity bin to a signal $F_{CZT}(n_{Tx}, n_{Rx}, h_{czt}, k_r)$ based on the velocity and the range direction frequency, that is, performs pulse compression to generate signals $R_{PC}(n_{Tx}, n_{Rx}, h_{czt}, k_{pc})$ based on the velocity separated for each transmission frequency and a range after correlation. Since the correlation unit 233-1 performs pulse compression using the reference signal $Ex(n_{Tx}, h_{czt}, m)$ based on the velocity corresponding to each transmission frequency and each velocity bin, the pulse compression becomes possible without being affected by the Doppler frequency. As a result, it becomes possible to obtain a radar apparatus, in which both stationary targets and moving targets are pulse-compressed to the initial target relative range, and thus the ranging performance is improved, and an increase of unnecessary peaks can be suppressed even for reception signals having a Doppler frequency. It becomes also possible to obtain a radar apparatus with improved detection performance.

The integration unit 234-1 integrates the signals $R_{PC}(n_{Tx}, n_{Rx}, h_{czt}, k_{pc})$ based on the velocity separated for each transmission frequency acquired from the correlation unit 233-1 and the range after correlation to generate band-synthesized signals $R_{\Sigma Tx}(n_\theta, n_{Rx}, h_{czt}, k_{pc})$ based on the velocity and the range after correlation. In other words, reception video signals having different transmission frequencies are integrated; however in a case where the transmission frequencies are different, the Doppler frequencies are also different, and as a result, the reception video signals having different transmission frequencies have different phases and thus are not coherent, thereby disadvantageously resulting in an integration loss. For this disadvantage, since the correlation unit 233-1 uses a reference signal $Ex(n_{Tx}, h_{czt}, m)$ based on the velocity corresponding to each transmission frequency and each velocity bin, coherence is achieved, thereby enabling integration without a loss. Therefore, it becomes possible to obtain a radar apparatus with improved detection performance since power is increased after the integration.

As described above, the radar apparatus of the first embodiment includes: the plurality of transmission radars for radiating transmission signals each having different frequencies generated using a pulse signal and an intra-pulse modulation signal for modulating the pulse signal; the reception unit for converting reception signals of the transmission signals reflected back by a target into reception video signals; the range-direction frequency domain converting unit for converting the reception video signals into signals based on a range direction frequency; the hit-direction frequency domain converting unit for converting the signals based on the range direction frequency into signals based on a velocity and a range direction frequency so that a target Doppler frequency belongs to the same velocity bin number independently of variations in the frequencies of the transmission signals; the correlation unit for performing correlation processing on the signals output from the hit-direction frequency domain converting unit using a reference signal corresponding to a velocity corresponding to transmission frequencies of the plurality of transmission radars and a velocity bin number and generating signals based on the velocity separated for each of the transmission frequencies of the plurality of transmission radars and a range after correlation; the integration unit for integrating the signals output from the correlation unit with a target arrival angle candidate and generating a band-synthesized signal based on the velocity and the range after correlation; the candidate target detecting unit for detecting a candidate target on the basis of signal intensity from the signals output from the integration unit; and the target relative velocity/relative range/arrival angle calculating unit for calculating a relative velocity, a relative range, and an arrival angle of the candidate target. Therefore, the target detection performance can be improved even when influence of the target Doppler frequency exists.

Furthermore, according to the radar apparatus of the first embodiment, the plurality of transmission radars includes the intra-pulse modulation parameter setting unit for calculating and setting an intra-pulse modulation parameter for suppressing signals having different velocity ambiguity levels on the basis of a virtual image suppression evaluation value and a set threshold value, and thus it becomes possible to obtain a radar apparatus in which a virtual image is suppressed, having the detection performance with suppressed false alarms, and having improved velocity measurement performance for a target having a velocity faster than or equal to the velocity that can be measured without ambiguity. It is also possible to set an intra-pulse modulation parameter so as to suppress clutter having different velocity ambiguity levels, and thus it is possible to obtain a radar apparatus with improved detection performance without being affected by clutter.

Moreover, according to the radar apparatus of the first embodiment, since the plurality of transmission radars modulates the frequency of the pulse signal, the target detection performance can be improved even in a case where there is an influence of a target Doppler frequency.

According to the radar apparatus of the first embodiment, the plurality of transmission radars radiates transmission signals having different frequencies based on the transmission frequencies that are frequency-modulated within the pulse in ascending or descending order at a set frequency interval. Therefore, signals having different transmission frequencies can be transmitted with a simple configuration.

Also, according to the radar apparatus of the first embodiment, the hit-direction frequency domain converting unit performs conversion processing by performing the window function processing on the signal based on the range direction frequency. Therefore, side lobes in the velocity direction of the signal after hit-direction frequency domain conversion are reduced, and thus the target can be avoided from being buried in the side lobes.

Furthermore, according to the radar apparatus of the first embodiment, the hit-direction frequency domain converting unit uses the discrete Fourier transform in order to take samples from a signal based on the velocity and the range direction frequency after the hit-direction frequency domain conversion at a frequency interval set on the basis of a change in transmission frequency, and thus it is possible to obtain a radar apparatus with improved target detection performance.

Furthermore, according to the radar apparatus of the first embodiment, the chirp z transform is used in order to take samples from a signal based on the velocity and the range direction frequency after the hit-direction frequency domain conversion at an interval set on the basis of a change in transmission frequency, and thus it is possible to obtain a radar apparatus with improved target detection performance and to perform processing with less amount of calculation.

In the radar apparatus of the first embodiment, a plurality of transmission radars is assumed; however, only one transmission radar may be operated. Although no band synthesis is performed on reception signals having different transmission frequencies, the range-direction frequency domain converting unit performs the range-direction frequency domain conversion to reduce the influence of a moving target, and the hit-direction frequency domain converting unit compensates (cancels out) for the Doppler frequency difference due to the modulation band, and thus it becomes possible to obtain a radar apparatus with improved integration performance and improved detection performance. In addition, by suppressing a virtual image using the intra-pulse modulation parameter setting unit as a single transmission radar, it is possible to obtain a radar apparatus having improved velocity measurement performance for a target having a velocity faster than or equal to the velocity that can be measured without ambiguity.

Second Embodiment

Figure 29:
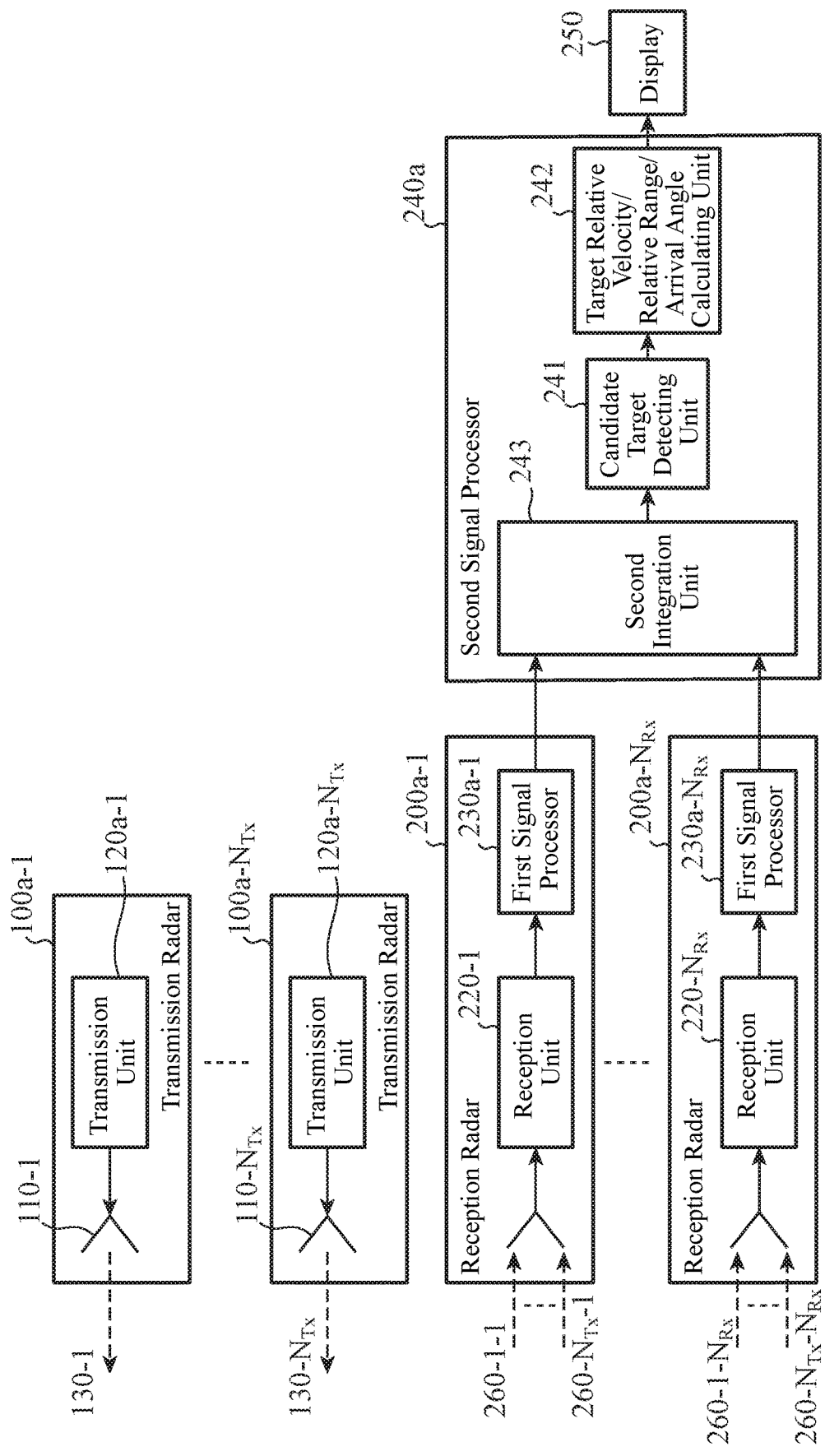
FIG. 29 is a configuration diagram illustrating a radar apparatus according to a second embodiment of the invention.

As illustrated in FIG. 29, a radar apparatus according to a second embodiment includes transmission radars 100$a$-$n_{Tx}$ (transmission radar number $n_{Tx}$, in the case of $N_{Tx}$ transmission radars, $n_{Tx}=1, 2, \ldots, N_{Tx}$), reception radars $200a\text{-}n_{Rx}$ (reception radar number $n_{Rx}$, in the case of $N_{Rx}$ reception radars, $n_{Rx}=1, 2, \ldots, N_{Rx}$, in the second embodiment the case where $N_{Rx}$ is a plural number will be described), a second signal processor 240a, and a display 250.

The radar apparatus of the second embodiment is different from the radar apparatus of the first embodiment in the configurations of a transmission unit $120a\text{-}n_{Tx}$ of a transmission radar $100a\text{-}n_{Tx}$, a first signal processor $230a\text{-}n_{Rx}$ of a reception radar $200a\text{-}n_{Rx}$, and the second signal processor 240a. Other configurations are similar to those of the first embodiment, and thus corresponding parts are denoted by the same symbol, and description thereof will be omitted.

Figure 30:
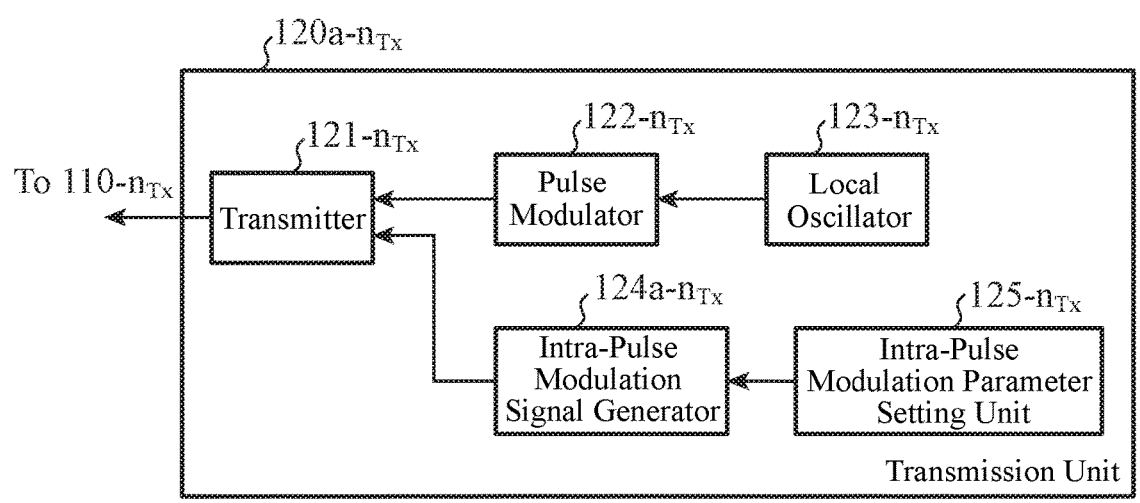
FIG. 30 is a configuration diagram illustrating a transmission unit of the radar apparatus according to the second embodiment of the invention.

FIG. 30 is a configuration diagram of a transmission unit $120a\text{-}n_{Tx}$. As illustrated in the figure, the transmission unit $120a\text{-}n_{Tx}$ includes a transmitter $121\text{-}n_{Tx}$, a pulse modulator $122\text{-}n_{Tx}$, a local oscillator $123\text{-}n_{Tx}$, an intra-pulse modulation signal generator $124a\text{-}n_{Tx}$, an intra-pulse modulation parameter setting unit $125\text{-}n_{Tx}$, and has a similar configuration to that of the first embodiment except for the intra-pulse modulation signal generator $124a\text{-}n_{Tx}$.

Figure 31:
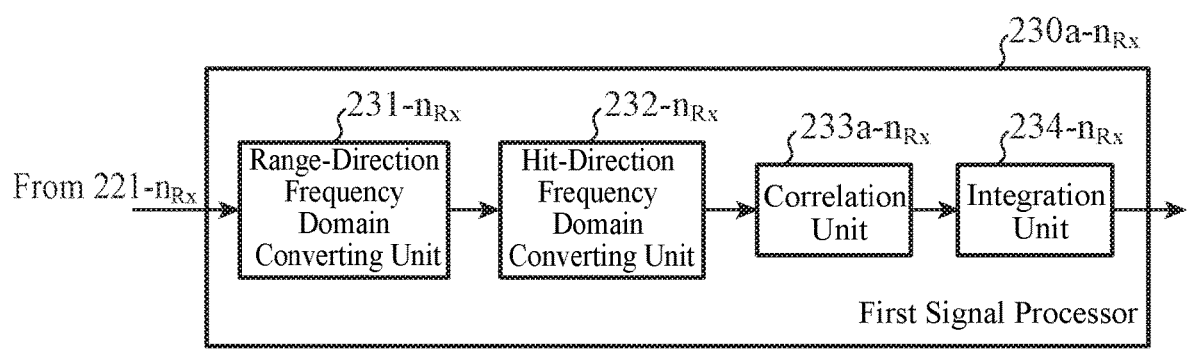
FIG. 31 is a configuration diagram illustrating a first signal processor of the radar apparatus according to the second embodiment of the invention.

FIG. 31 is a configuration diagram of a first signal processor $230a\text{-}n_{Rx}$. As illustrated, the first signal processor $230a\text{-}n_{Rx}$ includes a range-direction frequency domain converting unit $231\text{-}n_{Rx}$, a hit-direction frequency domain converting unit $232\text{-}n_{Rx}$, a correlation unit $233a\text{-}n_{Rx}$, and an integration unit $234\text{-}n_{Rx}$, and has a similar configuration to that of the first signal processor 230-1 of the first embodiment except for the correlation unit $233a\text{-}n_{Rx}$.

The second signal processor 240a is different from the first embodiment in that a second integration unit 243 is included.

The intra-pulse modulation signal generator $124a\text{-}n_{Tx}$ of the transmission unit $120a\text{-}n_{Tx}$ generates an intra-pulse modulation signal $L_{chp}(n_{Tx}, h, t)$ for frequency-modulating the pulse signals using the frequency modulation amount $Bn_{Tx}$ and the modulation bandwidth $\Delta Bn_{Tx}$ according to Equation (55) and so that frequency modulations of adjacent frequency bands are complex conjugates and outputs the intra-pulse modulation signal to the transmitter $121\text{-}n_{Tx}$. Here, for $\pm$, the minus sign is used (that is, frequency modulation of down chirp) when $n_{Tx}$ is an odd number, and the plus sign is used (that is, frequency modulation of up chirp) when $n_{Tx}$ is an even number.

Figure 32:
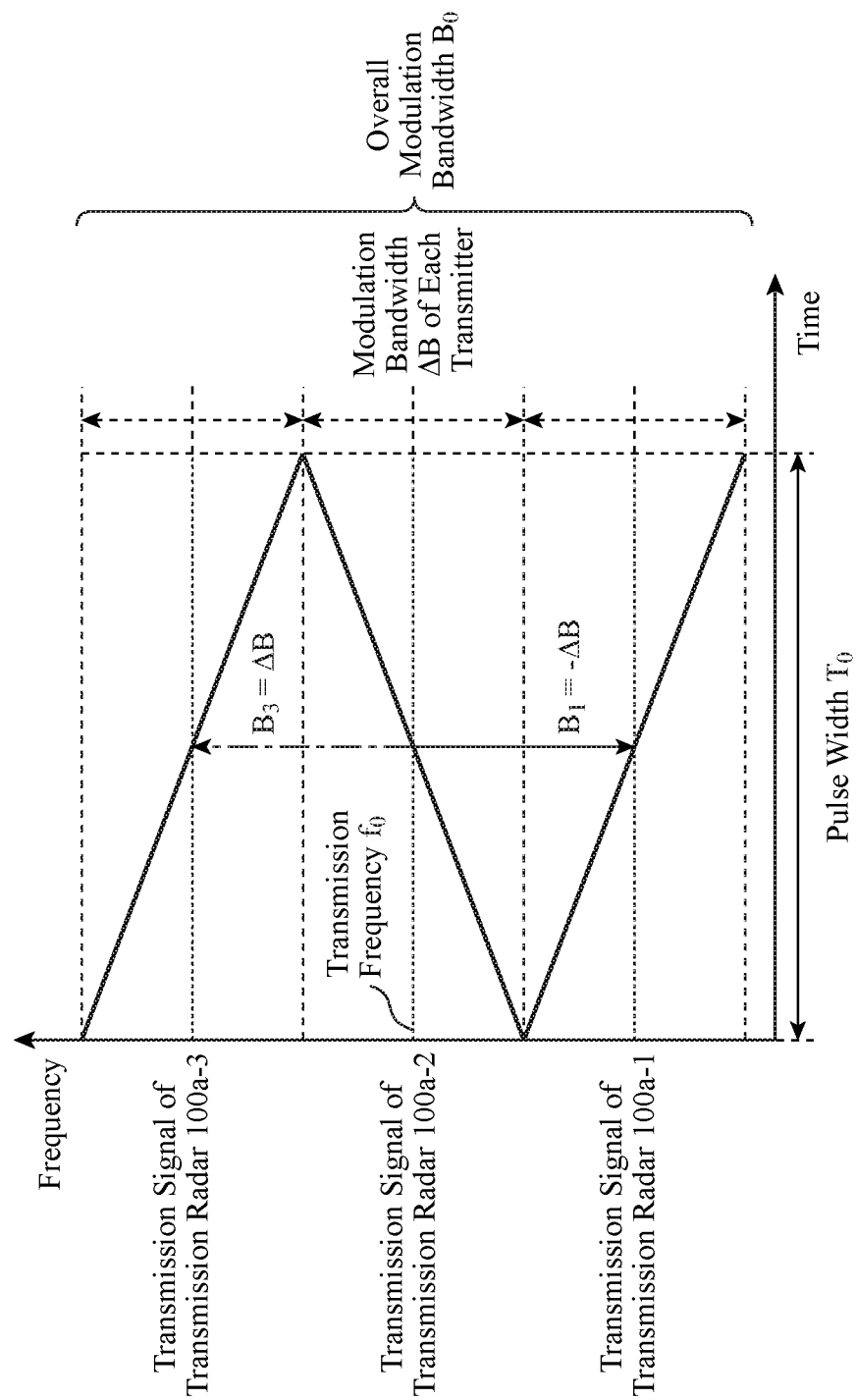
FIG. 32 is a configuration diagram illustrating a case where an inter-hit code demodulating unit is included in the first signal processor of the radar apparatus according to the second embodiment of the invention.

In FIG. 32, the relationship among the frequency modulation amount $Bn_{Tx}$, the modulation bandwidth $\Delta Bn_{Tx}$, and the frequency modulation of each transmission radar is illustrated. The frequency modulation amount $B_2$ is zero.

$$L_{chp}(n_{Tx}, h, t) = \tag{55}$$
$$\begin{cases} A_L \exp\left(j2\pi\left(B_{n_{Tx}}t \pm \frac{\Delta B_{n_{Tx}}}{2T_0}t^2\right)\right), & hT_{pri} \leq t < hT_{pri} + T_0 \\ 0, & \text{otherwise} \end{cases}$$

$(h = 0, 1, \ldots, H-1)$ $(n_{Tx} = 1, 2, \ldots, N_{Tx})$

Furthermore, according to Equation (56), code modulation, for example, a pseudorandom sequence may be used for intra-pulse modulation $\beta(n_{Tx})$ instead of frequency modulation. Nonlinear frequency modulation may be used for the intra-pulse modulation $\beta(n_{Tx})$ instead of frequency modulation. The modulation of each of the transmission radars $n_{Tx}$, may be the same. Different modulation may be performed so as to obtain modulation with a high degree of orthogonality for each of the transmission radars $n_{Tx}$.

$$L_{chp}(n_{Tx}, h, t) = \tag{56}$$
$$\begin{cases} A_L \exp(j2\pi(B_{n_{Tx}}t + \beta(n_{Tx}, t))), & hT_{pri} \leq t < hT_{pri} + T_0 \\ 0, & \text{otherwise} \end{cases}$$

$(h = 0, 1, \ldots, H-1)$ $(n_{Tx} = 1, 2, \ldots, N_{Tx})$

In addition to the intra-pulse modulation $\beta(n_{Tx}, t)$, inter-hit code modulation may also be performed according to Equation (57). Symbol $\beta_c(h)$ denotes an inter-hit modulation code.

$$L_{chp}(n_{Tx}, h, t) = \tag{57}$$
$$\begin{cases} A_L \exp(j2\pi(B_{n_{Tx}}t + \beta(n_{Tx}, t) + \beta_c(h))), & hT_{pri} \leq t < hT_{pri} + T_0 \\ 0, & \text{otherwise} \end{cases}$$

$(h = 0, 1, \ldots, H-1)$ $(n_{Tx} = 1, 2, \ldots, N_{Tx})$

Figure 33:
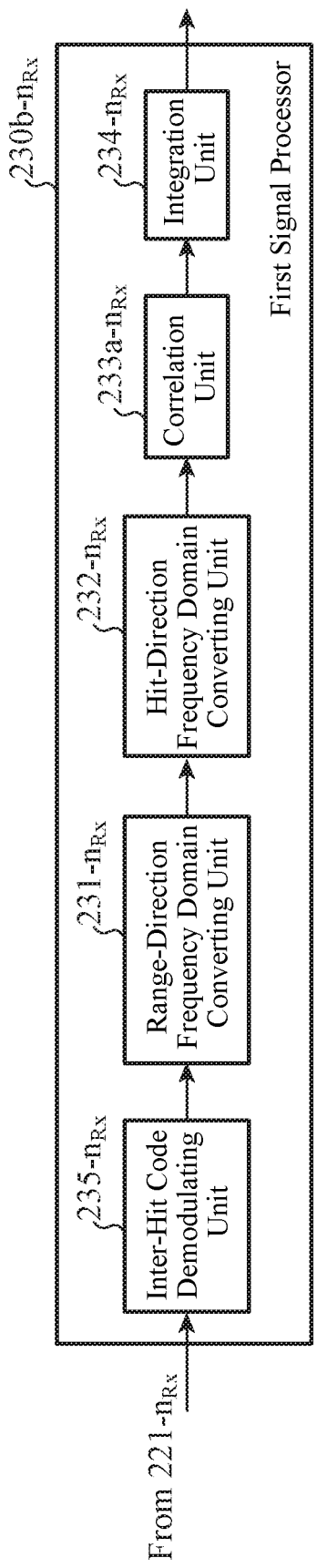
FIG. 33 is an explanatory diagram illustrating a band-synthesized signal based on the velocity and the range after correlation according to the second embodiment of the invention.

In the second embodiment, in a case where the inter-hit code modulation is performed, an inter-hit code demodulating unit $235\text{-}n_{Rx}$ is provided as a preceding stage of the range-direction frequency domain converting unit $231\text{-}n_{Rx}$ as the first signal processor $230b\text{-}n_{Rx}$ as illustrated in FIG. 33, and the inter-hit code is demodulated according to Equation (58). Here, $h_c$ denotes an assumed echo order. In a case where the range ambiguity level $h_c=0$ holds, the reception signal is reflected from a target at a range less than or equal to the range $R_{amb}$ that can be measured without ambiguity, and in a case where the range ambiguity level $h_c=1$ holds, the reflection reception signal is reflected from a target having a range ambiguity level of 1. As expressed by Equation (58), although a target reception signal from the assumed range ambiguity level $h_c$ is demodulated and integrated without a loss, a reflected reception signal having a range ambiguity level different from the assumed range ambiguity level $h_c$ is not demodulated, and thus the phases is diffused among hits, preventing coherent integration from being performed but resulting in diffusion (suppression). Therefore, by adding a sign in the hit direction, the SNR is improved only with the target reflection reception signal from a desired range ambiguity level, and reflection reception signals from different range ambiguity levels, for example, from clutter are suppressed, and thus it becomes possible to obtain a radar apparatus with improved target detection performance.

$$V''(n_{Rx}, h, m) = V(n_{Rx}, h, m)\exp(-j2\pi\beta_c(h + h_c)) \tag{58}$$

Figure 34:
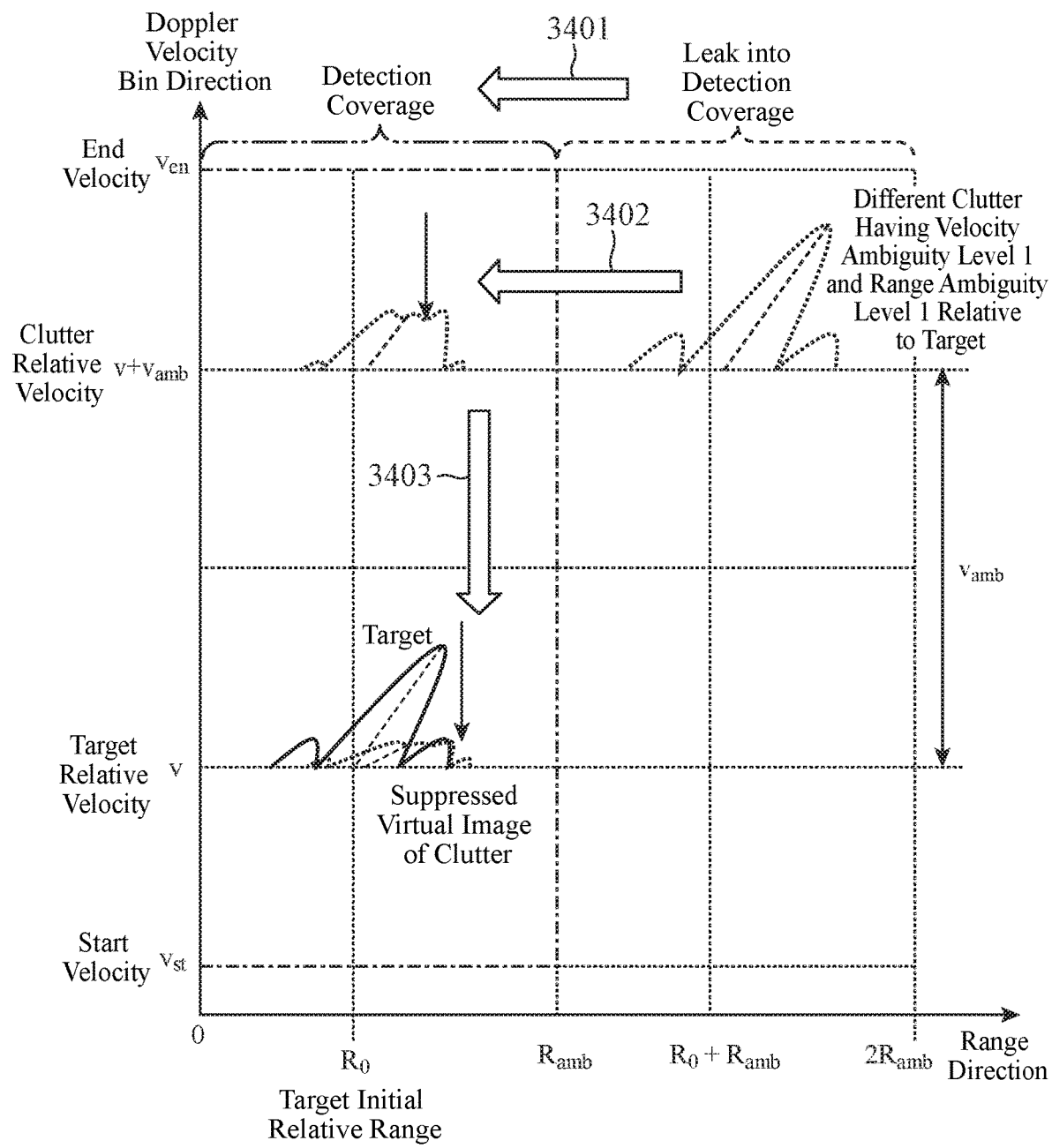
FIG. 34 is an explanatory graph illustrating the relationship among the transmission frequency, the modulation bandwidth, and the frequency modulation, of a transmission radar of the radar apparatus according to the second embodiment of the invention.

$(m = 0, 1, \ldots, M-1)$ $(h = 0, 1, \ldots, H-1)$ $(n_{Rx} = 1, 2, \ldots, N_{Rx})$ As illustrated in FIG. 34, in the second embodiment using the intra-pulse modulation signal generator $124a\text{-}n_{Tx}$ that enables addition of the inter-hit code modulation, the intra-pulse modulation parameter setting unit 125-$n_{Tx}$B calculates and sets the intra-pulse modulation parameter so as to suppress clutter having different range ambiguity levels or velocity ambiguity levels. Therefore, the relationship between SNR$_{tgt}$, which is the SNR after processing of the target, and SNR$_{clt, v, r, amb}$($n_{clt, v, amb}$, $n_{clt, r, amb}$), which is the SNR after processing of a virtual image of clutter (velocity ambiguity level $n_{clt, v, amb}$, range ambiguity level is expressed by Inequality (59) in a case where hit direction code modulation is also performed, and SNR$_{tgt}$, which is the SNR of the target expressed by Equation (48), becomes sufficiently larger as compared to SNR$_{clt, v, r, amb}$($n_{clt, v, amb}$, $n_{clt, r, amb}$), which is the SNR of the virtual image of the clutter (velocity ambiguity level $n_{clt, v, amb}$, range ambiguity level $n_{clt, r, amb}$) expressed by Equation (60) in a case where hit-direction code modulation is performed (codes are diffused), and thus it becomes possible to obtain a radar apparatus with improved detection performance.

Therefore, SNR$_{clt, v, r, amb}$($n_{clt, v, amb}$, $n_{clt, r, amb}$), which is the SNR after processing of a virtual image of clutter (velocity ambiguity level $n_{clt, v, amb}$, range ambiguity level $n_{clt, r, amb}$) expressed by Equation (60) in a case where hit direction code modulation is also performed (codes are diffused), is suppressed as compared to SNR$_{clt, v, amb}$ ($n_{clt, v, amb}$), which is the SNR of the virtual image of the clutter (velocity ambiguity level $n_{clt, v, amb}$, range ambiguity level $n_{clt, r, amb}$) in a case where no hit-direction code modulation is performed, and thus it becomes possible to obtain a radar apparatus with improved detection performance further without being affected by the clutter.

$$SNR_{tgt} > SNR_{clt,v,amb}(n_{clt,v,amb}) > SNR_{clt,v,r,amb}(n_{clt,v,amb}) \quad (59)$$

$$SNR_{clt,v,r,amb}(n_{clt,v,amb}, n_{clt,r,amb}) = SNR_{tgt} + L_{v,amb}(n_{clt,v,amb}) - H \quad (60)$$

That is, as indicated by an arrow 3401 in FIG. 34, different pieces of clutter having a velocity ambiguity level off and a range ambiguity level of 1 relative to a target leak into the detection coverage. On the other hand, as indicated by an arrow 3402, suppression is performed using the difference in the range ambiguity level. Suppression is further performed using the difference in the velocity ambiguity level as indicated by an arrow 3403.

The correlation unit 233a-$n_{Rx}$ generates a reference signal Ex($n_{Tx}$,$h_{czt}$, m) including a Doppler frequency corresponding to the velocity of each velocity bin according to Equation (61) in addition to the frequency modulation amount B$_{nTx}$ and the modulation bandwidth ΔBn$_{Tx}$ of each of the transmission radars 100a-$n_{Tx}$ that are the same as the intra-pulse modulation signal L$_{chp}$($n_{Tx}$, h, t). Furthermore, in a case where the intra-pulse modulation is not frequency modulation, the correlation unit 233a-$n_{Rx}$ generates a reference signal Ex($n_{Tx}$, $h_{czt}$, m) including a Doppler frequency corresponding to the velocity of each velocity bin according to Equation (62) in addition to the frequency modulation amount Bn$_{Tx}$, the modulation bandwidth ΔBn$_{Tx}$, and the intra-pulse modulation of each of the transmission radars 100a-$n_{Tx}$ that are the same as the intra-pulse modulation signal L$_{chp}$($n_{Tx}$, h, t). As expressed by Equation (62), since the reference signal Ex($n_{Tx}$, $h_{czt}$, m) includes the Doppler frequency corresponding to the velocity of each velocity bin, it is possible to perform coherent integration without being affected by the Doppler frequency independently of the intra-pulse modulation.

For ± in Equation (61), the minus sign is used (that is, frequency modulation of down chirp) when $n_{Tx}$ is an odd number, and the plus sign is used (that is, frequency modulation of up chirp) when $n_{Tx}$ is a even number. Since the subsequent pulse compression processing is the same as that of the correlation unit 233-1 of the first embodiment, description thereof is omitted here.

$$Ex(n_{Tx}, h_{czt}, m) = \begin{cases} A_E \exp\left(j2\pi\left(B_{n_{Tx}}m\Delta t \pm \frac{\Delta B_{n_{Tx}}}{2T_0}m^2\Delta t^2\right)\right) \\ \exp\left(j2\pi(f_0 + B_{n_{Tx}})\frac{2v_{czt}(h_{czt})}{c}m\Delta t\right), \\ 0 \le m\Delta t \le T_0 \\ 0, \text{ otherwise} \end{cases} \quad (61)$$

$(m = 0, 1, \ldots, M)$ $(h_{czt} = 0, 1, \ldots, H_{czt} - 1)$ $(n_{Tx} = 1, 2, \ldots, N_{Tx})$ $$Ex(n_{Tx}, h_{czt}, m) = \begin{cases} A_E \exp(j2\pi(B_{n_{Tx}}m\Delta t + \beta(n_{Tx}, m))) \\ \exp\left(j2\pi(f_0 + B_{n_{Tx}})\frac{2v_{czt}(h_{czt})}{c}m\Delta t\right), \\ 0 \le m\Delta t \le T_0 \\ 0, \text{ otherwise} \end{cases} \quad (62)$$

Figure 35:
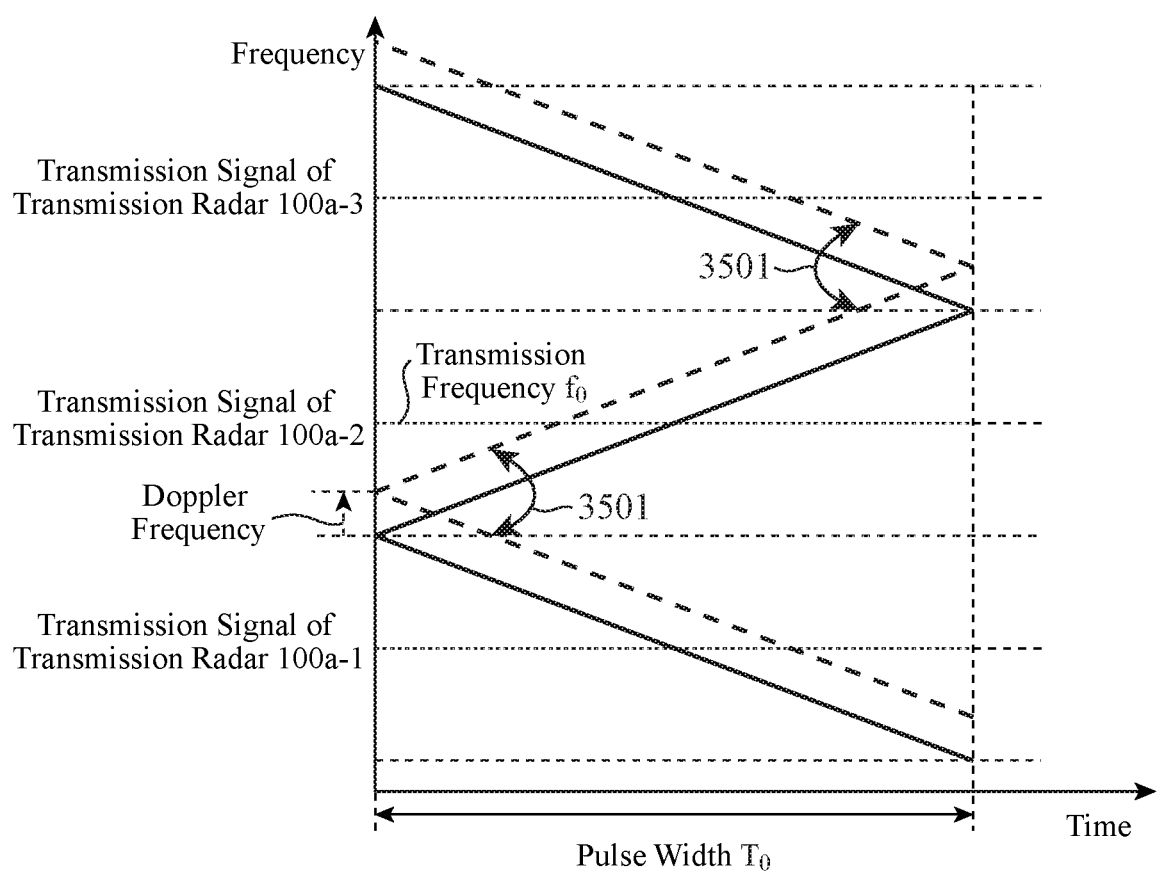
FIG. 35 is an explanatory diagram illustrating transmission signals and reception signals affected by the Doppler frequency according to the second embodiment of the invention.
Figures 36A, 36B, 36C:
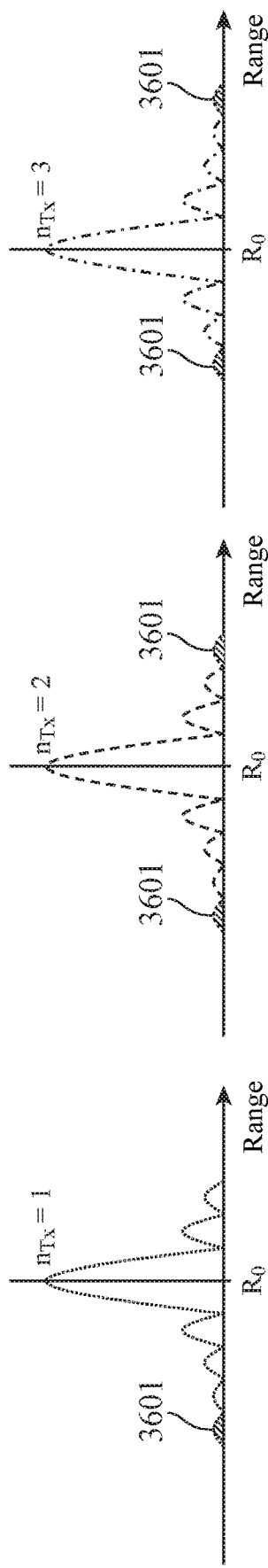
FIGS. 36A, 36B, and 36C are explanatory diagrams illustrating the influence of the Doppler frequency when pulse compression is performed in a case where the frequency modulations of adjacent frequency bands are complex conjugates.
Figure 37:
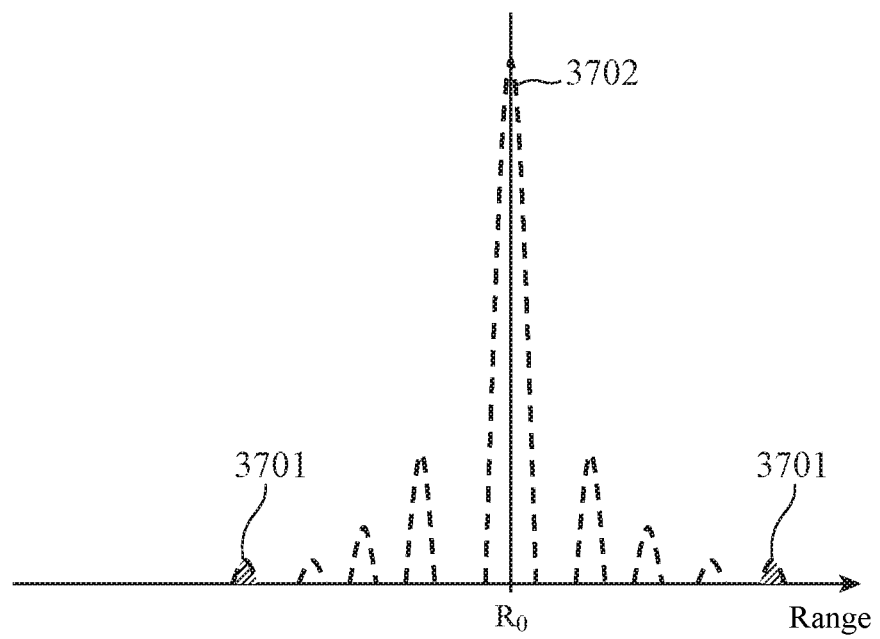
FIG. 37 is an explanatory graph illustrating the influence of the Doppler frequency when signals after correlation for each transmission frequency are subjected to band synthesis when frequency modulations of adjacent frequency bands are complex conjugates.

$(m = 0, 1, \ldots, M)$ $(h_{czt} = 0, 1, \ldots, H_{czt} - 1)$ $(n_{Tx} = 1, 2, \ldots, N_{Tx})$ The effect obtained in a case where the transmission radar 100a-$n_{Tx}$ transmits a transmission signal in which frequency modulations of adjacent are complex conjugates as illustrated in FIG. 34 and the correlation unit 233a-$n_{Rx}$ performs pulse-compression will be described. In FIG. 35, reception signals in a case where there is a Doppler frequency is illustrated. In FIG. 35, a transmission signal of the transmission radar 100a-$n_{Tx}$ is indicated by a solid line, and a reception signal that is affected by the Doppler frequency is indicated by a broken line. Since the transmission signals of the transmission radars 100a-$n_{Tx}$ are made so that the frequency modulations of adjacent bands are complex conjugates, the cross-correlation is canceled out during pulse compression (see an arrow 3501), and as illustrated in FIG. 36, there are effects that no unnecessary peak appears and that side lobes do not increase (see a section 3601). Note that a signal after correlation of the transmission radar 100a-1 is illustrated in FIG., 36A, a signal after correlation of the transmission radar 100a-2 is illustrated in FIG. 36B, and a signal after correlation of the transmission radar 100a-3 is illustrated in FIG. 36C. Also as illustrated in FIG. 37, in a case where band synthesis is performed by the integration unit 234-$n_{Rx}$, there is no influence of cross-correlation, side lobes do not increase, and an integration result with low side lobes can be obtained (see a section 3701). Furthermore, since the bands are combined, there are effects that the power is increased and that the range resolution is improved (see a section 3702). That is, it is possible to obtain a radar apparatus with improved detection performance.

Figure 38:
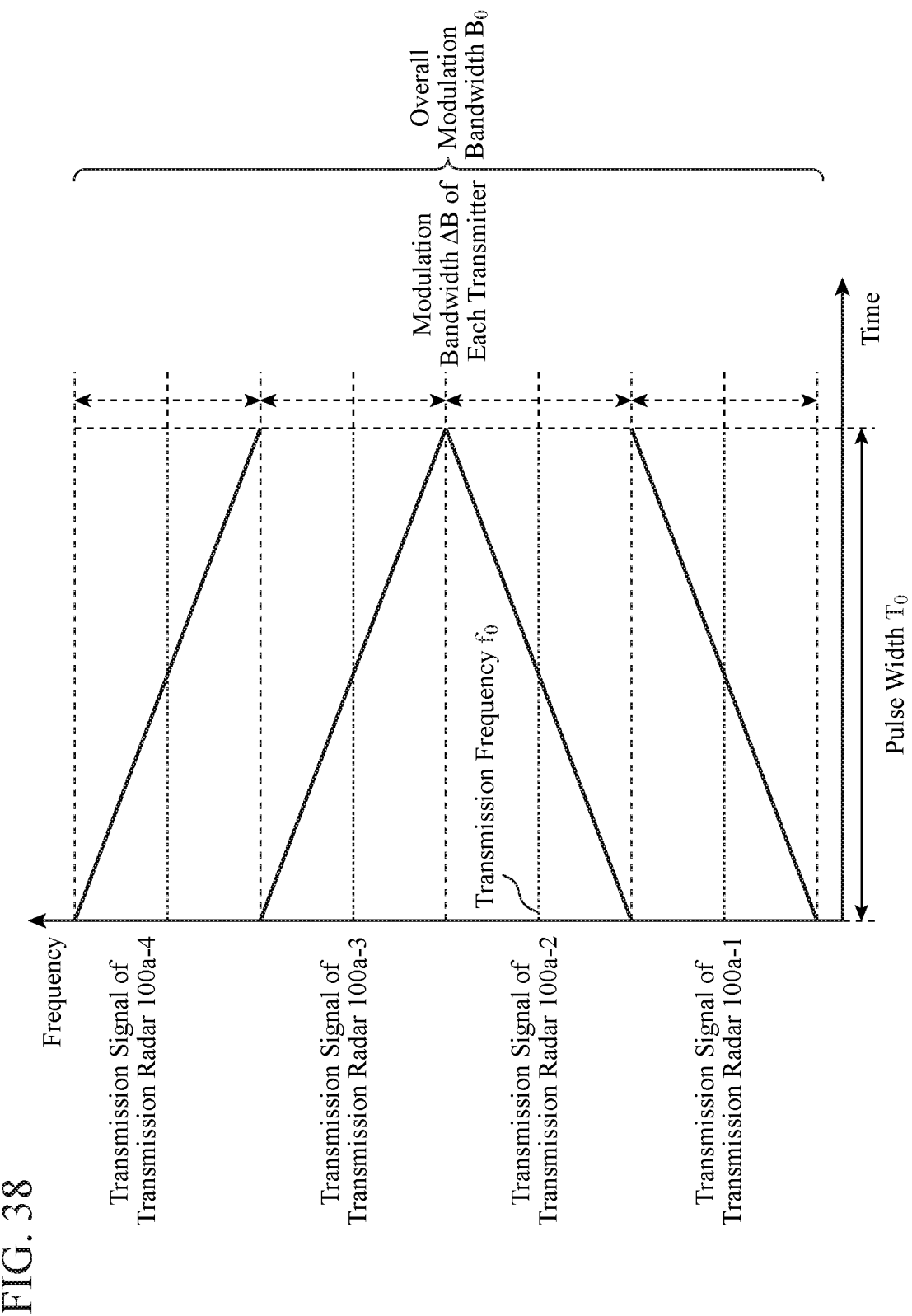
FIG. 38 is an explanatory graph illustrating a modification of the relationship among the transmission frequency, the modulation bandwidth, and the frequency modulation, of a transmission radar of the radar apparatus according to the second embodiment of the invention.

Also, as illustrated in FIG. 38, frequency modulations of symmetrical frequency bands may be complex conjugates. In the illustrated example, the transmission signal of the transmission radar 100a-1 and the transmission signal of the transmission radar 100a-4, and the transmission signal of the transmission radar 100a-2 and the transmission signal of the transmission radar 100a-3 are complex conjugates. Also, with such a configuration, an effect similar to that in the case of transmitting transmission signals in which the frequency modulations of adjacent bands are complex conjugates can be obtained.

The second integration unit 243 receives input of band synthesized signals $R_{\Sigma Tx}(n_\theta, n_{Rx}, k_{pc})$ based on the velocity and the range after correlation from the first signal processors 230a-1 to $N_{Rx}$. The second integration unit 243 performs integration on the band synthesized signals $R_{\Sigma Tx}(n_\theta, n_{Rx}, k_{pc})$ based on the velocity and the range after correlation for each of the reception radars 200a-$n_{Rx}$ according to Equation (63) to generate an integrated signal $R_{\Sigma Tx, Rx}(n_\theta, h_{czt}, k_{pc})$ based on the velocity and the range after correlation. Where $\theta=\theta'(n_\theta)$ holds, the band synthesized signals $R_{\Sigma Tx}(n_\theta, n_{Rx}, k_{pc})$ based on the velocity and the range after correlation for each of the reception radars 200a-$n_{Rx}$ are integrated coherently, and the integrated signal $R_{\Sigma Tx}(n_\theta, n_{Rx}, h_{czt}, k_{pc})$ based on the velocity and the range after correlation reaches the maximum value at the arrival angle candidate number $n_\theta'$ of the detected candidate target, the velocity bin number $h_{czt}'$, and the frequency sampling number $k_{pc}'$ in the range direction. By integrating the signals for each of the reception radars 200a-$n_{Rx}$, it becomes possible to obtain a radar apparatus with increased power and improved detection performance. By integrating the signals for each of the reception radars 200a-$n_{Rx}$, the antenna aperture length is virtually increased, resulting in the effect of improving the angular resolution.

$$R_{\Sigma Tx, Rx}(n_\theta, h_{czt}, k_{pc}) = \qquad (63)$$

$$\sum_{n_{Rx}=1}^{N_{Rx}} R_{\Sigma Tx}(n_\theta, n_{Rx}, h_{czt}, k_{pc}) \exp\left(j2\pi(f_0 + B_{n_{Tx}})\frac{d_{Rx}(n_{Rx})\sin\theta'(n_\theta)}{c}\right)$$

$$(n_\theta = 0, 1, \ldots, N_\theta - 1)$$

$$(k_{pc} = 0, 1, \ldots, M_{fft} - 1)$$

$$(h_{czt} = 0, 1, \ldots, H_{czt} - 1)$$

$$(n_{Rx} = 0, 1, \ldots, N_{Rx} - 1)$$

The second integration unit 243 outputs, to the candidate target detecting unit 241, the integrated signal $R_{\Sigma Tx, Rx}(n_\theta, h_{czt}, k_{pc})$ based on the velocity and the range after correlation, the arrival angle candidate number $n_0'$ of the detected candidate target, the velocity bin number $h_{czt}'$, and the frequency sampling number $k_{pc}'$ in the range direction. The operation after the candidate target detecting unit 241 is similar to that of the first embodiment.

As described above, in the radar apparatus according to the second embodiment, since the transmission signals of the transmission radars 100a-$n_{Tx}$ are made so that the frequency modulations of adjacent bands are complex conjugates, the cross-correlation is canceled out during pulse compression, thereby resulting in effects that no unnecessary peak appears and that side lobes do not increase. Moreover, in a case where band synthesis is performed by the integration unit 234-1$n_{Rx}$, there is no influence of cross-correlation, side lobes do not increase, and an integration result with low side lobes can be obtained. That is, it is possible to obtain a radar apparatus with improved detection performance.

Furthermore, since the second integration unit 243 integrates the signals for each of the reception radars 200a-$n_{Rx}$, it becomes possible to obtain a radar apparatus with increased power and improved detection performance. In addition, by integrating the signals for each of the reception radars 200a-$n_{Rx}$, the antenna aperture length is virtually increased, resulting in the effect of improving the angular resolution.

As described above, according to the radar apparatus of the second embodiment, the second integration unit for integrating the band-synthesized signals based on the velocity and the range after correlation with a target arrival angle candidate and generating the integrated signal based on the velocity and the range after correlation is further included, and the candidate target detecting unit performs detection of a candidate target on an output signal from the second integration unit instead of the integration unit, and thus it is possible to increase the power and to improve the detection performance and the angular resolution.

Also according to the radar apparatus of the second embodiment, the plurality of transmission radars radiates transmission signals having different frequencies based on the transmission frequencies that are frequency-modulated within the pulse in ascending or descending order at a set frequency interval so that the frequency modulations of adjacent frequency bands are complex conjugate. Therefore, the cross-correlation is canceled out during pulse compression, thereby resulting in effects that no unnecessary peak appears and that side lobes do not increase. As a result, a radar apparatus with improved detection performance can be obtained.

Moreover, according to the radar apparatus of the second embodiment, the plurality of transmission radars radiates transmission signals having different frequencies based on the transmission frequencies that are frequency-modulated within the pulse in ascending or descending order at a set frequency interval so that the frequency modulations of symmetrical frequency bands are complex conjugate. Therefore, the cross-correlation is canceled out during pulse compression, thereby resulting in effects that no unnecessary peak appears and that side lobes do not increase. As a result, a radar apparatus with improved detection performance can be obtained.

Furthermore, according to the radar apparatus of the second embodiment, since the plurality of transmission radars performs code modulation or non-linear frequency modulation as intra-pulse modulation, there is no influence of the Doppler frequency like in frequency modulation, and thus it is possible to obtain a radar apparatus with improved detection performance and ranging performance without an integration loss. Since different types of code modulation or non-linear frequencies having high orthogonality are used for each of the transmission radars, cross-correlation is canceled out during pulse compression, no unnecessary peak appears, and side lobes do not increase. As a result, a radar apparatus with improved detection performance can be obtained.

In addition, according to the radar apparatus of the second embodiment, the plurality of transmission radars performs the inter-hit code modulation in addition to the intra-pulse modulation, and further includes the inter-hit code demodulating unit for demodulating the inter-hit code on the basis of the range ambiguity level as the preceding stage of the range-direction frequency domain converting unit, it becomes possible to obtain a radar apparatus in which the SNR is improved only for the target reflection reception signal from a desired range ambiguity level, reflection reception signals from different range ambiguity levels, for example, from clutter are suppressed, and the target detection performance is improved.

Note that the present invention may include a flexible combination of the respective embodiments, a modification of any component of the embodiments, or an omission of any component in the embodiments within the scope of the invention.

INDUSTRIAL APPLICABILITY

As described above, a radar apparatus according to the present invention is capable of improving the target detection performance even in a case where there is an influence of a target Doppler frequency, and is suitable for use in a MIMO radar or the like.

REFERENCE SIGNS LIST

100-$n_{Tx}$: Transmission radar, 110-$n_{Tx}$: Antenna, 120-$n_{Tx}$, 120a-$n_{Tx}$: Transmission unit, 121-$n_{Tx}$: Transmitter, 122-$n_{Tx}$: Pulse modulator, 123-$n_{Tx}$: Local oscillator, 124-$n_{Tx}$, 124a-$n_{Tx}$: Intra-pulse modulation signal generator, 125-$n_{Tx}$: Intra-pulse modulation parameter setting unit, 200-1, 200-$n_{Rx}$, 200a-$n_{Rx}$: Reception radar, 210-1, 210-$n_{Rx}$: Antenna, 220-1, 220-$n_{Rx}$: Reception unit, 221-1, 221-$n_{Rx}$: Receiver, 222-1, 222-$n_{Rx}$: A/D converter, 230-1, 230-$n_{Rx}$, 230a-$n_{Rx}$, 230b-$n_{Rx}$: First signal processor, 231-1, 231-$n_{Rx}$: Range-direction frequency domain converting unit, 232-1, 232-$n_{Rx}$: Hit-direction frequency domain converting unit, 233-1, 233-$n_{Rx}$, 233a-$n_{Rx}$: Correlation unit, 234-1, 234-$n_{Rx}$: Integration unit, 235-$n_{Rx}$: Inter-hit code demodulating unit, 240, 240a, 240b: Second signal processor, 241: Candidate target detecting unit, 242: Target relative velocity/relative range/arrival angle calculating unit, 243: Second integration unit, 250: Display.

The invention claimed is:

1. A radar apparatus comprising:
a plurality of transmission radars to radiate transmission signals each having different frequencies generated using a pulse signal and an intra-pulse modulation signal for modulating the pulse signal;
a recepter to convert reception signals of the transmission signals reflected back by a target into reception video signals;
a range-direction frequency domain converter to convert the reception video signals into signals based on a range direction frequency;
a hit-direction frequency domain converter to convert the signals based on the range direction frequency into signals based on a velocity and a range direction frequency so that a target Doppler frequency belongs to a same velocity bin number independently of variations in frequencies of the transmission signals;
a correlator to perform correlation processing on the signals output from the hit-direction frequency domain converter using a reference signal corresponding to a velocity corresponding to transmission frequencies of the plurality of transmission radars and a velocity bin number and generating signals based on the velocity separated for each of the transmission frequencies of the plurality of transmission radars and a range after correlation;
an integrator to integrate the signals output from the correlator with a target arrival angle candidate and generating a band-synthesized signal based on the velocity and the range after correlation;
a candidate target detector to detect a candidate target on a basis of signal intensity from the signals output from the integrator; and
a target relative velocity/relative range/arrival angle calculator to calculate a relative velocity, a relative range, and an arrival angle of the candidate target.

2. The radar apparatus according to claim 1, further comprising:
a second integrator to integrate the band-synthesized signal based on the velocity and the range after correlation with the target arrival angle candidate and generating the integrated signal based on the velocity and the range after correlation,
wherein the candidate target detector performs detection of a candidate target on an output signal from the second integrator instead of the integrator.

3. The radar apparatus according to claim 1, wherein the plurality of transmission radars include an intra-pulse modulation parameter setter to calculate and set an intra-pulse modulation parameter for suppressing signals having different velocity ambiguity levels on a basis of a virtual image suppression evaluation value and a set threshold value.

4. The radar apparatus according to claim 1, wherein the plurality of transmission radars perform frequency modulation on the pulse signal.

5. The radar apparatus according to claim 3, wherein the plurality of transmission radars radiate transmission signals having different frequencies based on transmission frequencies that are frequency-modulated within a pulse in ascending or descending order at a set frequency interval.

6. The radar apparatus according to claim 3, wherein the plurality of transmission radars radiate transmission signals having different frequencies based on transmission frequencies that are frequency-modulated within a pulse in ascending or descending order at a set frequency interval so that frequency modulations of adjacent frequency bands are complex conjugates.

7. The radar apparatus according to claim 3, wherein the plurality of transmission radars radiate transmission signals having different frequencies based on transmission frequencies that are frequency-modulated within a pulse in ascending or descending order at a set frequency interval so that frequency modulations of symmetrical frequency bands are complex conjugates.

8. The radar apparatus according to claim 1, wherein the plurality of transmission radars perform code modulation or nonlinear frequency modulation on the pulse signal.

9. The radar apparatus according to claim 1,
wherein the plurality of transmission radars perform inter-hit code modulation in addition to intra-pulse modulation, and
the plurality of transmission radars further include an inter-hit code demodulator to demodulate an inter-hit code on a basis of a range ambiguity level as a preceding stage of the range-direction frequency domain converter.

10. The radar apparatus according to claim 1, wherein the hit-direction frequency domain converter performs conversion processing by applying window function processing to a signal based on the range direction frequency.

11. The radar apparatus according to claim 1, wherein the hit-direction frequency domain converter uses discrete Fourier transform in order to take samples from a signal based on a velocity and a range direction frequency after hit-direction frequency domain conversion at a frequency interval set on a basis of a change in a transmission frequency.

12. The radar apparatus according to claim 1, wherein the hit-direction frequency domain converter uses chirp z transform in order to take samples from a signal based on a velocity and a range direction frequency after hit-direction frequency domain conversion at an interval set on a basis of a change in a transmission frequency.

13. The radar apparatus according to claim 1, wherein only one of the plurality of transmission radars is operated.

* * * * *